United States Patent
Takizawa et al.

(10) Patent No.: US 7,320,257 B2
(45) Date of Patent: Jan. 22, 2008

(54) LOAD MEASURING DEVICE FOR ROLLING BEARING UNIT AND LOAD MEASURING ROLLING BEARING UNIT

(75) Inventors: Takeshi Takizawa, Kanagawa (JP);
Tomoyuki Yanagisawa, Kanagawa (JP); Koichiro Ono, Kanagawa (JP);
Ikunori Sakatani, Kanagawa (JP)

(73) Assignee: NSK Ltd., Tokyo (JP)

( * ) Notice: Subject to any disclaimer, the term of this patent is extended or adjusted under 35 U.S.C. 154(b) by 118 days.

(21) Appl. No.: 10/535,936

(22) PCT Filed: May 6, 2004

(86) PCT No.: PCT/JP2004/006410

§ 371 (c)(1),
(2), (4) Date: May 23, 2005

(87) PCT Pub. No.: WO2004/104545

PCT Pub. Date: Dec. 2, 2004

(65) Prior Publication Data

US 2006/0070462 A1    Apr. 6, 2006

(30) Foreign Application Priority Data

| May 22, 2003 | (JP) | ............... 2003-144942 |
| Jun. 17, 2003 | (JP) | ............... 2003-171715 |
| Jun. 17, 2003 | (JP) | ............... 2003-172483 |
| Jan. 15, 2004 | (JP) | ............... 2004-007655 |

(51) Int. Cl.
*G01L 1/00* (2006.01)
(52) U.S. Cl. .................. 73/862.541; 73/862.322
(58) Field of Classification Search ........... 73/862.322, 73/862.541
See application file for complete search history.

(56) References Cited

U.S. PATENT DOCUMENTS

| 3,194,051 A | 7/1965 | Schnoll |
| 5,517,858 A * | 5/1996 | Matsuzaki et al. ............ 73/593 |
| 5,877,433 A * | 3/1999 | Matsuzaki et al. ...... 73/862.381 |
| 6,471,407 B1 * | 10/2002 | Katano ...................... 384/448 |

(Continued)

FOREIGN PATENT DOCUMENTS

EP    1 069 435 A2    1/2001

(Continued)

OTHER PUBLICATIONS

Magnetic Velocity Sensors, Brune Lequesne et al., IEEE Transactions of Industry Applications, vol. 32, Sep.-Oct. 1996, pp. 1166-1175.

*Primary Examiner*—Edward Lefkowitz
*Assistant Examiner*—Freddie Kirkland, III
(74) *Attorney, Agent, or Firm*—Sughrue Mion, Pllc.

(57) ABSTRACT

Revolution speeds $n_{ca}$, $n_{ib}$ of rolling elements 9a, 9b are sensed by a pair of revolution speed sensors 21a, 21b. Also, a rotational speed $n_i$ of a hub 2 is sensed by a rotational speed sensor 15b. A sum "$n_{ca}+n_{cb}$" or a difference "$n_{ca}-n_ib$" the revolution speeds of rolling elements 9a, 9b in double rows is calculated based on sensed signals of the revolution speed sensors 21a, 21b, and then a ratio "$n_{ca}+n_ib/ni$" or "$n_{ca}-n_{cb}/n_i$" of this sum or difference to the rotational speed $n_i$ is calculated. Then, the radial load or the an axial load is calculated based on the ratio "$n_{ca}+n_cb/ni$" or "$_{ca}-n_{ib}/ni$".

25 Claims, 31 Drawing Sheets

U.S. PATENT DOCUMENTS 6,622,550 B1 * 9/2003 Jenniges et al. .............. 73/129

FOREIGN PATENT DOCUMENTS

| | | | |
|---|---|---|---|
| FR | 2 558 223 | A1 | 7/1985 |
| JP | 62-3365 | A | 1/1987 |
| JP | 3-209016 | A | 9/1991 |
| JP | 2001-21577 | A | 1/2001 |

* cited by examiner

LOAD MEASURING DEVICE FOR ROLLING BEARING UNIT AND LOAD MEASURING ROLLING BEARING UNIT

TECHNICAL FIELD

The present invention relates to a load measuring device for a rolling bearing unit and a load measuring rolling bearing unit, for example, a rolling bearing unit used to support wheels of a mobile body such as a car, a railway vehicle, various carrier cars, and so forth. More particularly, the present invention relates to a load measuring device for a rolling bearing unit and a load measuring rolling bearing unit, which can secure a running stability of a mobile body by measuring at least one of a radial load and an axial load applied to the rolling bearing unit.

BACKGROUND ART

The rolling bearing unit is used to support rotatably the wheel of the vehicle with the suspension system. Also, the rotational speed of the wheel must be sensed to control various vehicle attitude stabilizing system such as the anti-lock brake system (ABS), the traction control system (TCS), and so on. As a result, recently not only to support rotatably the wheel with the suspension system but also to sense the rotational speed of this wheel is widely carried out by the rolling bearing unit equipped with the rotational speed detection device in which the rotational speed detection device is incorporated into the rolling bearing unit.

As the rolling bearing unit equipped with the rotational speed detection device used for such purpose, a number of structures such as the structure set forth in JP-A-2001-21577, etc. are known. The ABS or the TCS can be controlled appropriately by feeding a signal indicating the rotational speed of the wheel, which is sensed by the rolling bearing unit equipped with the rotational speed detection device, to the controller. In this manner, the stability of the running attitude of the vehicle at the time of braking or acceleration can be assured by the rolling bearing unit equipped with the rotational speed detection device, nevertheless the brake and the engine must be controlled based on full information, which have an influence on the running stability of the vehicle, to assure this stability under more severe conditions. In contrast, in the case of ABS or TCS utilizing the rolling bearing unit equipped with the rotational speed detection device, the brake and the engine are controlled by sensing the slip between the tire and the road surface, i.e., so-called feedback control is executed. For this reason, since the control of the brake and the engine is delayed of course, though such delay is only an instant, improvement in such control is desired from an aspect of the performance improvement under the severe conditions. Namely, in the case of the related-art structure, so-called feedforward control can prevent neither. generation of the slip between the tire and the road surface nor so-called one-sided activation of the brake, i.e., the event that braking powers are extremely different between left and right wheels. In addition, such control cannot prevent the event that the running stability of the truck, or the like becomes worse due to its improper carrying state.

In light of such circumstances, the rolling bearing unit equipped with the load measuring device shown in FIG. 37 is disclosed in JP-A-2001-21577. In this rolling bearing unit equipped with the load measuring device in the related art, a hub 2 is fitted to the inner diameter side of an outer ring 1. Such hub 2 couples/fixes the wheel and acts as a rotating ring and also an inner-ring equivalent member. Such outer ring 1 is supported with the suspension system and acts as a stationary ring and also an outer-ring equivalent member. This hub 2 includes a hub main body 4 having a rotation side flange 3 at its outer end portion (end portion positioned on the out side in a width direction in a fitted state to the vehicle) to fix the wheel, and an inner ring 6 fitted to an inner end portion (end portion positioned on the center side in the width direction in the fitted state to the vehicle) of the hub main body 4 and fixed with a nut 5. Then, a plurality of rolling elements 9a, 9b are aligned respectively between double row outer ring raceways 7, 7 and double row inner ring raceways 8, 8. Such double row outer ring raceways 7, 7 are formed on an inner peripheral surface of the outer ring 1 to act as a stationary side raceway respectively. Such double row inner ring raceways 8, 8 are formed on an outer peripheral surface of the hub 2 to act as a rotation side raceway respectively, such that the hub 2 can be rotated on the inner diameter side of the outer ring 1.

A fitting hole 10 for passing through the outer ring 1 in the diameter direction is formed in a middle portion of the outer ring 1 in the axial direction between the double row outer ring raceways 7, 7 and in an upper end portion of the outer ring 1 in the almost perpendicular direction. Then, a round lever (rod-like) displacement sensor 11 serving as a load measuring sensor is fitted into the fitting hole 10. The displacement sensor 11 is of non-contact type, and a sensing face provided to its top end surface (lower end surface) is opposed closely to an outer peripheral surface of a sensor ring 12 that is fitted to the middle portion of the hub 2 in the axial direction. When a distance between the sensing face and the outer peripheral surface of the sensor ring 12 is changed, the displacement sensor 11 outputs a signal in response to an amount of change in the distance.

In the case of the rolling bearing unit equipped with the load measuring device constructed as above in the related art, the load applied to the rolling bearing unit can be measured based on a sensed signal of the displacement sensor 11. In other words, the outer ring 1 supported with the suspension system of the vehicle is pushed down by the weight of the vehicle whereas the hub 2 for supporting/fixing the wheel still acts to stay at that position as it is. Therefore, a deviation between a center of the outer ring 1 and a center of the hub 2 is increased based on elastic deformations of the outer ring 1, the hub 2, and the rolling elements 9a, 9b as the weight is increased more and more. Then, a distance between a sensing face of the displacement sensor 11, which is provided to the upper end portion of the outer ring 1, and an outer peripheral surface of the sensor ring 12 is reduced as the weight is increased more and more. Accordingly, if the sensed signal of the displacement sensor 11 is fed to the controller, the load applied to the rolling bearing unit which is equipped with the displacement sensor 11 can be calculated based on a relational expression derived by the experiment or the like previously, a map, or the like. Based on the loads applied to the rolling bearing units and sensed in this manner, the ABS can be controlled properly and also the driver is informed of the improper carrying state.

In this case, the related-art structure shown in FIG. 37 can sense a rotational speed of the hub 2 in addition to the radial load applied to the rolling bearing unit. For this purpose, a rotational speed encoder 13 is fitted/fixed to the inner end portion of the inner ring 6 and also a rotational speed sensor 15 is secured to a cover 14 that is put on an inner end opening portion of the outer ring 1. Then, a sensing portion of the rotational speed sensor 15 is opposed to a sensed portion of the rotational speed encoder 13 via a sensing clearance.

In operation of the rolling bearing unit that is equipped with the above rotational speed detection device, an output of the rotational speed sensor 15 is changed when the rotational speed encoder 13 is revolved together with the hub 2, to which the wheel is fixed, and then the sensed portion of such rotational speed encoder 13 passes through in vicinity of the sensed portion of the rotational speed sensor 15. In this way, a frequency of an output of the rotational speed sensor 15 is in proportion to the number of revolution of the wheel. Therefore, if the output signal of the rotational speed sensor 15 is supplied to the controller (not shown) provided to the vehicle body side, the ABS or the TCS can be controlled appropriately.

The related-art structure set forth in above JP-A-2001-21577 measures the radial load applied to the rolling bearing unit whereas, in JP-A-3-209016, the structure for measuring a magnitude of the axial load applied to the rolling bearing unit via the wheel is set forth. In the case of the related-art structure set forth in JP-A-3-209016, as shown in FIG. 38, the rotation side flange 3 used to support the wheel is fixed to an outer peripheral surface of an outer end portion of a hub 2a that acts as the rotating ring and the inner ring equivalent member. Also, double row inner ring raceways 8, 8 that correspond to a rotation side raceway respectively are formed on an outer peripheral surface of the middle portion or the inner end portion of the hub 2a.

Meanwhile, a stationary side flange 17 to support/fix the outer ring 1 to a knuckle 16 constituting the suspension system is fixed to an outer peripheral surface of the outer ring 1, which is arranged around the hub 2a in a concentric manner with this hub 2a and acts as the stationary ring and the outer ring equivalent member. Also, the double row outer ring raceways 7, 7 that correspond to a stationary side raceway respectively are formed on the inner peripheral surface of the outer ring 1. Then, a plurality of rolling elements (balls) 9a, 9b are provided rotatably between the outer ring raceways 7, 7 and the inner ring raceways 8, 8 respectively, whereby the hub 2a is supported rotatably on the inner diameter side of the outer ring 1.

In addition, a load sensor 20 is affixed to portions that surround screwed holes 19, into which a bolt 18 is screwed respectively to couple the stationary side flange 17 with the knuckle 16, at plural locations on the inner side surface of the stationary side flange 17 respectively. In a state that the outer ring 1 is supported/fixed to the knuckle 16, these load sensors 20 are held between the outer surface of the knuckle 16 and the inner surface of the stationary side flange 17.

In the case of such load measuring device for the rolling bearing unit known in the related art, when the axial load is applied between the wheel (not shown) and the knuckle 16, the outer surface of the knuckle 16 and the inner surface of the stationary side flange 17 are pressed against respective load sensors 20 from both surfaces in the axial direction. Therefore, the axial load applied between the wheel and the knuckle 16 can be sensed by summing up measured values of these load sensors 20. Also, in JP-B-62-3365 that, although not shown, the method of calculating the revolution speed of the rolling elements based on a vibration frequency of the outer ring equivalent member, a part of which has a low rigidity, and then measuring the axial load applied to the rolling bearing unit is set forth.

Out of the structures that measure the load (the radial load or the axial load) applied to the rolling bearing, as described above, in the case of the first example of the related-art structure shown in above FIG. 37, the load applied to the rolling bearing unit is measured by measuring respective displacements of the outer ring 1 and the hub 2 in the radial direction by means of the displacement sensor 11. In this case, because an amount of displacement in the radial direction is minute, a high-precision sensor must be used as the displacement sensor 11 to measure the load with good precision. Since a high-precision non-contact type sensor is expensive, it is inevitable that a cost is increased as the overall rolling bearing unit equipped with the load measuring device.

Also, in the case of the structure for measuring the axial load as the second example of the related-art structures shown in FIG. 38, the load sensors 20 must be provided to the knuckle 16 as many as the bolts 18 used to support/fix the outer ring 1. For this reason, in addition to the fact that the load sensor 20 itself is expensive, it is inevitable that a cost of the overall load measuring device for the rolling bearing unit is considerably increased. Also, in the method set forth in JP-B-62-3365, the rigidity of the outer ring equivalent member must be reduced partially and thus there is such a possibility that it is difficult to assure the endurance of the outer ring equivalent member.

DISCLOSURE OF THE INVENTION

An object of the present invention is to provide a load measuring device for a rolling bearing unit and a load measuring rolling bearing unit, capable of being constructed at a low cost with no trouble with endurance and also measuring one or both of the radial load and the axial load applied to the wheel while assuring a precision required to control. Also, another object of the present invention is to provide a structure that can sense precisely the axial load applied to the rolling bearing unit by using only an output signal of a sensor provided to a rolling bearing unit portion.

A load measuring device for a rolling bearing unit according to a first aspect of the present invention, comprises: a stationary ring having two rows of raceways; a rotating ring arranged concentrically with the stationary ring, the rotating ring having two rows of raceways which are formed respectively to be opposite to the raceways of the stationary ring; a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other; a pair of revolution speed sensors for sensing revolution speeds of the rolling elements in the two rows respectively; and a calculator for calculating a load applied between the stationary ring and the rotating ring based on sensed signals fed the revolution speed sensors.

Also, a load measuring rolling bearing unit according to a second aspect of the present invention, comprises: a stationary ring having two rows of raceways; a rotating ring arranged concentrically with the stationary ring, the rotating ring having two rows of raceways which are formed respectively to be opposite to the raceways of the stationary ring; a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other; and a pair of revolution speed sensors for sensing revolution speeds of the rolling elements in the two rows respectively.

The load measuring device for the rolling bearing unit and the load measuring rolling bearing unit of the present invention constructed as above is capable of measuring the load (one or both of the radial load and the axial load) loaded to the rolling bearing unit by sensing the revolution speeds of the rolling elements in a pair of rows, direction of the contact angles of which are different mutually, respectively. In other words, when the radial load is applied to the rolling bearing unit like the double row angular contact ball bearing, the contact angles of the rolling elements (balls) are changed. As well known in the technical field of the rolling bearing, the revolution speeds of the rolling elements are changed when the contact angles are changed.

Meanwhile, when the axial load is applied to the rolling bearing unit, the revolution speeds of the rolling elements in the row positioned on the side that supports the axial load are decelerated while the revolution speeds of the rolling elements in the row positioned on the opposite side are accelerated in the case that the outer ring equivalent member is the rotating ring. Conversely, the revolution speeds of the rolling elements in the row positioned on the side that supports the axial load are accelerated while the revolution speeds of the rolling elements in the row positioned on the opposite side are decelerated in the case that the inner ring equivalent member is the rotating ring. At the same time, the revolution speeds of the rolling elements in respective rows are changed in response to the radial load. Therefore, the radial load applied to the rolling bearing unit can be detected by measuring change in the revolution speeds of the rolling elements in tow rows.

In particular, in the case of the present invention, since the revolution speeds of the rolling elements in a pair of rows, directions of the contact angles of which are different mutually, are sensed, a measuring precision of the radial load can be improved by eliminating the influence of the axial load. In other words, when the axial load is applied, the revolution speeds of the rolling elements in one row and the revolution speeds of the rolling elements in the other row are changed in the opposite direction mutually (one is increased and the other is decreased). Therefore, the influence of the axial load upon a measured value of the radial load can be suppressed small by adding or multiplying these revolution speeds of the rolling elements in both rows.

The above explanation is made of the case that the radial load applied to the rolling bearing unit is detected, but the axial load is detected based on the revolution speeds of the rolling elements in a pair of rows, directions of the contact angles of which are different mutually. In other words, the contact angles become large in the row on the side that supports the axial load when the axial load is increased, while the contact angles become small in the row on the opposite side when the axial load is increased. Then, in the case that the outer ring equivalent member is the rotating ring, the revolution speeds of the rolling elements in the row positioned on the side that supports the axial load are decelerated while the revolution speeds of the rolling elements in the row positioned on the opposite side are accelerated. Conversely, in the case that the inner ring equivalent member is the rotating ring, the revolution speeds of the rolling elements in the row positioned on the side that supports the axial load are accelerated while the revolution speeds of the rolling elements in the row positioned on the opposite side are decelerated. Therefore, the axial load applied to the rolling bearing unit can be detected by measuring change in the revolution speeds of the rolling elements in two rows.

In particular, in the case of the present invention, since the revolution speeds of the rolling elements in a pair of rows, directions of the contact angles of which are different mutually, are sensed, a measuring precision of the axial load can be improved by eliminating influences of the preload and the radial load. In other words, the preload is applied uniformly to the rolling elements in each row and the radial load is also applied substantially uniformly. Therefore, influences of the preload and the radial load upon the revolution speeds of the rolling elements in respective rows become substantially equal. As a result, if the axial load is sensed based on a ratio or a difference of the revolution speeds of the rolling elements in respective rows, influences of the preload and the radial load upon a measured value of the axial load can be suppressed small.

In this case, if the rolling bearing unit is used in a state that the rotational speed of the rotating ring is always constant, only the revolution speed sensors for sensing the revolution speeds of the rolling elements in respective rows are required for the revolution sensors used to calculate the load. In contrast to this, when the rotational speed of the rotating ring is changed in operation, the axial load and the radial load can be measured based on the rotational speed of the rotating ring sensed by the rotational speed sensor and the revolution speeds. In this case, if a speed ratio as a ratio of the difference (sum) between the revolution speeds of the rolling elements in both rows to the rotational speed is calculated and then the axial load (radial load) is sensed based on this speed ratio, the axial load (radial load) can be measured exactly even though the rotational speed of the rotating ring is changed.

Also, even when the load to be detected is the radial load or the axial load or both of them, the inexpensive speed sensors used widely to get the control signals of ABS or TCS in the related art can be used as the revolution speed sensors used to measure the revolution speeds. For this reason, the overall load measuring device for the rolling bearing unit can be constructed inexpensively.

Therefore, although the load measuring device can be constructed at a relatively low cost, such load measuring device can measure the load such as the radial load, the axial load, etc. applied to the rotating member of the wheels, etc. while keeping a precision required for the control. As a result, the load measuring device of the present invention can contribute to higher performance of various vehicle running stabilizing devices or various machine equipments.

Also, in the implementation of the present invention, preferably the load measuring device of the present invention further comprises a rotational speed sensor for sensing a rotational speed of the rotating ring.

According to such configuration, even when the rotational speed of the rotating ring is changed in operation, one or both of the radial load and the axial load can be measured precisely based on the rotational speed of the rotating ring sensed by the rotational speed sensor and the revolution speeds.

Also, in the implementation of the present invention, at least one sensor of the pair of revolution speed sensors and the rotational speed sensor may be a passive type magnetic sensor that is formed by winding a coil around a yoke made of magnetic material.

In other words, it is preferable that the magnetic sensor whose output is changed in response to change in the magnetic characteristic of the revolution speed encoder rotated together with the revolution of the rolling elements or the rotational speed encoder rotated together with the rotating ring should be employed as the revolution speed sensors and the rotational speed sensor used to implement the present invention. As such magnetic sensor, there are the active type into which the magnetic sensing element such as Hall element, magneto resistive element, or the like, whose characteristics are changed in response to change in the magnetism, is incorporated and the above passive type in the related art. The active type that can assure an amount of change in output from the low-speed rotation is preferable in an aspect to measure exactly the revolution speed or the rotational speed of the low-speed rotation, but is expensive at present rather than the passive type sensor. Therefore, if the passive type of a relatively low cost is used as a part of sensors that are not particularly important to assure the reliability in sensing the speed in the low-speed rotation (e.g., revolution speed sensor), a cost of the overall load measuring system for the rolling bearing unit can be suppressed.

In this case, when either the active type sensor is used or the passive type sensor is used, the sensor equipped with the permanent magnet and the no-magnetized encoder (tone wheel) can be used in combination to reduced a cost. As such encoder, the encoder which is made of magnetic material such as iron, or the like and on a sensed surface of which through holes or unevennesses are provided alternately at an equal interval in the circumferential direction may be employed. Also, in place of such encoder, the encoder in which unevennesses are provided alternately at an equal interval on a sensed surface of a retainer made of iron in the circumferential direction, or the encoder in which unevennesses are provided similarly on a sensed surface of the retainer made of synthetic resin and then magnetic material is plated on the uneven surface may be employed.

Alternately, at least one sensor of the pair of revolution speed sensors and the rotational speed sensor may be a resolver.

If the resolver is used as the sensor, the number of times of output change of the sensor (the number of pulses) per revolution can be increased rather than the active type or passive type magnetic sensor. As a result, a responsibility to sense the revolution speed or the rotational speed can be improved (a sensing timing of the revolution speed or the rotational speed can be set closer to a real time) and thus the running stability of the mobile body can be assured based on the measured load with higher precision.

Also, in the implementation of the present invention, preferably the pair of revolution speed sensors and the rotational speed sensor are provided at an interval in an axial direction of the stationary ring so as to put the rolling elements in one row between the pair of revolution speed sensors and the rotational speed sensor.

According to such configuration, magnetic interference between a pair of revolution speed sensors and the rotational speed sensor can be suppressed small and also the reliability in sensing the revolution speed and the rotational speed can be improved.

In this case, for example, the pair of revolution speed sensors are fitted to center portions of the stationary ring in the axial direction between a pair of rows of the rolling elements, and the rotational speed sensor is fitted to an end portion of the stationary ring in the axial direction.

According to such configuration, an inner diameter of the fitting hole formed in the stationary ring to install a pair of revolution speed sensors therein can be suppressed small and also assurance of the rigidity and the strength of the stationary ring can be facilitated.

Also, in the implementation of the present invention, preferably a pair of revolution speed sensors and the rotational speed sensor are fitted to a top end portion of a single sensor unit fixed to the stationary ring between a pair of rows of the rolling elements. Then, a fitted position of the rotational speed sensor is deviated closer to a rotating ring side than the revolution speed sensors in a diameter direction of the stationary ring.

According to such configuration, magnetic interference between a pair of revolution speed sensors and the rotational speed sensor can be suppressed small and also the reliability in sensing the revolution speed and the rotational speed can be improved. Also, an inner diameter of the fitting hole formed in the stationary ring to install the sensor unit therein can be suppressed small and also assurance of the rigidity and the strength of the stationary ring can be made easy.

Also, in the implementation of the present invention, preferably the stationary ring includes a connector for connecting a plug, the plug being provided to an end portion of a harness for taking out the sensed signals of respective sensors.

According to such configuration, the harness is fitted to the rolling bearing unit by fitting the rolling bearing unit equipped with respective sensors constituting the load measuring device to the suspension system and then connecting the plug to the connector. As a result, the harness becomes a bar to fit the rolling bearing unit to the suspension system, and thus the fitting operation can be facilitated and in addition generation of a trouble such as breakage of the insulating layer, disconnection, etc. in the harness can be made hard. Also, even though the harness is damaged, only exchange of the harness and the plug is needed in the repairing operation and thus a cost required for the repair can be suppressed low.

In the case to employ such configuration, preferably the single sensor unit has a sensor holder for holding the respective sensors, and the connector is provided integrally with the sensor holder.

According to such configuration, the connector can be fitted easily to the stationary ring.

Also, in the implementation of the present invention, for example, only a pair of revolution speed sensors are provided but the rotational speed sensor for sensing the rotational speed of the rotating ring is not provided. In this case, control such as ABS, TCS, or the like to be executed based on the rotational speed of the rotating ring is executed based on the rotational speed of the rotating ring, which is estimated based on a sensed signal of at least one revolution speed sensor out of the revolution speed sensors.

According to such configuration, a cost and an install space of the sensor itself can be achieved because of omission of the rotational speed sensor, and also a cost and an install space can be achieved because of reduction in the number of the harnesses to transmit the signal.

In this case, for example, an average value of the revolution speeds of the rolling elements in two rows, which is calculated based on the sensed signals of the pair of revolution speed sensors, is used as an estimated value of the rotational speed of the rotating ring.

According to such configuration, even when the large axial load is applied, the rotational speed of the rotating ring can be sensed while assuring a precision necessary for the control such as ABS, TCS, or the like.

In this case, in the case that the rotational speed sensor is omitted in this manner, when the axial load is calculated based on a ratio of the revolution speeds in one row and the revolution speeds in the other row, for example, estimation of the rotational speed of the rotating ring based on the sensed signals of the revolution speed sensors is not required since the axial load can be calculated irrespective of change in the rotational speed of the rotating ring.

In this case, in the implementation of the present invention, the load applied between the stationary ring and the rotating ring is a radial load, for example.

In this event, for example, the calculator calculates the radial load applied between the stationary ring and the rotating ring based on a sum of the revolution speed of the rolling elements in one row and the revolution speed of the rolling elements in the other row.

According to such configuration, the radial load can be calculated with satisfactorily good precision.

Alternately, preferably the load measuring device of the present invention further comprises a rotational speed sensor for sensing a rotational speed of the rotating ring. Then, the calculator calculates the radial load applied between the stationary ring and the rotating ring based on a sensed signal fed from the rotational speed sensor and sensed signals fed from the revolution speed sensors.

In this case, for example, the calculator calculates the radial load applied between the stationary ring and the rotating ring based on a ratio of the sum of (a) the revolution speed of the rolling elements in one row and (b) the revolution speed of the rolling elements in the other row, and the rotational speed of the rotating ring.

Alternately, the calculator calculates the radial load applied between the stationary ring and the rotating ring based on a ratio of a product of (a) the revolution speed of the rolling elements in one row and (b) the revolution speed of the rolling elements in the other row, and a square of the rotational speed of the rotating ring.

According to such configuration, even when the rotational speed of the rotating ring is changed, the radial load can be calculated with good precision.

Also, in the implementation of the present invention, the load applied between the stationary ring and the rotating ring is an axial load, for example.

In this case, for example, the calculator calculates the axial load applied between the stationary ring and the rotating ring based on a ratio of the revolution speed of the rolling elements in one row and the revolution speed of the rolling elements in the other row.

According to such configuration, even when the rotational speed of the rotating ring is changed, the axial load can be calculated with maintaining necessary precision.

Alternately, the calculator calculates the radial load applied between the stationary ring and the rotating ring based on a difference between the revolution speed of the rolling elements in one row and the revolution speed of the rolling elements in the other row.

According to such configuration, the axial load can be calculated with maintaining necessary precision so far as the rotational speed of the rotating ring is constant.

Alternately, preferably the load measuring device of the present invention further comprises a rotational speed sensor for sensing a rotational speed of the rotating ring. Then, the calculator calculates the axial load applied between the stationary ring and the rotating ring based on a sensed signal fed from the rotational speed sensor and sensed signals fed from the revolution speed sensors.

In this case, for example, the calculator calculates the axial load applied between the stationary ring and the rotating ring based on a ratio of the difference between (a) the revolution speed of the rolling elements in one row and (b) the revolution speed of the rolling elements in the other row, and the rotational speed of the rotating ring.

According to such configuration, even when the rotational speed of the rotating ring is changed, the axial load can be calculated with keeping sufficient precision.

Alternately, the calculator calculates the axial load applied between the stationary ring and the rotating ring based on a synthesized signal derived by synthesizing a signal representing the revolution speed of the rolling elements in one row and a signal representing the revolution speed of the rolling elements in the other row.

In this case, for example, the calculator calculates the axial load based on any one of a period and a frequency of a swell of the synthesized signal.

According to such configuration, the number of harnesses for transmitting signals from a plurality of sensors provided to the rolling bearing unit side to a controller provided to the vehicle body side can be reduced, and a lower cost can be attained.

Alternately, preferably the load measuring device of the present invention further comprises a rotational speed sensor for sensing a rotational speed of the rotating ring. Then, the calculator calculates the axial load based on a ratio of any one of the period and the frequency of the swell of the synthesized signal and the rotational speed of the rotating ring.

According to such configuration, the number of harnesses can be reduced, and the axial load can be calculated with keeping sufficient precision even when the rotational speed of the rotating ring is changed.

Also, in the implementation of the present invention, preferably one raceway ring of the stationary ring or the rotating ring is an outer ring equivalent member, the other raceway ring is an inner ring equivalent member, respective rolling elements are balls. Then, back-to-back combination contact angles are affixed to plural balls that are provided between a double row angular contact inner ring raceway formed on an outer peripheral surface of the inner ring equivalent member and a double row angular contact outer ring raceway formed on an inner peripheral surface of the outer ring equivalent member.

Since such structure has large rigidity and large change in the revolution speeds of respective balls based on the load, the load applied between the outer ring equivalent member and the inner ring equivalent member can be measured with good precision while assuring a function of supporting stably the wheel.

Also, in the implementation of the present invention, for example, the revolution speeds of the rolling elements in the two rows can be measured directly.

In this case, since the revolution speed encoder is omitted, reduction in weight and reduction in cost can be attained based on reduction in the number of parts.

Otherwise, the revolution speeds of the rolling elements in the two rows are measured as rotational speeds of retainers for holding respective rolling elements.

In this case, the rotational speeds of the retainers are measured by coupling and fixing the retainer and an encoder, which is formed separately from the retainer, and concentrically mutually and opposing sensing portions of the revolution speed sensors to a sensed surface of the encoder Alternately, the retainer is formed integrally with an elastic member into which powders made of magnetic material are mixed and is magnetized to arrange alternately an S pole and an N pole at an equal interval on a sensed surface, whose center corresponds to a rotation center of the retainer, out of any surfaces of the retainer, and sensing portions of the revolution speed sensors are opposed to a sensed surface to measure the rotational speed of the retainer.

In this manner, if the structure for measuring the revolution speeds of respective rolling elements as the rotational speed of the retainer is employed, a sensing precision of the revolution speed can be improved.

In this case, if the structure using the encoder is employed, preferably an inner diameter of the encoder is larger than an inner diameter of a fitting surface, to which the encoder is fitted, of the holder and an outer diameter of the encoder is smaller than an outer diameter of the fitting surface.

According to such configuration, the structure that can measure the revolution speeds the rolling elements with good precision while preventing the interference between the encode and the stationary ring and the rotating ring can be realized.

Also, if the structure for measuring the revolution speeds of the rolling elements as the rotational speed of the retainer is employed, preferably the revolution speed sensors for the revolution speeds of the rolling elements in two rows respectively are arranged in a state that the sensors are shifted in a revolution direction of the rolling elements by plural pieces every row.

In this case, preferably the revolution speed sensors are provided by two pieces every row on opposite positions by 180 degree with respect to a revolution center of the rolling elements.

According to such configuration, if a center of the retainer is deviated from a center of a pitch circle diameter of the rolling elements and thus the retainer performs a whirling motions, the rotational speed of the retainer, i.e., the revolution speeds of the rolling elements can be exactly measured.

Also, preferably the load measuring device of the present invention further comprises a comparator for comparing contact angles of the rolling elements in each row, which are calculated by the calculator in a course of calculation of the revolution speeds of the rolling elements in each row, with a normal value, and an alarm is generated when the comparator decides that the contact angles are out of a normal range.

According to such configuration, the repair can be applied by sensing application of the excessive axial load, generations of preload escapement, etc., which lead to reduction in the endurance of the rolling bearing unit, before the vehicle falls into an impossible state of running.

Also, in the implementation of the present invention, preferably the rolling elements are made of ceramics.

If the rolling elements using ceramics, which is lighter in weight than the normal bearing steel, as material of the rolling elements are used, the follow-up characteristic of change in the rotation speed of the rolling elements to the sudden variation of the revolution speeds can be improved and also the revolution speeds can be measured precisely to suppress generation of the revolution slip.

Figure 1:
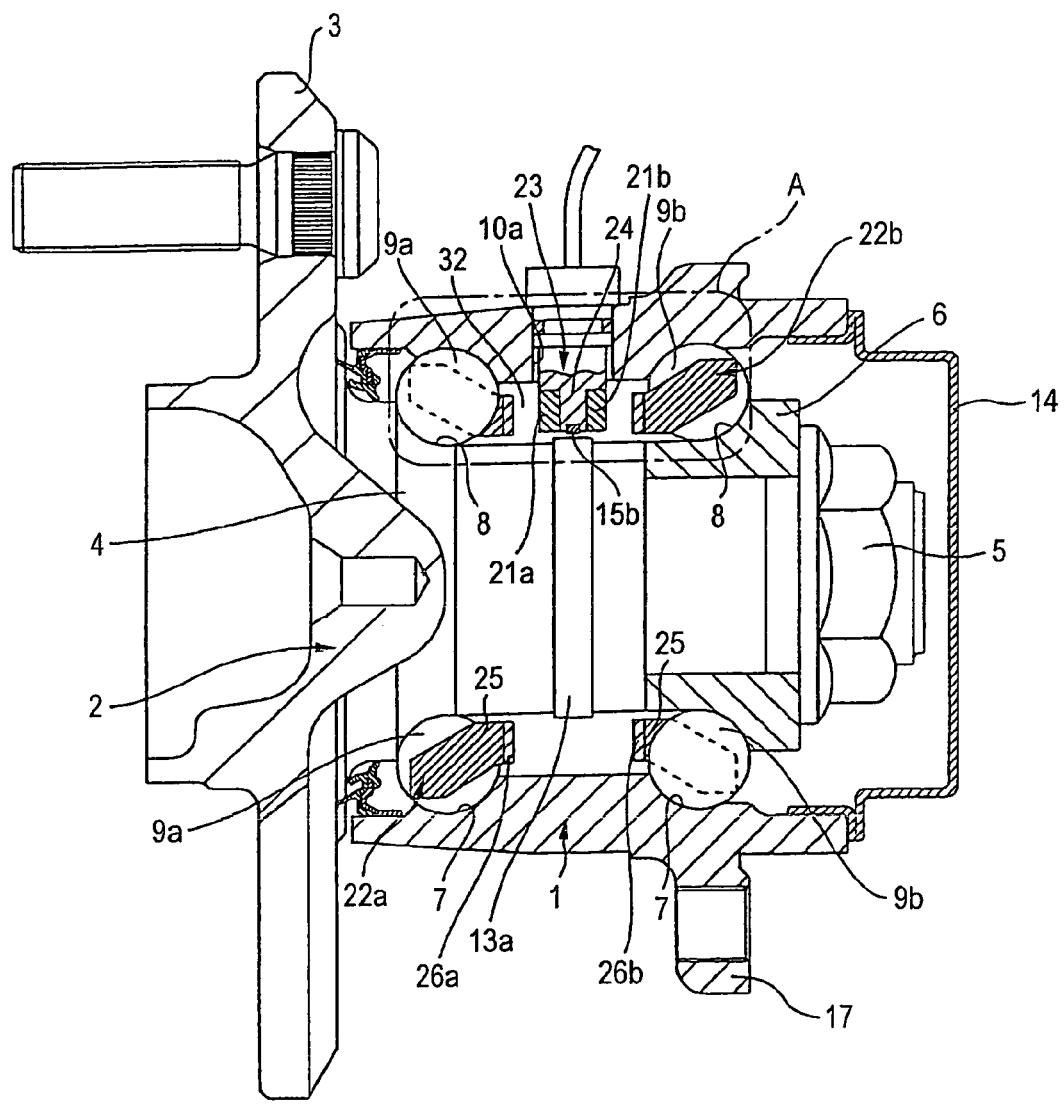
FIG. 1 is a sectional view showing s first embodiment of the present invention.

In the drawings, 1 denotes an outer ring, 2, 2a denote hub, 3 denotes a rotation-side flange, 4 denotes a hub main body, 5 denotes a nut, 6 denotes am inner ring, 7 denotes am outer ring raceway, 8 denotes an inner ring raceway, 9, 9a, 9b denote rolling element, 10, 10a denote fitting hole, 11 denotes a displacement sensor, 12 denotes a sensor ring, 13, 13a, 13b denote rotational speed encoder, 14 denotes a cover, 15, 15b denote rotational speed sensor, 16 denotes a knuckle, 17 denotes a stationary side flange, 18 denotes a bolt, 19 denotes a screwed hole, 20 denotes a load sensor, 21a, 21b denote revolution speed sensor, 22, 22a, 22b denote retainer, 23, 23', 23a denote sensor unit, 24 denotes a top end portion, 25 denotes a rimportion, 26, 26a, 26b denote revolution speed encoder, 27 denotes an outer ring, 28 denotes an inner ring, 29 denotes an outer ring raceway, 30 denotes an inner ring raceway, 31 denotes a cover, 32 denotes a space, 33 denotes an arithmetic circuit, 34 denotes a memory, 35a, 35b denote comparator, 36a, 36b denote alarm, 37 denotes a connector, 38 denotes a harness, 39 denotes a plug, 40 denotes a slinger, 41 denotes a magnetic sensing element, 42 denotes a permanent magnet, 43 denotes a yoke, 44 denotes a coil, 45 denotes a rotor, and 46 denotes a stator.

BEST MODE FOR CARRYING OUT THE INVENTION

First Embodiment

Figure 2:
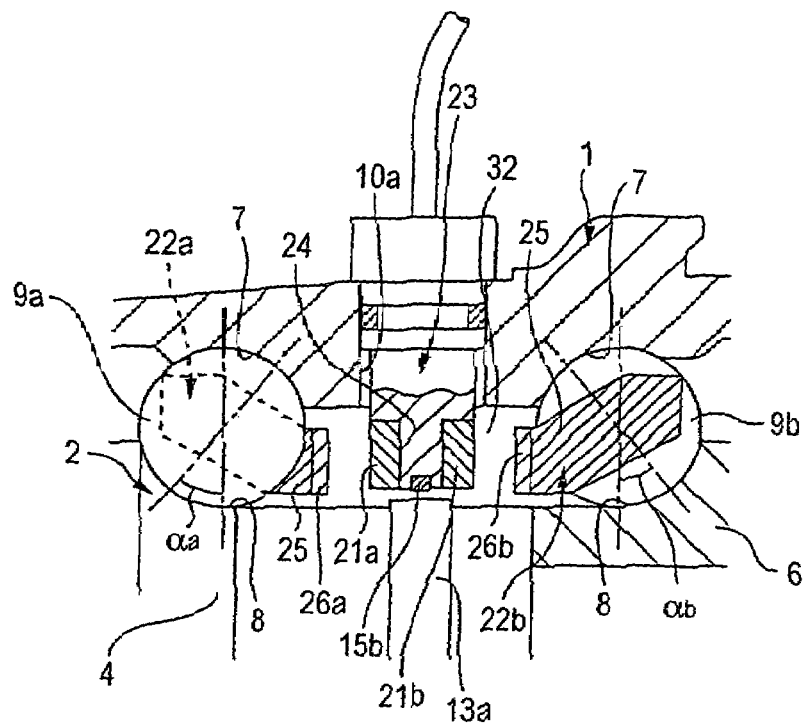
FIG. 2 is an enlarged view of an A portion in FIG. 1.
Figure 3:
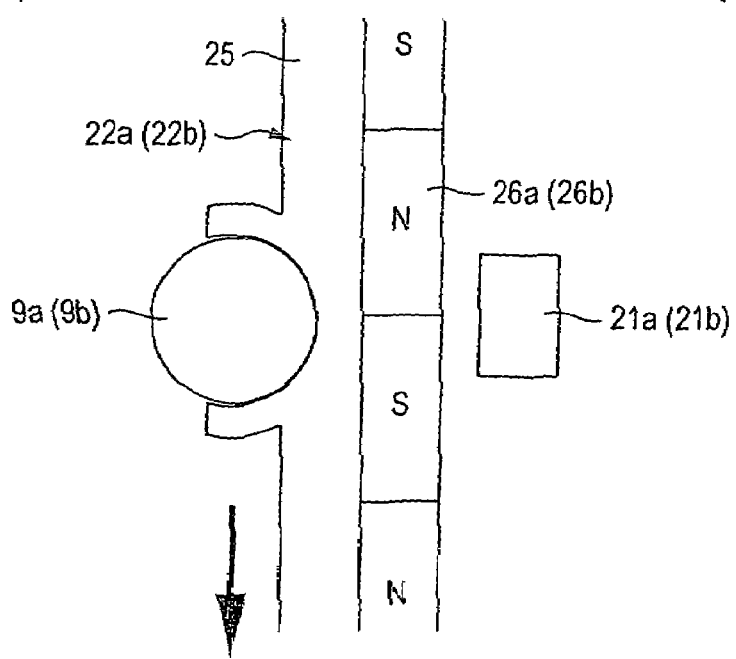
FIG. 3 is a view of a part of a retainer and a revolution speed sensor on the left side in FIG. 2 when viewed in a diameter direction.
Figure 37:
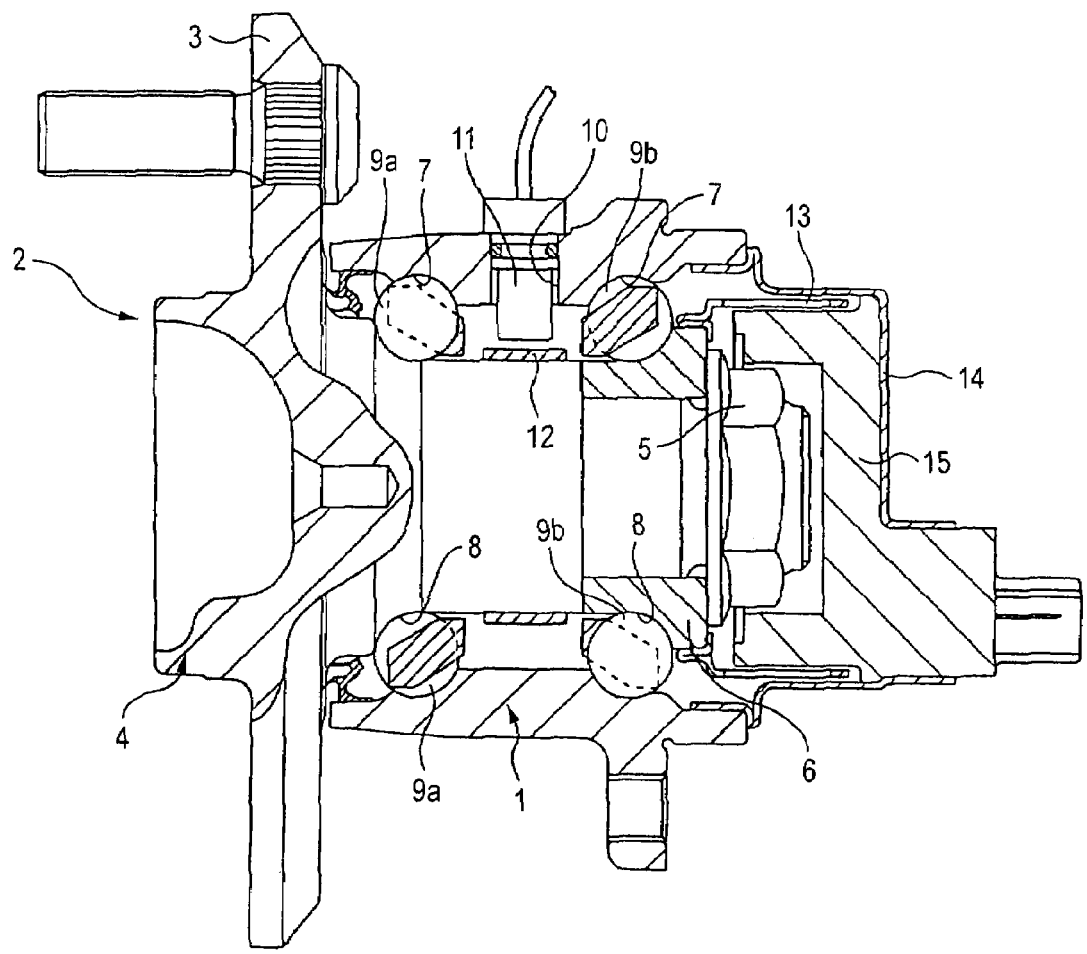
FIG. 37 is a sectional view showing a first example of the structure in the related art.

FIGS. 1 to 3 show s first embodiment of the present invention. The present embodiment shows the case that the present invention is applied to a rolling bearing unit to support idler wheels of the car (front wheels of FR car, RR car, MR car, rear wheels of FF car). Since the structure and the operation of this rolling bearing unit itself are similar to the related-art structure shown in above FIG. 37, their redundant explanation will be omitted or simplified by affixing the same reference symbols to the same portions. Feature portions in the present embodiment will be explained mainly hereinafter.

The rolling elements (balls) 9a, 9b are rotatably provided in double rows (two rows) respectively between the double row angular contact inner ring raceways 8, 8 and the double row angular contact outer ring raceways 7, 7 in a state that a plurality of rolling elements are held in each row by retainers 22a, 22b respectively. Such inner ring raceways 8, 8 are formed on the outer peripheral surface of the hub 2 as the rotating ring and the inner ring equivalent member to constitute the rotation side raceway respectively. Such outer ring raceways 7, 7 are formed on the inner peripheral surface of the outer ring 1 as the stationary ring and the outer ring equivalent member to constitute the stationary side raceway respectively. Thus, the hub 2 is supported rotatably on the inner diameter side of the outer ring 1. In this state, contact angles $\alpha_a$, $\alpha_b$ (FIG. 2) that are directed mutually in the opposite direction and have the identical magnitude are applied to the rolling elements 9a, 9b in respective rows to construct a back-to-back combination type double row angular contact ball bearing. The sufficient preload is applied to the rolling elements (balls) 9a, 9b in respective rows to such an extent that such preload is not lost by the axial load applied in operation. In the use of such rolling bearing unit, the stationary side flange 17 fixed to the outer ring 1 is supported/fixed to the knuckle constituting the suspension system, and also a brake disk and a wheel are supported/fixed to the rotation-side flange 3 of the hub 2 by plural stud bolts and plural nuts.

A fitting hole 10a is formed in the middle portion of the outer ring 1 constituting such rolling bearing unit in the axial direction between the double row outer ring raceways 7, 7 to pass through this outer ring 1 in the diameter direction. Then, a sensor unit 23 is inserted into this fitting hole 10a inwardly from the outside along the diameter direction of the outer ring 1 to project a top end portion 24 of the sensor unit 23 from the inner peripheral surface of the outer ring 1. A pair of revolution speed sensors 21a, 21b and a rotational speed sensor 15b are provided to this top end portion 24.

The revolution speed sensors 21a, 21b are used to measure the revolution speeds of the rolling elements 9a, 9b aligned in double rows. A sensing surface of these sensors is arranged on both side surfaces of the top end portion 24 in the axial direction (the lateral direction in FIGS. 1 and 2) of the hub 2 respectively. In the case of the present embodiment, the revolution speed sensors 21a, 21b sense the revolution speeds of the rolling elements 9a, 9b arranged in double rows as the revolution speeds of the retainers 22a, 22b. Thus, in the case of the present embodiment, rim portions 25, 25 constituting these retainers 22a, 22b are arranged on the mutual opposing side. Then, revolution speed encoders 26a, 26b formed like a circular ring respectively are affixed/supported to mutual opposing surfaces of the rim portions 25, 25 around their full circumference. The characteristics of sensed surfaces of the revolution speed encoders 26a, 26b are changed alternately at an equal interval in the circumferential direction such that the revolution speeds of the retainers 22a, 22b can be sensed by the revolution speed sensors 21a, 21b.

Therefore, sensing surfaces of the revolution speed sensors 21a, 21b are opposed closely to mutual opposing surfaces serving as sensed surfaces of the revolution speed encoders 26a, 26b. In this case, it is preferable that distances (sensing clearances) between the sensed surfaces of the revolution speed encoders 26a, 26b and the sensing surfaces of the revolution speed sensors 21a, 21b should be set larger than pocket clearances defined as clearances between inner surfaces of pockets in the retainers 22a, 22b and rolling contact surfaces of the rolling elements 9a, 9b but 2 mm or smaller. If such sensing clearances are smaller than the pocket clearances, there is a possibility that the sensed surfaces and the sensing surfaces are rubbed mutually when the retainers 22a, 22b are displaced by such pocket clearances, and therefore such sensing clearances are not preferable. On the contrary, if such sensing clearances exceed 2 mm, it becomes difficult to measure precisely revolutions of the revolution speed encoders 26a, 26b by the revolution speed sensors 21a, 21b.

Meanwhile, the rotational speed sensor 15b is used to measure the rotational speed of the hub 2 as the rotating ring. A sensing surface of this sensor is arranged on a top end surface of the top end portion 24, i.e., an inner end surface of the outer ring 1 in the diameter direction. Also, a cylindrical rotational speed encoder 13a is fitted/fixed in the middle portion of the hub 2 between the double row angular contact inner ring raceways 8, 8. A sensing surface of the rotational speed sensor 15b is opposed to the outer peripheral surface of the rotational speed encoder 13a as the sensed surface. The characteristic of the sensed surface of the rotational speed encoder 13a is changed alternately at an equal interval in the circumferential direction such that the rotational speed of the hub 2 can be sensed by the rotational speed sensor 15b. The sensing clearance between the outer peripheral surface of the rotational speed encoder 13a and the sensing surface of the rotational speed sensor 15b is suppressed 2 mm or smaller.

In this case, as the above encoders 26a, 26b, 13a, the encoder having various structures used in the related art to sense the rotational speed of the wheel in order to get the control signal for the ABS or the TCS may be employed. For example, the encoder made of a mutipolar magnet, in which an N pole and an S pole are arranged alternately on the sensed surface (the side surface or the outer peripheral surface), may be preferably employed as the above encoders 26a, 26b, 13a. In this case, the encoder made of simple magnetic material, the encoder whose optical characteristic is changed alternately at an equal interval over the circumferential direction (if such encoder is combined with the magnetic rotational speed sensor having the permanent magnet or the optical rotational speed sensor) may also be employed.

In the case of the present embodiment, a circular-ring permanent magnet in which the N pole and the S pole are aligned alternately at an equal interval on the axial-direction surface as the sensed surface is employed as the above revolution speed encoders 26a, 26b.

Such revolution speed encoders 26a, 26b are formed by the insert molding or the two color molding (two type materials are molded simultaneously) after they are coupled/fixed to side surfaces of the rim portions 25, 25 of the retainers 22a, 22b by the bonding or they are set in the cavity when these retainers 22a, 22b are to be injection-molded. Any method may be employed in response to a cost, bonding strength required, etc.

If the fixing method by using the adhesive is employed, a new mold is not needed to mold the retainers 22a, 22b because the ordinary retainer in the related-art is used as the retainers 22a, 22b, and thus a cost can be suppressed from this aspect. Therefore, the fixing method by using the adhesive is effective in the case that the number of productions is relatively small and a cost must be suppressed as a whole. As the adhesive in this case, the epoxy adhesive or the silicone resin adhesive can be used preferably.

In contrast, if the method of coupling/fixing the retainers 22a, 22b and the revolution speed encoders 26a, 26b by the insert molding is employed, the step of adhering the retainers 22a, 22b and the revolution speed encoders 26a, 26b is omitted, and thus a cost can be suppressed from an aspect of reduction in the assembling man-hour.

Also, separation of the retainers 22a, 22b and the revolution speed encoders 26a, 26b due to deterioration of the adhesive, etc. can be prevented without fail, and thus improvement in the reliability can be achieved. As a result, the coupling/fixing method by using the insert molding is effective in the case that the number of productions is relatively large and a cost must be suppressed as a whole.

Even if the retainers 22a, 22b and the revolution speed encoders 26a, 26b are coupled/fixed by any method out of the adhesive and the insert molding, the retainer formed of a synthetic resin by the injection molding is used as the retainers 22a, 22b. As the synthetic resin used in this case, any synthetic resin may be used if such resin may be molded by the injection molding. But polyamide 46 (PA46), polyamide 66 (PA66), polyphenylene sulfide (PPS), and so on, which can secure easily the reliability because of its excellent heat resistance and has a low friction coefficient, are preferable. Also, it is preferable from an aspect of improvement in the strength of the retainers 22a, 22b that a reinforcing agent such as glass fiber, carbon fiber, or the like should be mixed appropriately in the synthetic resin. As an amount of mixture of the reinforcing agent in this case, about 5 to 40 wt % is appropriate. An effect of increasing the strength by the mixture is seldom expected if an amount of mixture is below 5 wt %, while toughness of resultant retainers 22a, 22b is lowered to generate readily the damage such as fragment, crack, or the like if the reinforcing agent is mixed in excess of 40 wt %. In order to assure the strength and the toughness of the cases 22a, 22b, an amount of mixture of the reinforcing agent is restricted in a range of about 10 to 30 wt %.

Also, as the circular-ring permanent magnet used as the revolution speed encoders 26a, 26b, following magnets may be used. That is, the sintered magnet such as ferrite magnet, iron-neodymium magnet, samarium-cobalt magnet, or the like, the metallic magnet such as aluminum-manganese magnet, Alnico magnet, or the like, and the plastic magnet or the rubber magnet in which magnetic powders are mixed into the synthetic resin or the rubber can be employed. Because the sintered magnet and the metallic magnet give a strong magnetic force but cause the damage such as fragment, crack, or the like, the plastic magnet or the rubber magnet should be employed preferably.

A mixing rate of the magnetic powders into the plastic magnet or the rubber magnet is set to 20 to 95 wt %. Because the magnetic force of the magnet becomes strong as an amount of mixture is increased, an amount of mixture is adjusted in response to the magnetic force required for the revolution speed encoders 26a, 26b, while taking account of the relationship with the performance of the revolution speed sensors 21a, 21b. In this case, if an amount of mixture is set below 20 wt %, it is difficult to get the magnetic force required for the revolution speed encoders 26a, 26b irrespective of the performance of the used revolution speed encoders 26a, 26b. In contrast, if the magnetic powders are mixed in excess of 95 wt %, it is difficult to secure the strength of the resultant revolution speed encoders 26a, 26b because an amount of the synthetic resin or the rubber as the binder is reduced excessively. Thus, with regard to these situations, an amount of mixture of the magnetic powders should be set to 20 to 95 wt %, preferably 70 to 90 wt %. In case the plastic magnet is coupled/fixed to the retainer by the insert molding, the coupling strength between the plastic magnet and the retainer can be enhanced by forming the plastic magnet and the retainer with the same type synthetic resin.

Although not shown, in case the number of products is increased further more, it is effective from aspects of cost reduction and reliability improvement to provide a function of the encoder to the retainer itself. In this case, as the synthetic resin constituting the retainer, any resin may be employed if such resin may be molded by the injection molding. Like the above case that the retainer is formed as a separate body from the encoder, assurance of the reliability can be facilitated by using the synthetic resin such as PA46, PA66, PPS, or the like having the excellent heat resistance. Also, like the case that the retainer is formed separately from the encoder, it is preferable from an aspect of strength improvement in the retainer to mix the reinforcing agent such as glass fiber, carbon fiber, or the like appropriately. If an amount of the reinforcing agent mixed into the synthetic resin constituting the retainer is too large, toughness of the resultant retainer is lowered and the damage such as fragment, crack, or the like is easily caused. As a result, even when the reinforcing agent is mixed, an amount of mixture is restricted in a range of 5 to 40 wt %, preferably 10 to 30 wt %.

In case a function of the encoder is provided to the retainer itself, the magnetic powders are mixed in the above synthetic resin by about 20 to 95 wt %. As the magnetic powders, powders of ferrite, iron-neodymium, samarium-cobalt, aluminum-manganese, Alnico, iron, or the like may be employed. If the retainer is formed while mixing such magnetic powers, the magnetic force of the magnet becomes stronger as an amount of mixture is increased. Therefore, an amount of mixture is adjusted in answer to the magnetic force required for the retainer with regard to the performance of the revolution speed sensors 21a, 21b. In this case, an amount of the synthetic resin is reduced excessively if an amount of mixture is increased too much, and thus it becomes difficult to assure the strength of the resultant retainer (the toughness is lowered). With regard to these situations, it is preferable that a total amount of mixture of the magnetic powers and the reinforcing agent should be suppressed smaller than 98 wt %. If the magnetic powers and the reinforcing agent are mixed in total in excess of 98 wt %, the strength of the retainer is lowered and also flowability of the synthetic resin during the injection molding becomes worse, so that it is hard to get the case with good quality.

In this case, the retainer can be formed by molding the thermosetting resin such as the epoxy resin, or the like by means of the compression molding, independent of the event that either the retainers and the revolution speed encoders formed separately are coupled with each other or a function of the encoder is provided to the retainer itself. In this case, the retainer having the excellent strength can be obtained, but a cost is increased. Therefore, it is preferable that, if reduction in a mass-production cost is taken into consideration, the retainer should be formed of the thermosetting resin by using the injection molding in any case. In addition, unevenness may be formed on a part of the retainer made of the magnetic material and then such portions may be used as the revolution speed encoder. In this case, the sensor into which the permanent magnet is incorporated to generate the magnetic flux is used as the revolution speed sensors 21a, 21b. Further, unevenness can be formed on a part of the retainer made of the permanent magnetic and also the uneven portions can be magnetized to have the S pole and the N pole. In this case, the concave portions may be magnetized to have the S pole or the N pole and the convex portions may be magnetized to have the N pole or the S pole, otherwise only the convex portions may be magnetized to have the S pole and the N pole alternately.

Also, as the revolution speed sensors 21a, 21b and the rotational speed sensor 15b all being a sensor of sensing the revolution speed, the magnetic revolution sensor is used preferably. Also, as this magnetic revolution sensor, the active type revolution sensor into which the magnetic sensing element such as Hall element, Hall IC, magneto resistive element (MR element, GMR element), MI element, or the like is incorporated is used preferably. In order to construct the active type revolution sensor into which the magnetic sensing element is incorporated, for example, one side surface of the magnetic sensing element comes into contact with one end surface of the permanent magnet in the magnetization direction directly or via a stator made of magnetic material (when an encoder made of magnetic material is used), while the other side surface of the magnetic sensing element is opposed closely to the sensed surfaces of the encoders 26a, 26b, 13a directly or via the stator made of magnetic material. In the case of the present embodiment, the permanent magnetic on the sensor side is not needed since the encoder made of the permanent magnetic is used.

In the case of the load measuring device for the rolling bearing unit in the present embodiment, sensed signals of the above sensors 21a, 21b, 15b are input into a calculator (not shown). This calculator may be installed integrally with the rolling bearing unit by providing to the sensor unit 23 in which these sensors 21a, 21b, 15b are embedded/supported, or the like, or may be installed separately from the rolling bearing unit on the vehicle body side. Then, this calculator calculates one or both of the radial load and the axial load applied between the outer ring 1 and the hub 2, based on the sensed signal fed from these sensors 21a, 21b, 15b. First the sensing of the radial load will be explained hereunder, and then the sensing of the axial load will be explained hereunder In the case of the present embodiment, in order to sense the radial load, the calculator calculates a sum of the revolution speeds of the rolling elements 9a, 9b in respective rows, which are sensed by the revolution speed sensors 21a, 21b, and then calculates the radial load based on a ratio of this sum to the rotational speed of the hub 2, which is sensed by the rotational speed sensor 15b. When constructed like this, the radial load can be sensed with good precision while suppressing small the influence of the axial load applied to the rolling bearing unit. This respect wili be explained with reference to FIGS. 4 to 6 hereunder. In this case, following explanation will be made under the assumption that the contact angles $\alpha_a$, $\alpha_b$ of the rolling elements 9a, 9b in respective rows are set equal mutually in a state that no axial load $F_a$ is applied.

Figure 4:
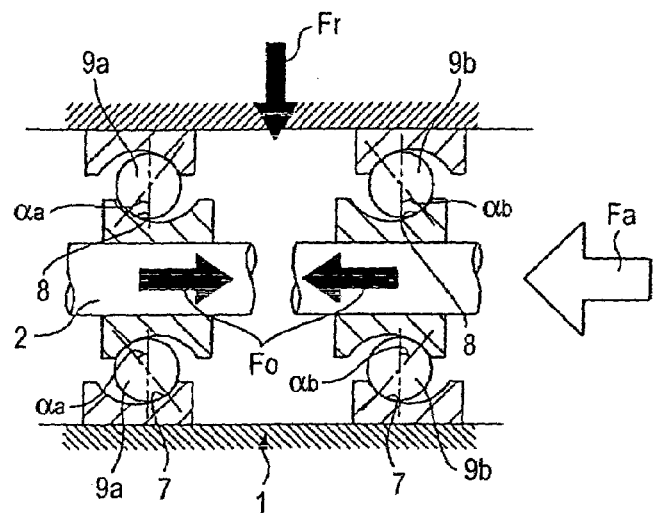
FIG. 4 is a schematic view explaining an action of the present invention.

FIG. 4 shows the applying state of the loads to the schematic rolling bearing unit for supporting the wheel shown in above FIG. 1. The preloads $F_o$, $F_o$ are applied to the rolling elements 9a, 9b arranged in double rows between the double row inner ring raceways 8, 8 and the double row outer ring raceways 7, 7. Also, the radial load $F_r$ is applied to the rolling bearing unit by the weight of the vehicle body, etc. during operation. In addition, the axial load $F_a$ is applied by the centrifugal force applied during the turning operation, etc. All the preloads $F_o$, $F_o$, the radial load $F_r$, and the axial load $F_a$ have the influence on the contact angles $\alpha(\alpha_a,\alpha_b)$ of the rolling elements $9a$, $9b$. Then, when the contact angles $\alpha_a$, $\alpha_b$ are changed, the revolution speed $n_c$ of the rolling elements $9a$, $9b$ is changed. This revolution speed $n_c$ is given by $$n_c=\{1-(d\cdot\cos\alpha/D)\cdot(n_i/2)\}+\{1+(d\cdot\cos\alpha/D)(n_o/2)\} \quad (1)$$

where

D: diameter of a pitch circle of the rolling elements $9a$, $9b$,
d: diameter of the rolling elements $9a$, $9b$,
$n_i$: rotational speed of the hub 2 to which the inner ring raceways 8, 8 are provided, and
$n_o$: rotational speed of the outer ring 1 to which the outer ring raceways 7, 7 are provided.

As apparent from this Eq. (1), the revolution speed $n_c$ of the rolling elements $9a$, $9b$ is changed in response to the change of the contact angles $\alpha(\alpha_a, \alpha_b)$ of the rolling elements $9a$, $9b$, but the contact angles $\alpha_a$, $\alpha_b$ are changed in response to the radial load $F_r$ and the axial load $F_a$, as described above. Therefore, the revolution speed $n_c$, is changed in response to the radial load $F_r$ and the axial load $F_a$. In the case of the present embodiment, since the hub 2 is rotated but the outer ring 1 is not rotated, particularly the revolution speed $n_c$ becomes slow with an increase of the radial load $F_r$. As a result, the radial load $F_r$ can be sensed based on the revolution speed $n_c$.

Here, the contact angles a followed by the change in the revolution speed $n_c$ are changed by not only the radial load $F_r$, but also the preloads $F_o$, $F_o$ and the axial load $F_a$. Also, the revolution speed $n_i$ is changed in proportion to the rotational speed ni of the hub 2. For this reason, if no regard is paid to the preloads $F_o$, $F_o$, the axial load $F_a$, and the rotational speed $n_i$, it is impossible to sense precisely the revolution speed $n_c$. Since the preloads $F_o$, $F_o$, are not changed in response to the driving state, it is easy to eliminate the influence by the initialization, or the like. In contrast, since the axial load $F_a$ and the rotational speed $n_i$ of the hub 2 are changed constantly in response to the driving state, it is impossible to eliminate the influence by the initialization.

In light of such circumstances, in the case of the present embodiment, the influence of the axial load $F_a$ is reduced by calculating a sum of the revolution speeds of the rolling elements $9a$, $9b$ in respective rows sensed by the revolution speed sensors 21a, 21b. In addition, the influence of the rotational speed $n_i$ of the hub 2 is eliminated by calculating the radial load $F_r$, based on a ratio of this sum and the rotational speed $n_i$ of the hub 2 sensed by the rotational speed sensor 15b.

Figure 5:
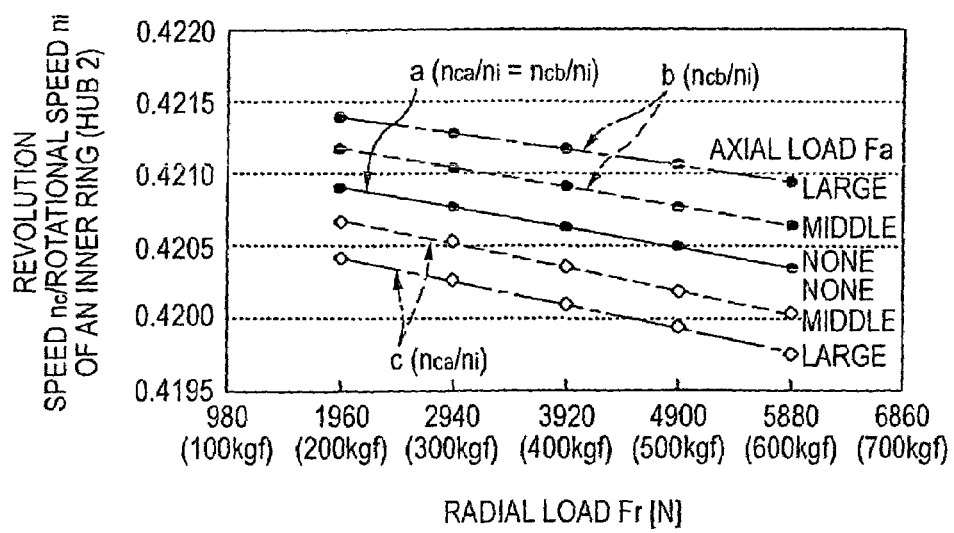
FIG. 5 is a diagram showing relationships among a radial load, a ratio of a revolution speed of a rolling element in each row to a rotational speed of an inner ring, and an axial load.

For example, as shown in FIG. 4, in the case that the axial load $F_a$ is applied leftward in FIG. 4, relationships between revolution speeds $n_{ca}$, $n_{cb}$ of the rolling elements $9a$, $9b$ constituting respective rows and the rotational speed $n_i$ of the hub 2 are given in FIG. 5. First, if the axial load $F_a$ is 0 (the axial load $F_a$ is not applied), the revolution speeds $n_{ca}$, $n_{cb}$ of the rolling elements $9a$, $9b$ constituting respective rows are set equal mutually ($n_{ca}=n_{cb}$), as indicated by a solid line a in FIG. 5. In contrast, if the axial load $F_a$ is applied slightly (middle level), the revolution speed $n_{cb}$ of the rolling elements $9b$, $9b$ constituting the right side row in FIG. 4, which support the axial load $F_a$, is increased slightly rather than the case the axial load $F_a$ is 0, as indicated by a broken line b in FIG. 5. On the contrary, the revolution speed nca of the rolling elements $9a$, $9a$ constituting the left side row in FIG. 4, which do not support the axial load $F_a$, is decreased slightly rather than the case the axial load $F_a$ is 0, as indicated by a broken line c in FIG. 5. Then, if the axial load $F_a$ is increased further (large level), an amount of change of the revolution speeds $n_{ca}$, $n_{cb}$ is increased rather than the case the axial load $F_a$ is 0, as indicated by chain lines b, c in FIG. 5. In this case, the event that the preload is still applied to the rolling elements $9a$, $9b$ that do not support the axial load $F_a$ is assumed as the condition.

Figure 6:
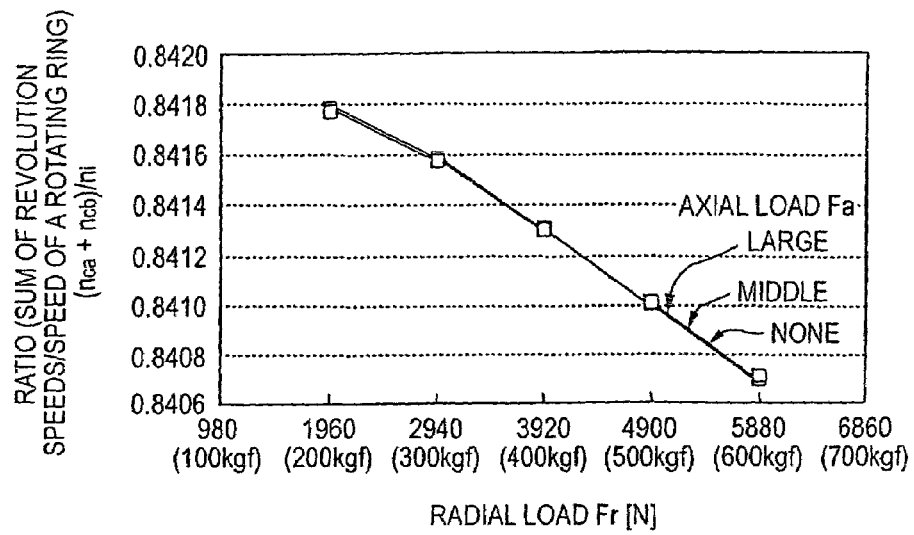
FIG. 6 is a diagram showing relationships among the radial load, a ratio of a sum of revolution speeds of rolling elements in each row to the rotational speed of the inner ring, and an axial load.

An extent $\Delta n_{cb}$ to which the revolution speed $n_{cb}$ of the rolling elements $9b$, $9b$ constituting the row that support the axial load $F_a$ is accelerated and an extent $\Delta n_{ca}$ to which the revolution speed $n_{ca}$ of the rolling elements $9b$, $9b$ constituting the row that do not support the axial load $F_a$ is decelerated are almost equal and their polarities are opposite ($|\Delta n_{cb}|\approx|\Delta n_{ca}|$, $\Delta n_{cb}+\Delta n_{ca}\approx 0$). Therefore, the influence of the axial load $F_a$ can be substantially eliminated by adding the revolution speeds $n_{ca}$, $n_{cb}$ in both rows. FIG. 6 shows relationships among a ratio $\{(n_{ca}+n_{cb})/n_i\}$ of a sum of the revolution speeds $n_{ca}$, $n_{cb}$ of the rolling elements $9a$, $9b$ in both rows to the rotational speed $n_i$ of the hub 2, a magnitude of the radial load $F_r$, and a magnitude of the axial load Fa. As apparent from FIG. 6, if the radial load $F_r$ is sensed based on a sum of the revolution speeds $n_{ca}$, $n_{cb}$ in both rows, the influence of the axial load $F_a$ can be suppressed minutely and also the radial load $F_r$ can sensed exactly.

The above explanation is made to suppress the influence of the axial load $F_a$ by adding the revolution speeds $n_{ca}$, $n_{cb}$ in both rows. In this case, the influence of the axial load $F_a$ can also be suppressed by multiplying the revolution speeds $n_{ca}$, $n_{cb}$ in both rows (calculating a product). In other words, since the revolution speeds $n_{ca}$, $n_{cb}$ in both rows are increased or decreased to the almost same extent by the change in the axial load $F_a$, the influence caused by the change in the axial load $F_a$ can be reduced by multiplying the revolution speeds $n_{ca}$, $n_{cb}$ in both rows. More particularly, the radial load $F_r$ is calculated based on a ratio $\{(n_{ca}\times n_{cb})/n_i^2\}$ of a product $(n_{ca}\times n_{cb})$ of the revolution speeds $n_{ca}$, $n_{cb}$ in both rows to a square of the rotational speed $n_i$ of the hub.

Next, the sensing of the axial load will be explained with reference to FIGS. 7 to 16 in addition to above FIGS. 1 to 4 hereunder. In the case of the present embodiment, in order to sense the axial load, the calculator calculates a difference between the revolution speeds of the rolling elements $9a$, $9b$ in both rows sensed by the revolution speed sensors 21a, 21b and then calculates the axial load based on a ration of this difference to the rotational speed of the hub 2 sensed by the rotational speed sensor 15b. When constructed in this manner, the influences of the preload applied to the rolling elements $9a$, $9b$ in both rows and the radial load applied to the rolling bearing unit can be suppressed small, and thus the axial load can be sensed with good precision.

As explained with reference to above FIG. 4 and Eq.(1), the revolution speed $n_c$ of the rolling elements $9a$, $9b$ is changed in response to the change in the contact angles $\alpha(\alpha_a, \alpha_b)$ of the rolling elements $9a$, $9b$. In this case, as described above, the contact angles $\alpha$ are changed in response to the axial load $F_a$. Therefore, the revolution speed $n_c$ is changed in response to the axial load $F_a$. In the case of the present embodiment, since the hub 2 rotates but the outer ring 1 does not rotate, the revolution speed $n_{cb}$ of the rolling elements $9b$, $9_b$ constituting the right side row in FIG. 4 that support the axial load $F_a$ is accelerated where as the revolution speed $n_{ca}$ of the rolling elements $9a$, $9a$ constituting the left side row in FIG. 4 that do not support the axial load $F_a$ is decelerated when the axial load $F_a$ is increased larger.

Figure 7:
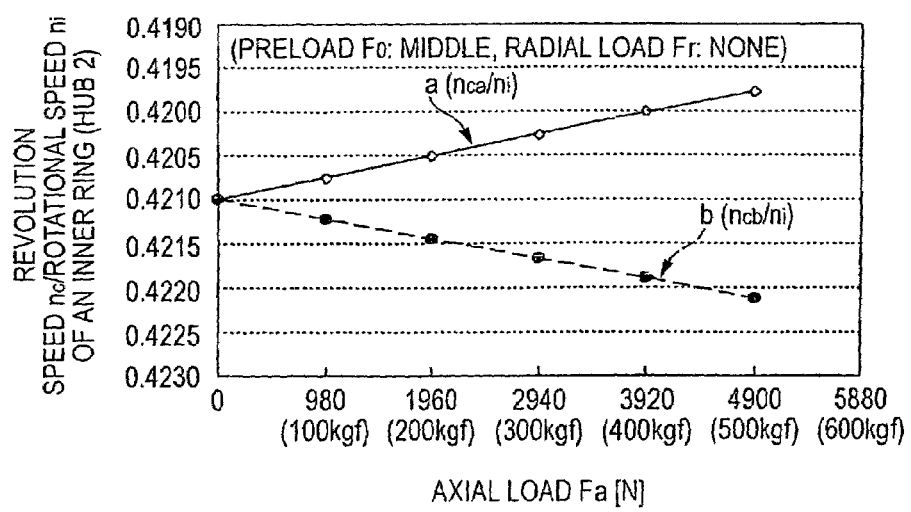
FIG. 7 is a diagram showing relationships between the radial load and a ratio of the revolution speed of the rolling element in each row to the rotational speed of the inner ring.

FIG. 7 shows the changing state of the revolution speed of the rolling elements 9a, 9b in both rows with the change in the axial load $F_a$. Also, an axis of abscissa in FIG. 7 denotes a magnitude of the axial load $F_a$ and an axis of ordinate denotes a ratio "$n_c/n_i$" of the revolution speed $n_c$ to the rotational speed $n_i$ of the hub 2. In this case, a value representing the ratio "$n_c/n_i$" on the axis of ordinate in FIG. 7 is increased downwardly in FIG. 7 and decreased upwardly.

Out of two lines a, b depicted in FIG. 7, a solid line a indicates a ratio "$n_{ca}/n_i$" of the revolution speed $n_{ca}$ of the rolling elements 9a, 9a constituting the left side row in FIG. 4 that do not support the axial load $F_a$, while a broken line b indicates a ratio "$n_{cb}/n_i$" of the revolution speed $n_{cb}$ of the rolling elements 9b, 9b constituting the right side row in FIG. 4 that supports the axial load $F_a$. In this case, the solid line a and the broken line b in FIG. 7 indicate relationships between a magnitude of the axial load $F_a$ and a ratio "$n_c/n_i$" of the revolution speed $n_c$ ($n_{ca}$, $n_{cb}$) to the rotational speed $n_i$ of the hub 2 in the state that the proper preload $F_0$ (middle level) is applied to the rolling elements 9a, 9b in both rows and the radial load $F_r$ is not applied ($F_r$=0).

As appreciated from the solid line a and the broken line b depicted in FIG. 7, when the axial load is applied to the double row angular contact ball bearing in which the preload $F_0$ is applied to the rolling elements 9a, 9b, the revolution speeds of the rolling elements 9a, 9b in both rows are changed in accordance with (in almost proportion to) amagnitudeof the axial load. Accordingly, if other matters, i.e., the preload $F_0$ and the radial load $F_r$ acting as a crosstalk component of the axial load, are not considered (otherwise the preload $F_0$ and the radial load $F_r$ are assumed constant), the axial load can be detected by measuring the revolution speed $n_{ca}$ ($n_{cb}$) of the rolling elements 9a, 9a (or 9b, 9b) in any one row.

In this event, actually the preload $F_0$ applied to the double row angular contact ball bearing is varied due to manufacturing errors, and also the radial load $F_r$ becomes different due to difference in the number of passengers and a carrying capacity.

Figure 8A:
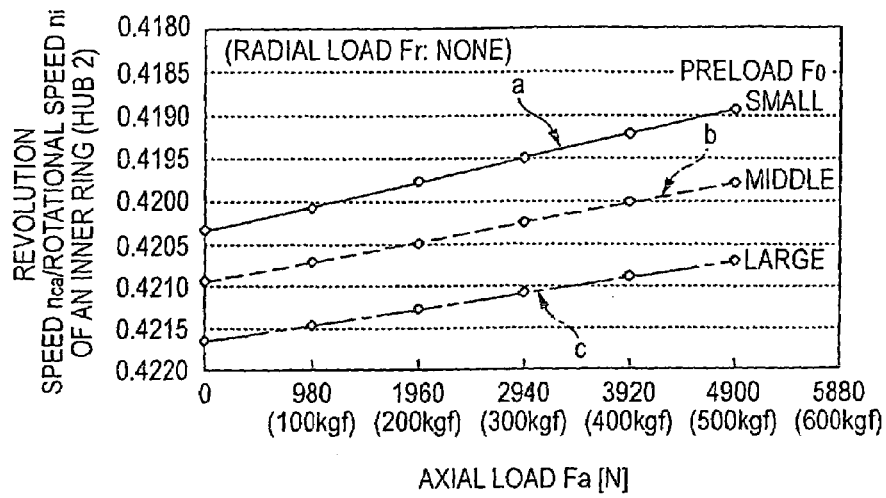
FIGS. 8A and 8B are diagrams showing an influence of a magnitude of a preload or the radial load upon the relationship between the axial load and the ratio of the revolution speed of the rolling element in any row when no regard is paid to variation in the preload or the radial load.
Figure 8B:
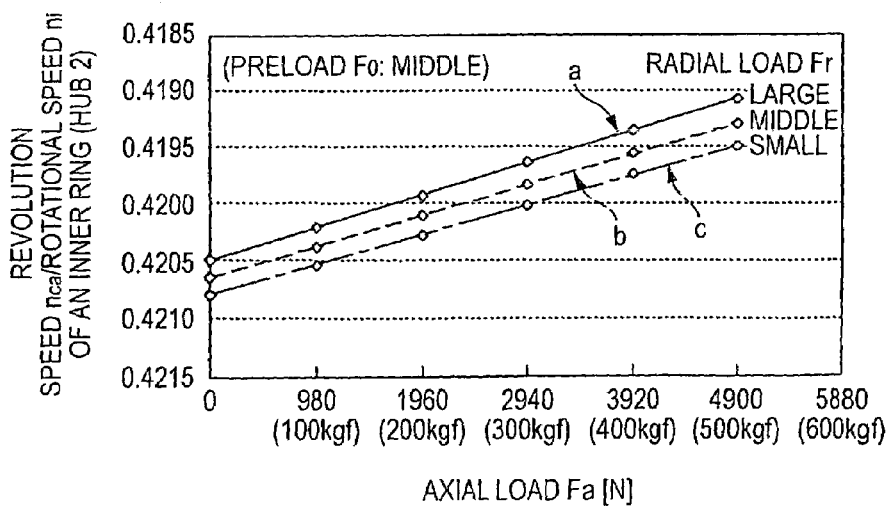

FIG. 8 shows influences of variation of the preload $F_0$ and a magnitude of the radial load $F_r$ upon the relationship between a magnitude of the axial load $F_a$ and a ratio "$n_{ca}/n_i$" of the revolution speed $n_{ca}$ of the rolling elements 9a, 9a constituting the left side row in FIG. 4 that do not support this axial load $F_a$. A solid line a a broken line b, and a chain line c depicted in FIG. 8A, 8B respectively correspond to the solid line a in FIG. 5 respectively. Also, FIG. 8A shows the influence of the value of the preload $F_0$ upon the relationship between a magnitude of the axial load $F_a$ and the ratio "$n_{ca}/n_i$". In this case, a value on an axis of ordinate in FIG. 8A representing the magnitude of the ratio "$n_{ca}/n_i$" is increased downwardly in FIG. 8A and is decreased upwardly. Also, the radial load $F_r$ is not applied ($F_r$=0). In FIG. 8A, the solid line a indicates the case the preload $F_0$ is small, the broken line b indicates the case the preload $F_0$ is at a middle level, and the chain line c indicates the case the preload $F_0$ is at a large level. In contrast, FIG. 8B shows the influence of the value of the radial load $F_r$ upon the relationship between a magnitude of the axial load $F_a$ and the ratio "$n_{ca}/n_i$". In this case, a value on an axis of ordinate in FIG. 8B representing the magnitude of the ratio "$n_{ca}/n_i$" is increased downwardly in FIG. 8B and is decreased upwardly. Also, the value of the preload $F_0$ is set at a middle level. In FIG. 8B, the solid line a indicates the case the radial load $F_r$ is large {$F_r$=4900 N (500 kgf)}, the broken line b indicates the case the radial load $F_r$ is at a middle level {$F_r$=3920 N (400 kgf) }, and the chain line c indicates the case the radial load $F_r$ is at a small level {$F_r$=2940 N (300 kgf)}.

As apparent from FIG. 8, even though the axial load $F_a$ is identical, the ratio "$n_{ca}/n_i$" of the revolution speed $n_{ca}$ to the rotational speed $n_i$ of the hub 2 becomes different when the preload $F_0$ and the radial load $F_r$ become different. In addition, when various vehicle running stabilizing systems are to be controlled with high precision, this ratio "$n_{ca}/n_i$" should not be ignored because an amount of deviation of this ratio caused due to variations of the preload $F_0$ and the radial load $F_r$ becomes considerably large. This is true of the case that the axial load $F_a$ is measured based on the revolution speed $n_{cb}$ of the rolling elements 9b, 9b constituting the right side row in FIG. 4 that support the axial load $F_a$.

In the case of the present embodiment, since the revolution speeds $n_{ca}$, $n_{cb}$ of the rolling elements 9a, 9b on a pair of rows, directions of the contact angles $\alpha_a$, $\alpha_b$ of which are different (opposite) mutually, are sensed by a pair of revolution speed sensors 21a, 21b respectively, the axial load $F_a$ loaded to the rolling bearing unit is measured while suppressing the influence of variations in the preload $F_0$ and the radial load $F_r$ small. In other words, in the case of the present embodiment, the revolution speeds $n_{ca}$, $n_{cb}$ of the rolling elements 9a, 9b on apair of rows, magnitudes of the contact angles $\alpha_a$, $\alpha_b$ of which are equal (in a state that no axial load is applied) but directions of which are different mutually, are sensed by a pair of revolution speed sensors 21a, 21b, and then the calculator (not shown) calculates the axial load $F_a$ based on both revolution speeds $n_{ca}$, $n_{cb}$.

In this manner, any one method of following (1) to (4) is employed to sense the axial load $F_a$ based on both revolution speeds $n_{ca}$, $n_{cb}$.

(1) The axial load $F_a$ applied between the outer ring 1 and the hub 2 is calculated based on the ratio "$n_{cb}/n_{ca}$" of the revolution speed $n_{cb}$of the rolling elements 9b, 9b in the other row to the revolution speed $n_{ca}$ of rolling elements 9a, 9a in one row.

(2) The axial load $F_a$ applied between the outer ring 1 and the hub 2 is calculatedbasedon a difference "$n_{cb}-n_{ca}$" between the revolution speed $n_{ca}$ of rolling elements 9a, 9a in one row and the revolution speed $n_{cb}$ of the rolling elements 9b, 9b in the other row.

(3) The axial load $F_a$ applied between the outer ring 1 and the hub 2 is calculated based on a ratio "$(n_{cb}-n_{ca})/n_i$" of the difference "$n_{cb}-n_{ca}$" between the revolution speed $n_{ca}$ of rolling elements 9a, 9a in one row and the revolution speed $n_{cb}$ of the rolling elements 9b, 9b in the other row to the rotational speed $n_i$ of the hub 2.

(4) The axial load $F_a$ applied between the outer ring 1 and the hub 2 is calculated based on a synthesized signal obtained by synthesizing a signal representing the revolution speed $n_{ca}$ of rolling elements 9a, 9a in one row and a signal representing the revolution speed $n_{cb}$ of the rolling elements 9b, 9b in the other row. The methods in (1) to (4) will be explained hereunder.

Figure 9A:
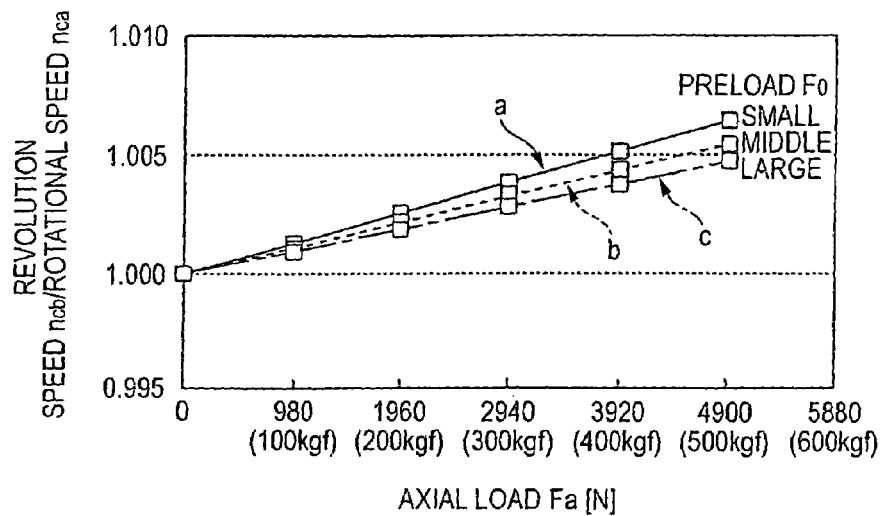
FIGS. 9A and 9B are diagrams showing the influence of a magnitude of the preload or the radial load upon the relationship between the axial load and the ratio of the revolution speed of the rolling element in each row in the present invention.
Figure 9B:
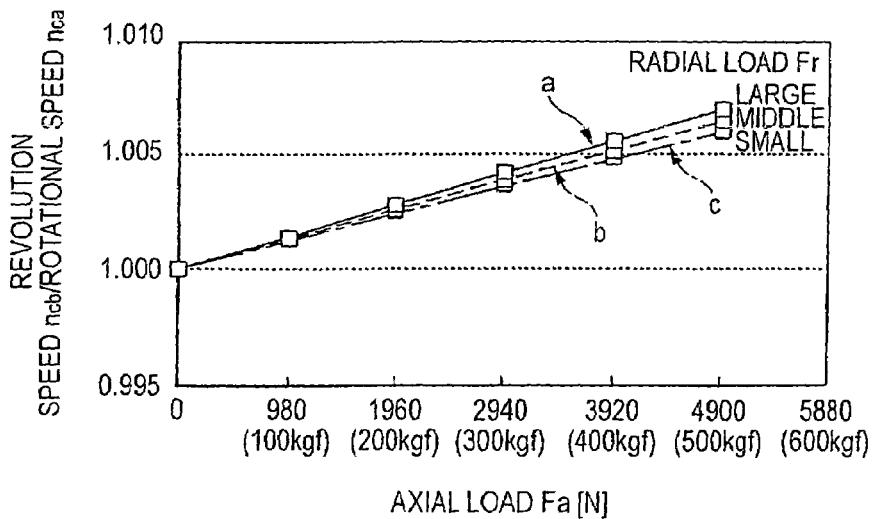

First, the above method in (1) will be explained with reference to FIG. 9 hereunder. FIG. 9 shows a relationship between the ratio "$n_{cb}/n_{ca}$" of the revolution speed $n_{cb}$ of the rolling elements 9b, 9b in the other row to the revolution speed $n_{ca}$ of the rolling elements 9a, 9a in one row and the axial load $F_a$. A solid line a a broken line b, and a chain line c depicted in FIG. 9A, 9B respectively show the relationship between the ratio "$n_{cb}/n_{ca}$" and the axial load $F_a$ respectively. Also, FIG. 9A shows the influence of a value of the preload $F_0$ applied to the rolling elements 9a, 9b upon the relationship between a magnitude of the axial load $F_a$ and the ratio "$n_{cb}/n_{ca}$". In FIG. 9A, the solid line a indicates the case the preload $F_0$ is small, the broken line b indicates the case the preload $F_0$ is at a middle level, and the chain line c indicates the case the preload $F_0$ is at a large level. While, FIG. 9B shows the influence of the value of the radial load $F_r$ upon the relationship between the magnitude of the axial load $F_a$ and the ratio "$n_{cb}/n_{ca}$". In FIG. 9B, the solid line a indicates the case the radial load $F_r$ is large, the broken line b indicates the case the radial load $F_r$ is at a middle level, and the chain line c indicates the case the radial load $F_r$ is at a small level.

As indicated by the lines a, b, c shown in FIG. 9A, 9B, the ratio "$n_{cb}/n_{ca}$" of the revolution speed $n_{cb}$ of the rolling elements 9b, 9b in the other row to the revolution speed $n_{ca}$ of the rolling elements 9a, 9a in one row is increased in compliance with an increase of the axial load $F_a$. Accordingly, if the relationship between the ratio "$n_{cb}/n_{ca}$" and the axial load $F_a$ is derived in advance experimentally or by the calculation and then is installed (stored) into a microcomputer constituting the calculator, the axial load $F_a$ can be calculated based on both revolution speeds $n_{ca}$, $n_{cb}$. In addition, as evident by the comparison between the lines a, b, c shown in FIG. 9A, 9B, the influences of the preload $F_0$ and the radial load $F_r$ upon the relationship between the ratio "$n_{cb}/n_{ca}$" and the axial load $F_a$ are small.

More specifically, the preload $F_0$ is applied uniformly to the rolling elements 9a, 9b in both rows and also the radial load $F_r$ is applied substantially uniformly. Therefore, even though the preload $F_0$ and the radial load $F_r$ are varied, such variation affects small the calculated value of the axial load $F_a$. In this case, as apparent from FIG. 7, when the axial load $F_a$ is increased, an extent to which the revolution speed $n_{cb}$ of the rolling elements 9b, 9b on the load side (the side on which the axial load $F_a$ is supported) is accelerated and an extent to which the revolution speed $n_{ca}$ of the rolling elements 9b, 9b on the counter load side (the side on which the axial load $F_a$ is not supported) is decelerated are slightly different (absolute values of inclination angles of two lines a, b depicted in FIG. 7 are different). Therefore, when the axial load $F_a$ is increased, the preload $F_0$ and the radial load $F_r$ have influences upon the relationship between the ratio "$n_{cb}/n_{ca}$" and the axial load $F_a$. However, as appreciated apparently by the comparison between above FIG. 9 and FIG. 8, such influences are small and can be ignored in practical use unless very precise control is required. In this case, if the axial load $F_a$ is derived by the method in (1), the rotational speed sensor 15b 15 and the rotational speed encoder 13a may be omitted since the rotational speed $n_i$ of the hub 2 is not used.

Next, the method in (2) will be explained with reference to FIG. 10A hereunder. In this case, the axial load $F_a$ applied between the outer ring 1 and the hub 2 is calculated based on the difference "$n_{cb}-n_{ca}$" between the revolution speed $n_{ca}$ of rolling elements 9a, 9a in one row and the revolution speed $n_{cb}$ of the rolling elements 9b, 9b in the other row. As apparent from the lines a, b in FIG. 7, the difference "$n_{cb}-n_{ca}$" between the revolution speeds $n_{ca}$, $n_{cb}$ is increased as the axial load $F_a$ is increased. Also, both lines a, b are shifted in the vertical axis direction with variations of the preload $F_0$ and the radial load $F_r$, but such shift appears almost equal in both lines a, b and in the same direction. Therefore, the influences of the preload $F_0$ and the radial load $F_r$ upon the relationships between the difference "$n_{cb}-n_{ca}$" between the revolution speeds $n_{ca}$, $n_{cb}$ and the axial load $F_a$ are small. That is, even if the preload $F_0$ and the radial load $F_r$ are varied, the influence of such variation upon the value of the axial load $F_a$ derived based on the difference "$n_{cb}-n_{ca}$" between the revolution speeds $n_{ca}$, $n_{cb}$ is suppressed small.

Figure 10A:
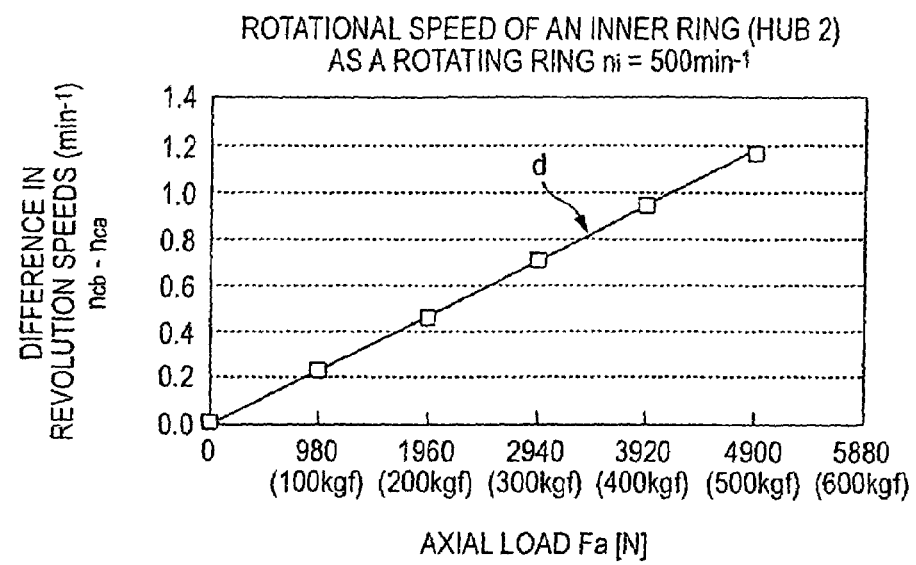
FIGS. 10A and 10B are diagrams showing relationships between a difference in the revolution speeds of rolling elements in a pair of rows or a ratio of this difference to a rotational speed of a rotating ring and a magnitude of the axial load in the present invention.

Therefore, as indicated by a solid line d in FIG. 10A, if the relationship between the difference "$n_{cb}-n_{ca}$" between the revolution speeds $n_{ca}$, $n_{cb}$ and the axial load $F_a$ is derived in advance experimentally or by the calculation and then is installed into the microcomputer constituting the calculator, the axial load $F_a$ can be calculated based on the difference "$n_{cb}-n_{ca}$" between both revolution speeds $n_{ca}$, $n_{cb}$. In addition, the axial load $F_a$ can be sensed precisely while suppressing the influence of the variation of the preload $F_0$ and the radial load $F_r$. In this manner, if the axial load $F_a$ is derived by the method in (2), the rotational speed sensor 15b and the rotational speed encoder 13a may be omitted since the rotational speed $n_i$ of the hub 2 is not used.

Figure 10B:
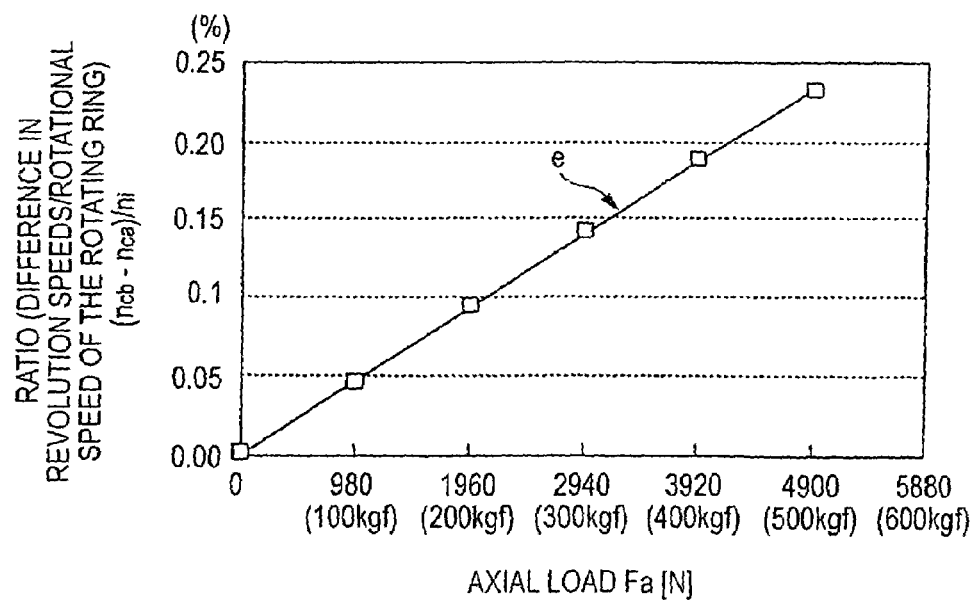

Next, the method in (3) will be explained with reference to FIG. 10B hereunder. In this case, the difference "$n_{cb}-n_{ca}$" between the revolution speed $n_{ca}$ of the rolling elements 9a, 9a in one row and the revolution speed $n_{cb}$ of the rolling elements 9b, 9b in the other row is sensed, and then the ratio "$(n_{cb}-n_{ca})/n_i$" of the difference "$n_{cb}-n_{ca}$" to the rotational speed $n_i$ of the hub 2 is calculated. Then, the axial load $F_a$ applied between the outer ring 1 and the hub 2 is calculated based on this ratio "$(n_{cb}-n_{ca})/n_i$". In this case, as indicated by a solid line e in FIG. 10B, if the relationship between the ratio "$(n_{cb}-n_{ca})/n_i$" and the axial load $F_a$ is derived in advance experimentally or by the calculation and then is installed into the microcomputer constituting the calculator, the axial load $F_a$ can be calculated based on the difference "$n_{ca}-n_{ca}$" between both revolution speeds $n_{ca}$, $n_{cb}$. In addition, the axial load $F_a$ can be detected exactly irrespective of change in the rotational speed of the hub 2 with suppressing the influence of the variations of the preload $F_0$ and the radial load $F_r$.

If the rolling bearing unit is used in the condition that the rotational speed of the rotating ring is always kept constant, like the rotation supporting portion of the machine tool or the carrier vehicle in the factory, the axial load $F_a$ can be detected exactly only by the difference "$n_{cb}-n_{ca}$" between the revolution speeds $n_{ca}$, $n_{cb}$ of the rolling elements 9a, 9b in both rows, like the above method in (2). On the contrary, if the rotational speed of the rotating ring (hub 2) is changed in operation, like the rolling bearing unit used to support the wheel of the car or the railway vehicle, the difference "$n_{cb}-n_{ca}$" between the revolution speeds $n_{ca}$, $n_{cb}$ is changed in response to this rotational speed regardless of the axial load $F_a$. Consequently, in such case, like the above method in (3), if the axial load $F_a$ is calculated based on the rotational speed $n_i$ of the hub 2 sensed by the rotational speed sensor 15b and the difference "$n_{cb}-n_{ca}$" between the revolution speeds $n_{ca}$, $n_{cb}$ the influence of the rotational speed $n_i$ of the hub 2 can be eliminated.

Further, the above method in (4) will be explained with reference to FIGS. 11 to 16 hereunder. In this case, the calculator gets a synthesized signal by synthesizing (superposing) a signal representing the revolution speed $n_{ca}$ of the rolling elements 9a, 9a in one row, which is fed from the revolution speed sensor 21a, and a signal representing the revolution speed $n_{cb}$ of the rolling elements 9b, 9b in the other row, which is fed from the revolution speed sensor 21b. Then, the axial load $F_a$ applied between the outer ring 1 and the hub 2 is calculated based on the synthesized signal. The method in (4) synthesizes in advance the signals sent out from the revolution speed sensors 21a, 21b, and thus makes it possible to shorten a full length of a harness and reduce an amount of computation in the calculator.

Figure 11:
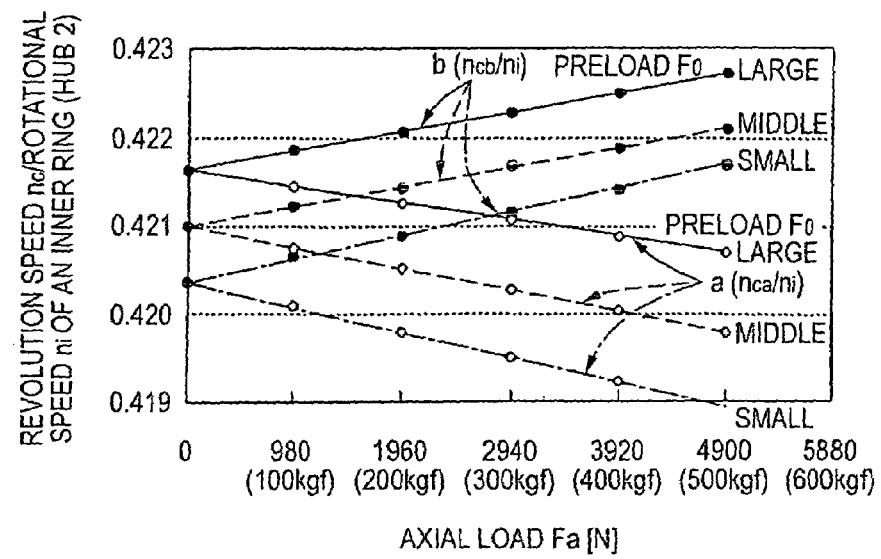
FIG. 11 is a diagram showing relationships among a ratio of the revolution speeds of the rolling elements in a pair of rows to the rotational speed of the rotating ring, a magnitude of the axial load, and a magnitude of the preload.
Figure 12:
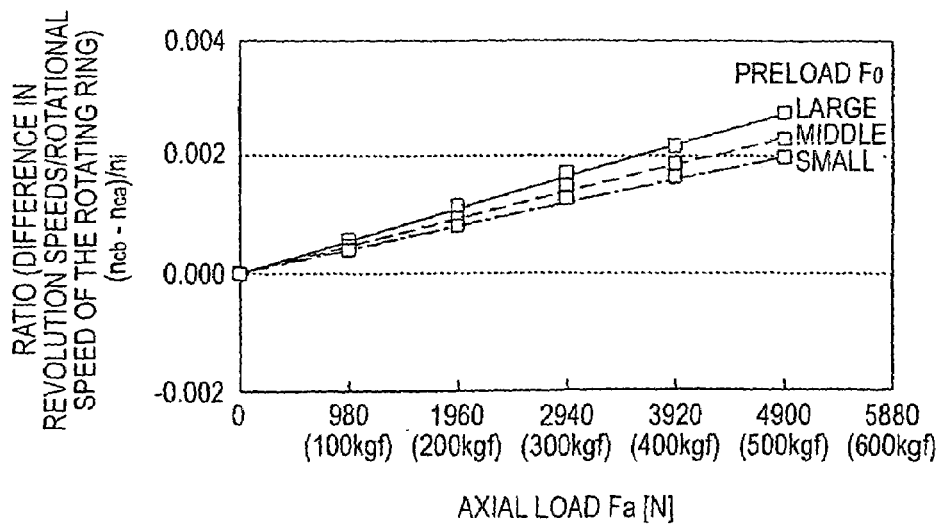
FIG. 12 is a diagram showing relationships among a ratio of a difference in the revolution speeds of the rolling elements in a pair of rows to the rotational speed of the rotating ring, a magnitude of the axial load, and a magnitude of the preload.

Like above FIG. 7, FIG. 11 is a diagram showing a relationship between the axial load $F_a$ and a magnitude of the preload $F_0$, in addition to the relationship between the axial load $F_a$ and the ratio of the revolution speeds of the rolling elements 9a, 9b in both rows to the rotational speed of the hub 2. In above FIG. 11, the numerical value on the axis of ordinate is increased upwardly conversely to above FIGS. 7 and 8. Also, like above FIG. 10B, FIG. 12 is a diagram showing relationships among a ratio of a difference in the revolution speeds of the rolling elements 9a, 9b in a pair of rows to the rotational speed of the hub 2, a magnitude of the axial load $F_a$, and a magnitude of the preload $F_0$. As apparent from FIGS. 11 and 12, the revolution speeds $n_{ca}$, $n_{cb}$ of the rolling elements 9a, 9b in both rows are changed in the opposite direction in answer to the axial load $F_a$ and also are accelerated as the preload $F_0$ is increased. Like the above method in (3), the above method in (4) calculates the axial load $F_a$ applied between the outer ring 1 and the hub 2, based on the ratio "$(n_{cd}-n_{ca})/n_i$" of the difference "$n_{cb}-n_{ca}$" between the revolution speeds $n_{ca}$, $n_{cb}$ of the rolling elements 9a, 9b in a pair of rows to the rotational speed $n_i$ of the hub 2 by utilizing the relationship in FIG. 12.

In particular, in the case of the method in (4), the synthesized signal is derived by the calculator to synthesize the signals representing the revolution speeds $n_{ca}$, $n_{cb}$ of the rolling elements 9a, 9b in both rows, which are sent out from a pair of revolution speed sensors 21a, 21b. Then, the axial load $F_a$ is calculated based on the synthesized signal and the rotational speed $n_i$ of the hub 2. The method of processing the synthesized signal in this case is slightly different in the case that the signals sent out from the revolution speed sensors 21a, 21b are changed like a sine wave and the case that the signals are changed like a pulse wave.

Figure 13:
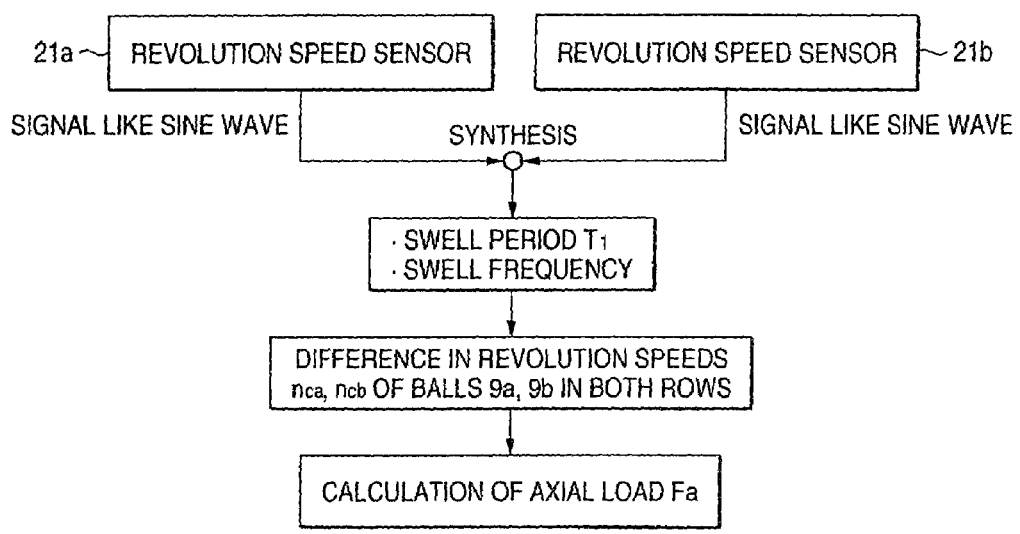
FIG. 13 is a flowchart showing such a situation that the axial load is calculated by synthesizing output signals of both revolution speed sensors when the output signals of a pair of revolution speed sensors are changed in a sine-wave fashion.
Figure 14:
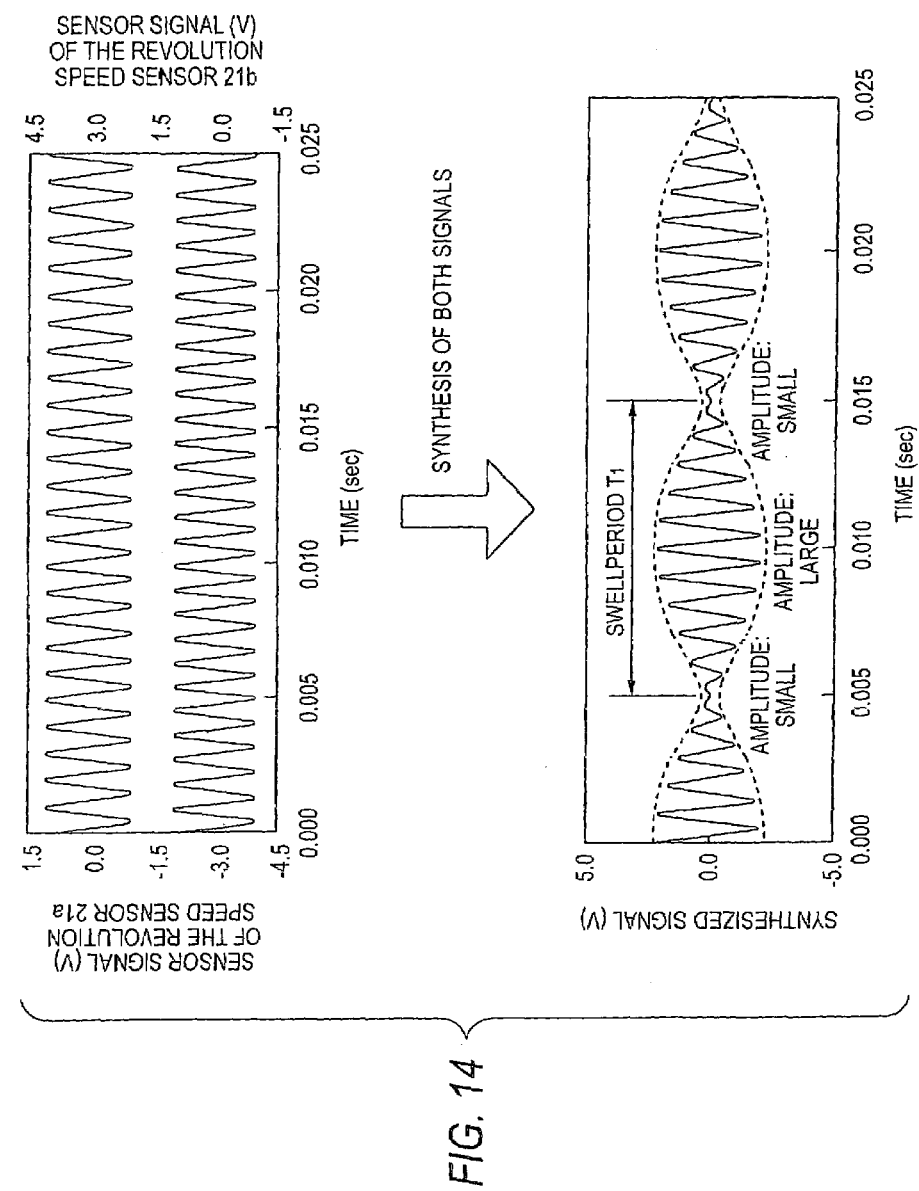
FIG. 14 is a view showing the output signals of a pair of revolution speed sensors and a synthesized signal in this case.

First, the case that the signals are changed like a sine wave will be explained with reference to FIGS. 13 and 14 hereunder. In this case, a synthesized signal shown in FIG. 14B is obtained by synthesizing (superposing) the signals sent out from the revolution speed sensors 21a, 21b and shown in FIG. 14A respectively. This synthesized signal has a swell having a swell period $T_1$. This swell is generated by a difference between the signals fed from the revolution speed sensors 21a, 21b, and a reciprocal ($1/T_1$ frequency) of the swell period $T_1$ gives a difference in frequencies of the signals sent out from the revolution speed sensors 21a, 21b. Therefore, the difference "$n_{cb}-n_{ca}$" between the revolution speeds $n_{ca}$, $n_{cb}$ of the rolling elements 9a, 9b in both rows is calculated by the swell period $T_1$ or the frequency, and then the axial load $F_a$ applied between the outer ring 1 and the hub 2 is calculated based on the ratio "$(n_{cd}-n_{ca})/n_i$" of the difference "$n_{cb}-n_{ca}$" to the rotational speed $n_i$ of the hub 2.

The synthesis (superposition) of the signals sent out from the revolution speed sensors 21a, 21b can be carried out by a simple circuit, and also only one harness for supplying the synthesized signal is required. Also, the calculation of the revolution speeds $n_{ca}$, $n_{cb}$ every rolling elements 9a, 9b in both rows is not required of the calculator that receives the synthesized signal. That is, the difference between the revolution speeds $n_{ca}$, $n_{cb}$ can be sensed directly. For this reason, as described above, reduction in the full length of the harness and reduction in an amount of computation in the calculator portion can be achieved.

Figure 15:
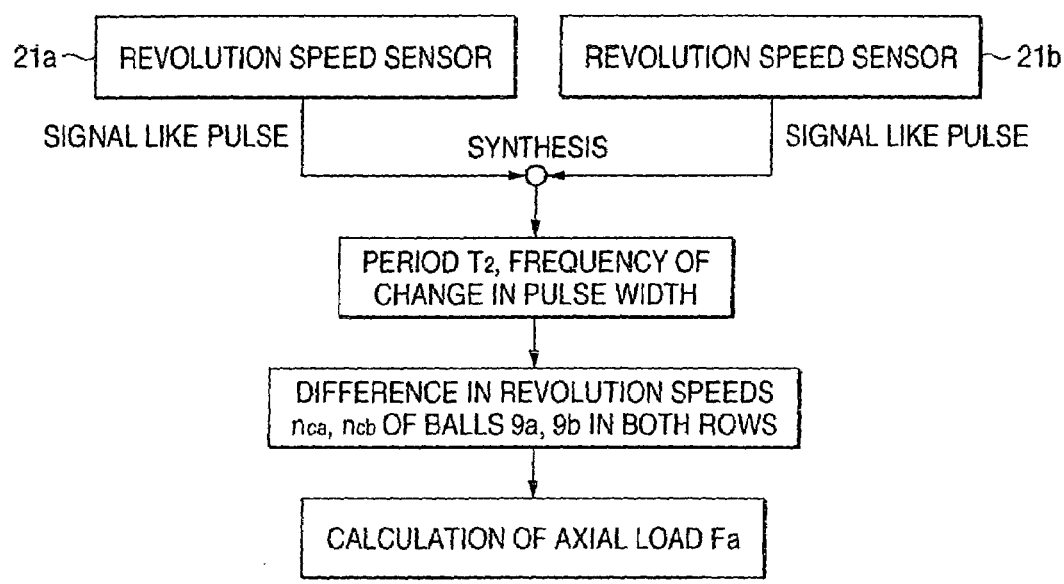
FIG. 15 is a flowchart showing such a situation that the axial load is calculated by synthesizing output signals of both revolution speed sensors when the output signals of a pair of revolution speed sensors are changed in a pulse fashion.
Figure 16:
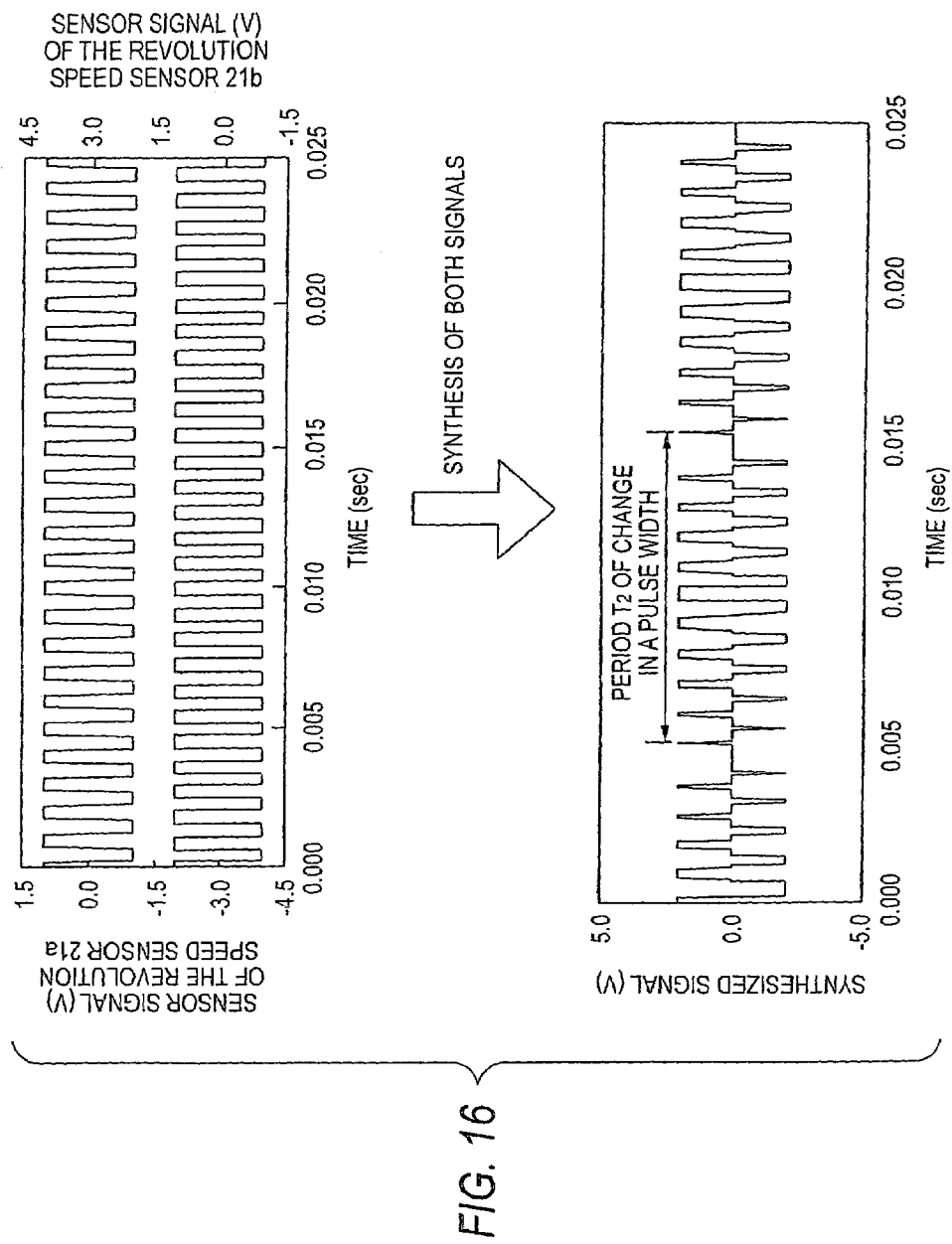
FIG. 16 is a view showing the output signals of a pair of revolution speed sensors and a synthesized signal in this case.

Next, the case that the signals are changed like a pulse wave will be explained with reference to FIGS. 15 and 16 hereunder. In this case, a synthesized signal shown in FIG. 16B is obtained by synthesizing (superposing) the signals sent out from the revolution speed sensors 21a, 21b and shown in FIG. 16A respectively. This synthesized signal is changed by a period $T_2$. This change (change in a pulse width) is generated by a difference between the signals fed from the revolution speed sensors 21a, 21b, and a reciprocal ($1/T_2$, frequency) of the change period $T_2$ gives a difference in frequencies of the signals sent out from the revolution speed sensors 21a, 21b.

Therefore, the difference "$n_{cd}-n_{ca}$" between the revolution speeds $n_{ca}$, $n_{cb}$ of the rolling elements 9a, 9b in both rows is calculated by the change period $T_2$ or the frequency, and then the axial load $F_a$ applied between the outer ring 1 and the hub 2 is calculated based on the ratio "$(n_{cb}-n_{ca})/n_i$" of the difference "$n_{cb}-n_{ca}$ to the rotational speed $n_i$ of the hub 2. This case is similar to the case that the signals are changed like a sine wave, except that the swell period $T_1$ is replaced with the change period $T_2$.

Second Embodiment

Figure 17:
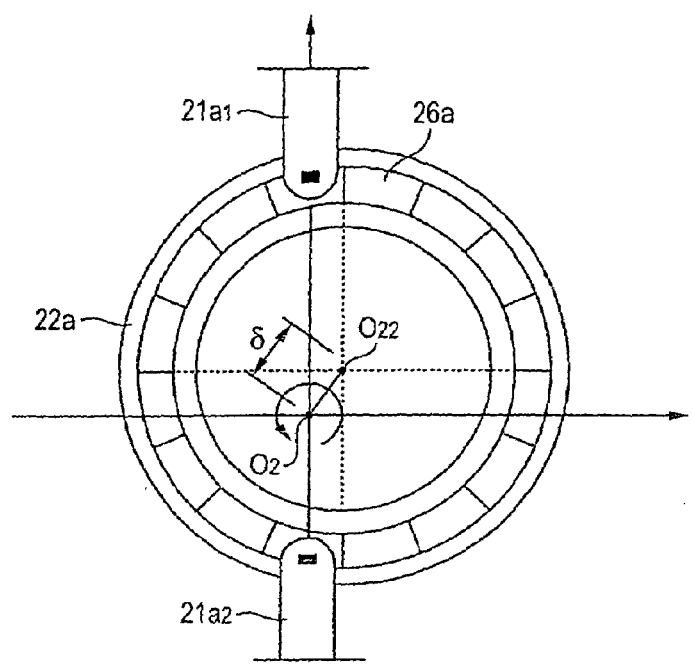
FIG. 17 is a schematic view showing a revolution speed encoder and revolution speed sensors in a second embodiment of the present invention when viewed in an axial direction.

FIG. 17 shows a second embodiment of the present invention. In the present embodiment, even though the revolution speed encoder 26a (also the revolution speed encoder 26b shown in FIGS. 1 and 2) is eccentrically moved, the revolution speeds of the rolling elements can be sensed precisely by providing a plurality of revolution speed sensors $21a_1$, $21a_2$ (two in FIG. 17). Therefore, in the case of the present embodiment, the revolution speed sensors $21a_1$, $21a_2$ are arranged to deviate from the revolution direction of the rolling elements 9a, 9b (see FIG. 1) whose revolution speeds are to be sensed. More particularly, the revolution speed sensors $21a_1$, $21a_2$ are arranged in opposite positions with respect to a rotation center $O_2$ of the hub 2 (see FIG. 1) by 180 degree. Then, the present embodiment is constructed to eliminate the influence of an error caused by the eccentric motion of the revolution speed encoder 26a by adding the sensed signals of the revolution speed sensors $21a_1$, $21a_2$. This respect will be explained with reference to FIGS. 18 to 20 in addition to FIG. 17.

Figure 19:
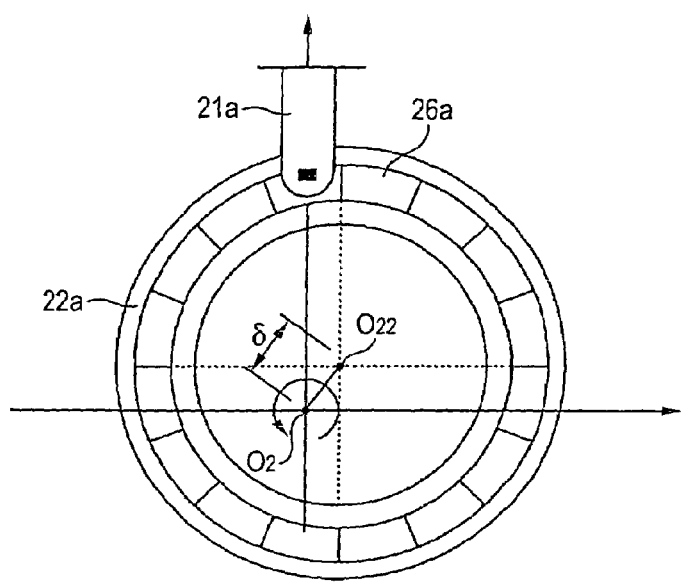
FIG. 19 is a view showing, similarly to FIG. 17, the case that only one revolution speed sensor is provided.

A clearance required to hold rotatably these rolling elements 9a, 9b is provided between an inner surface of a pocket of the retainer 22a, in which the revolution speed encoder 26a is held (or the retainer itself has a function as the encoder), and the rolling contact surfaces of the rolling elements 9a, 9b. Therefore, no matter how an assembling precision of respective constituent members is enhanced highly, it is possible that a rotation center $O_{22}$ of the retainer 22a is deviated from a center $O_2$ of a pitch circle of the rolling elements 9a, 9b (rotation center of the hub 2) by δ in operation of the rolling bearing unit, as shown exaggeratingly in FIGS. 17, 19. Then, the revolution speed encoder 26a performs a whirling motion around the rotation center $O_{22}$ based on this deviation. As the result of this whirling motion, a sensed surface of the revolution speed encoder 26a has a moving velocity except the rotation direction. Then, this moving velocity except the rotation direction, e.g., a moving velocity in the lateral direction in FIGS. 17 and 19, is added/subtracted to/from the moving velocity in the rotation direction. In contrast, since the revolution speed sensors sense the revolution speeds of the rolling elements 9a, 9b based on the moving velocity of the sensed surface of the revolution speed encoder 26a, an eccentricity δ affects the sensed signal of the revolution speed sensor, the sensing surface of which is opposed to a side surface of the revolution speed encoder 26a.

Figure 20:
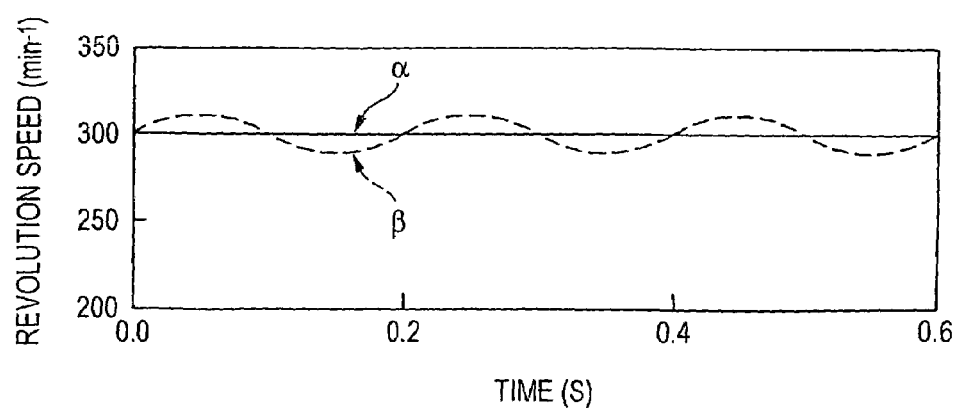
FIG. 20 is a diagram explaining the reason why a difference in the revolution speeds derived in this case is caused.

For instance, as shown in FIG. 19, in case only one sensing surface of one revolution speed sensor 21a, is opposed to the side surface of the revolution speed encoder 26a, the sensed signal of the revolution speed sensor 21a, is changed, as shown in FIG. 20. In other words, even when the revolution speeds of the rolling elements 9a, 9b are constant as indicated by a solid line α, the revolution speed represented by the output signal of the revolution speed sensor 21a, is changed like a sine wave, as indicated by a broken line β. More particularly, in case the moving velocity in the horizontal direction in FIG. 19 is added to the moving velocity in the rotation direction, the output signal gives a signal that corresponds to the velocity that is quicker than the actual revolution speed. Conversely, in case the moving velocity in the horizontal direction in FIG. 19 is subtracted from the moving velocity in the rotation direction, the output signal gives a signal that corresponds to the velocity that is slower than the actual revolution speed. FIG. 19 depicts an eccentricity in an exaggerated fashion rather than the actual case. In this event, in case the loads applied to the rolling bearing unit (the radial load $F_r$ and the axial load $F_a$ must be sensed more precisely to execute the control of the vehicle stability more strictly, there is such a possibility that an error caused by the eccentricity becomes a problem.

In contrast, in the case of the present embodiment, a pair of revolution speed sensors $21a_1$, $21a_2$ are provided. Therefore, as shown in FIG. 17, in case a rotation center $O_{22}$ of the retainer 22a is deviated from the center of a pitch circle of the rolling elements 9a, 9b (rotation center of the hub 2), in other words, in case the retainer 22a performs a whirling motion due to an eccentricity, the revolution speed of the rolling elements 9a, 9b can be sensed precisely. That is, the revolution speed sensors $21a_1$, $21a_2$ arranged in the opposite positions by 180 degree with respect to a center $O_2$ of the pitch circle are affected in the reverse direction by the same amount.

Figure 18:
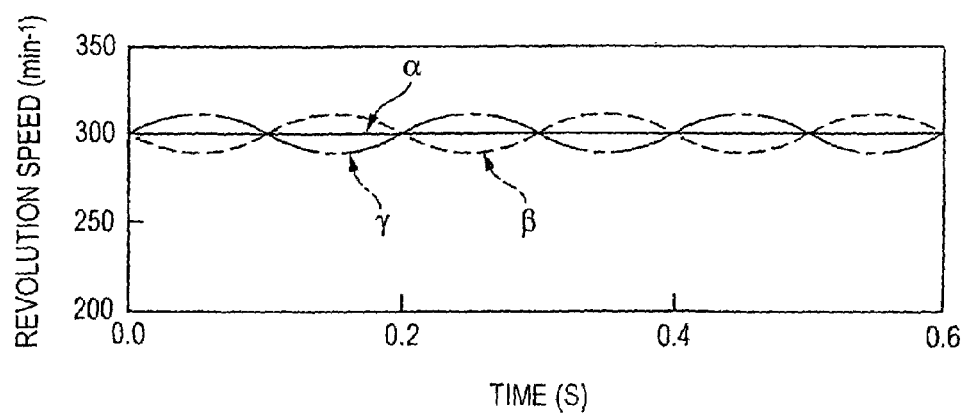
FIG. 18 is a diagram explaining the reason why the revolution speed can be derived exactly in the second embodiment.

More concretely, as shown in FIG. 18, in case the revolution speed of the rolling elements 9a, 9b is constant as indicated by a solid line α, the revolution speed represented by the output signal of one revolution speed sensor $21a_1$ is changed like a sine wave, as indicated by a broken line β, whereas the revolution speed represented by the output signal of the other revolution speed sensor $21a_2$ is also changed like a sine wave, as indicated by a chain line γ. In this case, a changing period of the revolution speed represented by the output signal of one revolution speed sensor $21a_1$ and a changing period of the revolution speed represented by the output signal of the other revolution speed sensor $21a_2$ are shifted by almost 180 degree mutually. Therefore, if the speeds derived from the output signals of a pair of revolution speed sensors $21a_1$, $21a_2$ are added (a sum is calculated) and then divided by 2, the revolution speed of the rolling elements 9a, 9b can be measured precisely independent of the whirling motion generated due to the eccentricity. Also, in order to execute the control of the vehicle stability more strictly, the load applied to the rolling bearing unit can be sensed precisely.

Figure 21:
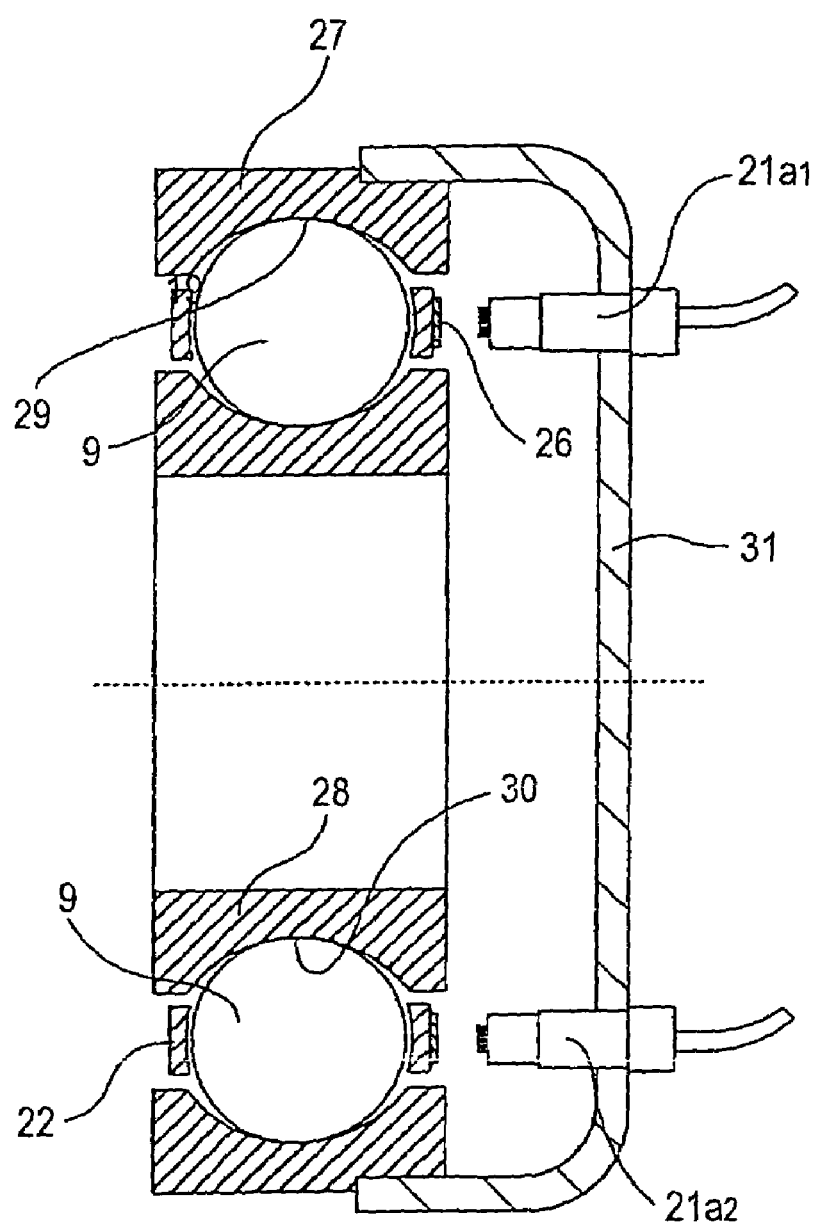
FIG. 21 is a sectional view showing another example of a structure in which a pair of revolution speed sensors are provided.

In this case, the technology to correct the error generated by the eccentric motion of the retainer by arranging a plurality of revolution speed sensors in equal interval positions in the circumferential direction of the revolution direction of the rolling elements (in the illustrated example, in the opposite positions by 180 degree) can be applied to any bearing unit as well as the double row rolling bearing unit used to support the wheels, as shown in FIG. 1. For example, as shown in FIG. 21, such technology can be applied to a single row deep groove or angular contact ball bearing. In such ball bearing, a plurality of rolling elements 9, 9 are provided between an outer ring raceway 29 and an inner ring raceway 30, which are formed on mutually opposing peripheral surfaces of an outer ring 27 and an inner ring 28 arranged in a concentric fashion respectively, and is used in a state that the contact angles and the enough preload are applied (in a state that the preload is never lost in operation) In the example shown in FIG. 21, sensing surfaces of a pair of revolution speed sensors $21a_1$, $21a_2$ fitted to a cover 31, which is fitted/fixed to an outer periphery of the outer ring 27, are opposed to a side surface of a revolution speed encoders 26 coupled to a retainer 22 in the opposite positions with respect to a rotation center of the inner ring 28 by 180 degree.

In this case, if the rolling bearing unit, in which the rolling elements are provided in double rows and to which the present invention is applied, is used in a state that the rotational speed of the rotating ring is always constant like the rotation supporting portion of the machine tool or the carrier car in the factory, the radial load $F_r$ can be detected exactly by using only a sum "$n_{cb}+n_{ca}$" or a product "$n_{ca} \times n_{cb}$" of the revolution speeds $n_{ca}$, $n_{cb}$ of the rolling elements 9a, 9b in both rows. Also, the axial load $F_a$ can be detected exactly by using only the difference "$n_{cd}-n_{ca}$" of the revolution speeds. On the contrary, if the rotational speed of the rotating ring is changed in operation like the rolling bearing unit used to supporting the wheels of the car or the railway vehicle, the sum "$n_{cb}+n_{ca}$" or the product "$n_{ca} \times n_{cb}$" or the difference "$n_{cb}-n_{ca}$" of the revolution speeds $n_{ca}$, $n_{cb}$ is changed in response to the rotational speed irrespective of the radial load $F_r$ and the axial load $F_a$. For this reason, in such case, as described above, the influence of the rotational speed $n_i$ of the hub 2 can be eliminated since the radial load $F_r$ or the axial load $F_a$ is measured based on the rotational speed $n_i$ of the hub 2 sensed by the rotational speed sensor 15b and the revolution speeds $n_{ca}$, $n_{cb}$.

In this case, even when the radial load $F_r$ or the axial load $F_a$ is measured by any method, the inexpensive speed sensors used widely to get the control signal of the ABS or the TCS in the related art can be used as the revolution speed sensors 21a, 21b used to measure the revolution speeds $n_{ca}$, $n_{cb}$ of the rolling elements 9a, 9b in double rows and the rotational speed sensor 15b used to measure the rotational speed of the hub 2. As a result, the overall load measuring system for the rolling bearing unit can be constructed inexpensively.

Third Embodiment

In the illustrated example, the case that the revolution speeds of the rolling elements 9a, 9b in double rows are measured as the rotational speeds of the retainers 22a, 22b holding the rolling elements 9a, 9b in double rows is explained. But the revolution speeds of the rolling elements 9a, 9b in double rows can be measured directly. For example, if the magnetic sensors are used as the revolution speed sensors 21a, 21b and the elements made of magnetic material is used as the rolling elements 9a, 9b in double rows, characteristics of the magnetic sensors constituting the revolution speed sensors 21a, 21b are changed with the revolution of the rolling elements 9a, 9b in double rows (in the case of the active sensor into which the magnetic sensors are incorporated). In other words, a quantity of magnetic flux flowing through the magnetic sensors is increased at an instance when the rolling elements 9a, 9b made of magnetic material are present in vicinity of the sensing surfaces of the revolution speed sensors 21a, 21b, while a quantity of magnetic flux flowing through the magnetic sensors is reduced at an instance when the sensing surfaces are opposed to adjacent portions located between the rolling elements 9a, 9b in the circumferential direction. In this way, a frequency at which the characteristics of the magnetic sensors are changed in answer to the change in the quantity of magnetic flux flowing through the magnetic sensors is proportional to the revolution speed of the rolling elements 9a, 9b in double rows. As a result, the revolution speed can be derived based on the sensed signals of the revolution speed sensors 21a, 21b into which the magnetic sensors are incorporated.

In this case, in order to sense the revolution speed of the rolling elements 9a, 9b in double rows by the above mechanism, the rolling elements 9a, 9b in double rows must be made of the magnetic material. Therefore, when the elements made of non-magnetic material such as ceramics, or the like are used as the rolling elements 9a, 9b in double rows, optical sensors must be used as the revolution speed sensors 21a, 21b. However, in many cases a grease to lubricate the rolling contact portions is sealed in a space 32 into which the sensing portions of the revolution speed sensors 21a, 21b are inserted (see FIGS. 1 and 2), and thus the light is not effectively reflected in such cases. With regard to above circumstances, it is preferable that the elements made of magnetic material shouldbe used as the rolling elements 9a, 9b in double rows and also the sensors into which the magnetic sensors are incorporated should be used as the revolution speed sensors 21a, 21b.

Also, as described above, it is preferable that, when the revolution speed of the rolling elements 9a, 9b in double rows is directly measured by the revolution speed sensors 21a, 21b, the retainers made of non-magnetic material such as synthetic resin, or the like should be used as the retainers 22a, 22b to hold the rolling elements 9a, 9b in double rows. If the retainers made of magnetic material are used, the magnetic fluxes to be flow between the rolling elements 9a, 9b in double rows and the sensing portions of the revolution speed sensors 21a, 21b are cut off, and thus it is impossible to measure the exact revolution speed. Conversely speaking, the revolution speed of the rolling elements 9a, 9b in double rows can be measured exactly by using the retainers 22a, 22b made of non-magnetic material. In this case, the retainers 22a, 22b may be made of non-magnetic metal such as copper alloy, or the like, but more preferably the retainers made of synthetic resin should be employed because such retainers are light in weight and are difficult to cut off the magnetic fluxes. For example, because the austenite-based stainless steel that is normally known as the non-magnetic metal has also minute magnetism, such steel is disadvantageous to sense exactly the revolution speed.

If the structure in which the ceramic elements are used as the rolling elements 9a, 9b in double rows and the revolution speeds $n_{ca}$, $n_{cb}$ of the rolling elements 9a, 9b in double rows are measured as the rotational speeds of the retainers 22a, 22b is employed, it is advantageous tomeasure exactlythe revolution speeds $n_{ca}$, $n_{ob}$. In other words, the ceramics is lighter in weight than the hard metal such as bearing steel, the stainless steel, or the like, which is normally utilized to construct the rolling elements 9a, 9b, and has a smaller centrifugal force as well as a smaller inertial mass both acting in operation. Hence, since a contact pressure on contact portions between rolling contact surfaces of the rolling elements 9a, 9b and the outer ring raceways 7, 7 is lowered and the inertialmass becomes small, the follow-upperformance to sudden change in the speed can be improved. Also, even when the speed of the hub 2 is suddenly changed, a slip (revolution slip) is difficult to occur on the contact portions between the rolling contact surfaces of the rolling elements 9a, 9b and the outer ring raceways 7, 7 and the inner ring raceways 8, 8.

In other words, the revolution speeds $n_{ca}$, $n_{cb}$ of the rolling elements 9a, 9b in double rows are changed exactly to correspond to the change in the rotational speed $n_i$ of the hub 2. Hence, even when the rotational speed $n_i$ of the hub 2 is suddenly changed, the radial load $F_r$ and the axial load $F_a$ applied to the rolling bearing unit can be measured exactly based on the rotational speed $n_i$ and the revolution speeds $n_{ca}$, $n_{cb}$. In this case, the technology to measure exactly the revolution speed of the rolling elements while suppressing the revolution slip by forming the rolling elements of the ceramics in this way can be applied to not only the case that the rolling elements are formed of elements except the balls but also the case of the single row rolling bearing unit instead of the double row type.

Also, as the revolution speed sensors 21a, 21b and the rotational speed sensor 15b, the passive magnetic revolution sensor in which a coil is wound around a pole piece made of magnetic material can be used. In this case, a voltage of the sensed signal of the passive magnetic revolution sensor is lowered when the rotational speed becomes slow. In the case of the load measuring device for the rolling bearing unit as the object of the present invention, because such device intends to implement the running stability during the high-speed running of the mobile body as a major object, reduction of the voltage of the sensed signal during the low-speed running is hard to become an issue. Accordingly, if the inexpensive passive sensor is employed as one or plural sensors out of respective sensors 21a, 21b, 15b, reduction in a cost of the overall device can be achieved. In this case, it is preferable that, if a high-precision control during the low-speed running is also intended, the active revolution sensor into which the magnetic sensors are incorporated should be used as described above.

Also, it is preferable that, in case either the active sensor is used as the revolution sensor or the passive sensor is used, the magnetism sensing element such as Hall element, etc. and sensor constituent parts such as permanent magnet, yoke (pole piece), coil, etc. should be molded in a holder made of non-magnetic material such as synthetic resin, or the like except the sensing surfaces at the top end portion. In this manner, the sensing portions of the revolution sensor constructed by molding the sensor constituent parts in the synthetic resin are opposed to the sensed portions, i.e., of the revolution speed encoders 26a, 26b fitted to the rolling elements 9a, 9b in double rows or the retainers 22a, 22b in the case of the revolution speed sensors 21a, 21b or the rotational speed encoder 13a in the case of the rotational speed sensor 15b, respectively. In this fashion, the above sensors 21a, 21b, 15b are held in one holder, the operation of fitting these sensors 21a, 21b, 15b into the outer ring 1 can be facilitated. In this case, these sensors 21a, 21b, 15b may be fitted separately to non-rotated portions according to the applications.

Also, the signals sensed by the revolution speed sensors 21a, 21b to represent the revolution speed of the rolling elements 9a, 9b in double rows and the signal sensed by the rotational speed sensor 15b to represent the rotational speed of the hub 2 may be processed by the hardware such as analog circuit, or the like or the software using the microcomputer, or the like. Also, in the illustrated example, the case that the present invention is applied to the double row angular contact rolling bearing unit used to support the wheel of the vehicle is explained. But the present invention may be applied to the normal double row or multiple row ball bearing or tapered roller bearing. In this case, when the present invention is applied to the multiple row (three rows or more) rolling bearing, the loads applied to the rolling bearing unit are calculated by sensing the revolution speed in remaining rows in addition to the revolution speed of the rolling elements in two rows. Also, when the present invention is applied to the double row tapered roller bearing in which tapered rollers are used as the rolling elements, an amount of change in the revolution speed becomes smaller than the double row ball bearing, nevertheless the load can be calculated based on change in the revolution speed of the tapered rollers.

Figure 38:
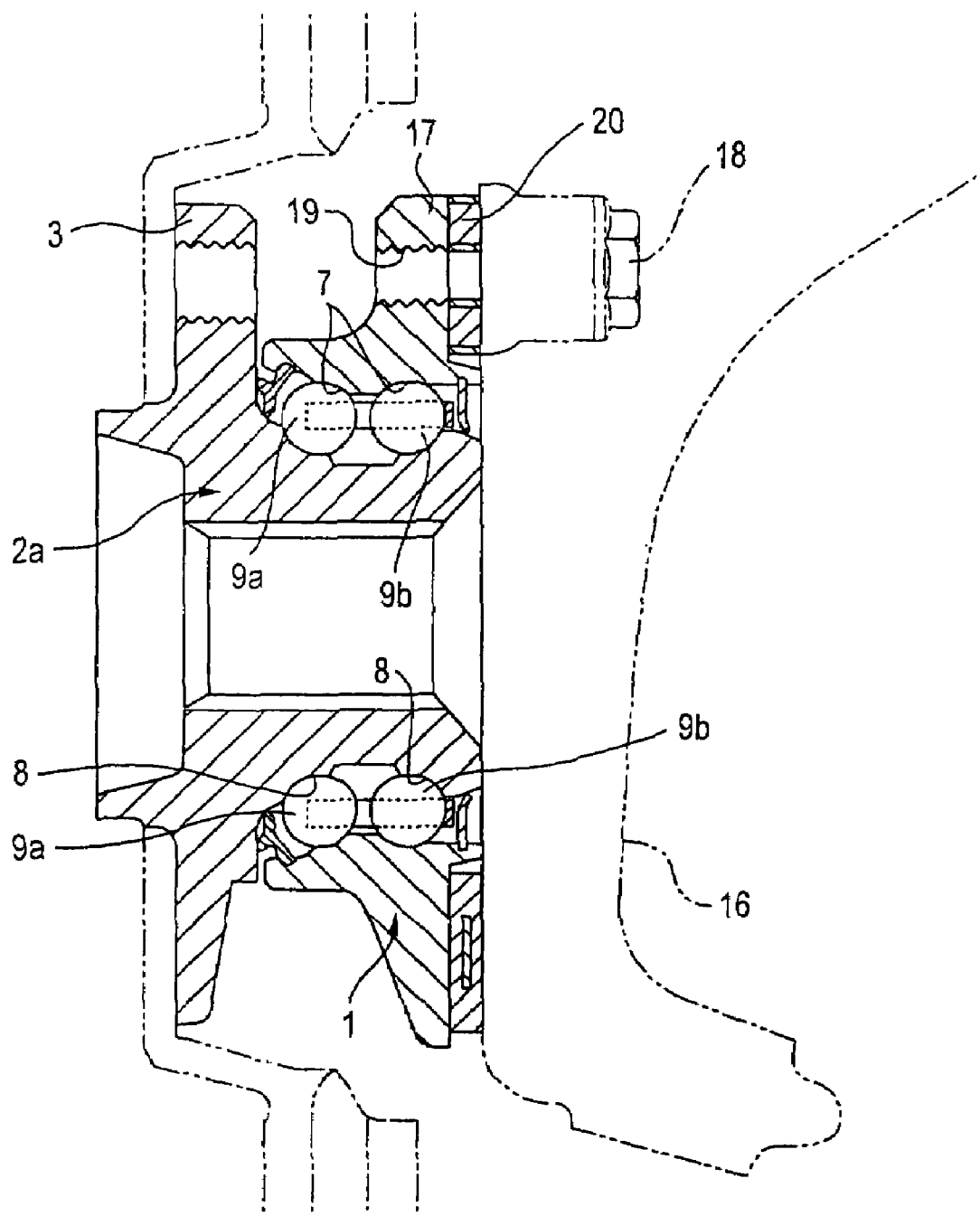
FIG. 38 is a sectional view showing a second example of the same.

Further, even when the present invention is applied to the double row angular contact rolling bearing unit used to support the wheel of the vehicle, the present invention can be implemented in any hub unit as well as so-called third-generation hub unit in which the outside inner ring raceway 8 is formed on the outer peripheral surface of the hub main body 4 in the middle portion, as shown in FIG. 1. In other words, the present invention may be applied to the so-called second-generation hub unit, in which a pair of inner rings are fitted/fixed to the middle portion or the inner end portion of the hub main body, and the so-called first-generation hub unit, in which a pair of inner rings are fitted/fixed to the middle portion or the inner end portion of the hub main body and also the outer ring whose outer periphery is shaped into a mere cylinder is inserted/supported into the supporting hole of the knuckle. Alternately, like the structure shown in FIG. 21, the present invention may be applied to the structure in which a pair of rolling bearings each serving as the single row rolling bearing respectively are provided between an outer peripheral surface of the hub main body in the middle portion or the inner end portion and an inner peripheral surface of the supporting hole of the knuckle to construct the double row rolling bearing unit. Of course, the application of the present invention is not limited to the hub unit for the idler wheel as shown, and the present invention may be applied to the hub unit for the driving wheel (rear wheels of FR car, RR car, MR car, front wheels of FF car, and all wheels of 4WD car), as shown in above FIGS. 38 to 40.

Fourth Embodiment

Moreover, as described above, when the present invention is implemented, the revolution speeds $n_{ca}$, $n_{cb}$ of the rolling elements 9a, 9b in double rows are measured in the course of measuring the radial load $F_r$ and the axial load $F_a$. Then, if these revolution speeds $n_{ca}$, $n_{cb}$ in respective rows are detected, the contact angles $\alpha$ ($\alpha_a$, $\alpha_b$) can be calculated based on above Eq. (1). Therefore, if the contact angles a are monitored, an alarm unit for generating an alarm at the time of abnormal state by grasping the state of the rolling bearing unit can be constructed. As the time of abnormal state, the case the preload to the rolling bearing unit is lost (the preload escapement occurs), the case the excessive axial load $F_a$ is loaded to the rolling bearing unit, etc. may be considered, for example. In the case that the preload out of them is lost, contact angles $\alpha$ become small. Then, vibrations or noises caused due to the shake are generated, and in addition wears of the rolling contact surfaces of the rolling elements 9a, 9b in double rows and the outer ring raceway 7 and the inner ring raceway 8 are advanced because of the revolution slip. In contrast, in case the excessive axial load $F_a$ is applied, the contact angle $\alpha$ in any row is increased. Also, not only the contact pressure of the contact portions between the rolling contact surfaces of the rolling elements 9a (9b) in the concerned row and the outer ring raceway 7 and the inner ring raceway 8 is increased excessively to increase the rotational resistance of the rolling bearing unit, but also it is possible that a part of the rolling contact surfaces is off the outer ring raceway 7 and the inner ring raceway 8 in the most remarkable case. In any case, the rolling contact fatigue life of respective surfaces is lowered because of the exfoliation caused on respective surfaces, etc.

All the states that the preload escapement is generated or the excessive axial load $F_a$ is loaded to cause such problem can be grasped by monitoring the contact angles $\alpha$. Therefore, the contact angles $\alpha$ of the rolling elements 9a, 9b in each row are compared with the normal value by the circuit shown in the FIG. 22 while monitoring them, the alarming device for generating an alarm when deviation from the normal value becomes large can be constructed. When such alarming device is constructed, a lifetime of the rolling bearing unit can be predicted or the event that generation of a serious trouble in the machine device such as the car, the machine tool, the industrial equipment, etc., into which such rolling bearingunit is incorporated, canbepreventedpreviously. As the alarm in this case, lightening of an alarm lamp, start of the alarming device such as a buzzer, or the like may be considered.

Figure 22:
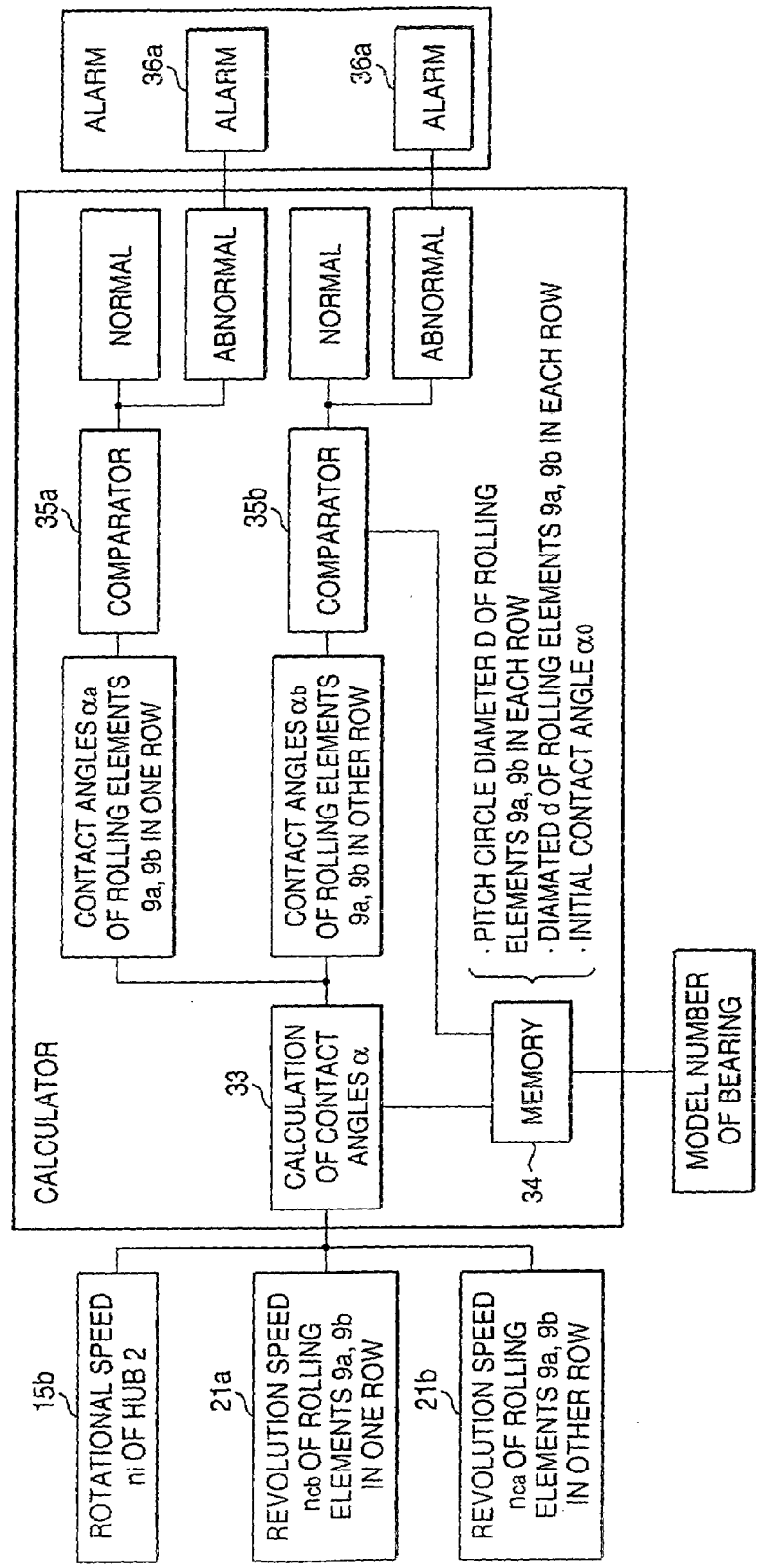
FIG. 22 is a block diagram showing an example of a circuit for monitoring the revolution speed to generate an alarm when such revolution speed is wrong.

The circuit shown in FIG. 22 is constructed to generate the alarm about the concerned row by monitoring the contact angles $\alpha_a$, $\alpha_b$ of the rolling elements 9a, 9b in double rows respectively when the contact angles $\alpha_a$, $\alpha_b$ of the rolling elements 9a, 9b in any one row are deviated from the normal value by a predetermined value or more. For this reason, the rotational speed $n_i$ of the hub 2 being fed from the rotational speed sensor 15b, the revolution speed $n_{ca}$, $n_{cb}$ of the rolling elements 9a, 9b in double rows being fed from the revolution speed sensors 21a, 21b, and specifications of the rolling bearing unit being stored in a memory 34 are input into an arithmetic circuit 33. Various values necessary for calculation of the contact angles $\alpha_a$, $\alpha_b$ of the rolling elements 9a, 9b in respective rows such as a pitch circle diameter D of the rolling elements 9a, 9b in double rows, a diameter d of these rolling elements 9a, 9b, etc. as well as an initial contact angle $\alpha_0$ of the rolling elements 9a, 9b in respective rows are stored in the memory 34 by inputting the model number of the rolling bearing unit or inputting directly the necessary values.

The arithmetic circuit 33 calculates the contact angles $\alpha_a$, $\alpha_b$ of the rolling elements 9a, 9b in respective rows based on respective speed nj, $n_{ca}$, $n_{cb}$ and respective diameters D, d, and then feeds them to comparators 35a, 35b. These comparators 35a, 35b compare the contact angles $\alpha_a$, $\alpha_b$ of the rolling elements 9a, 9b in respective rows with the initial contact angle $\alpha_0$ fed from the memory 34 at a time point of calculation. Then, it is decided whether or not the contact angles $\alpha_a$, $\alpha_b$ of the rolling elements 9a, 9b in respective rows are within the normal range. If it is decided that such contact angles $\alpha_a$, $\alpha_b$ are out of the normal range (abnormal), alarms 36a, 36b are caused to generate the alarm.

The approach to decide whether or not the operation state of the rolling bearing unit is proper is not limited to the step of comparing the contact angles $\alpha_a$, $\alpha_b$ of the rolling elements 9a, 9b in respective rows with the initial contact angle $\alpha_0$. Any approach may be carried out. For example, it is possible to decide whether or not the operation state of the rolling bearing unit is proper, by detecting an elastic deformation amount $\delta$, the radial load $F_r$, the axial load $F_a$, and contact stiffness K of the rolling bearing unit and then comparing them with the specifications of the rolling bearing unit. In this case, the arithmetic circuit 33 executes calculations given by Eqs. (2) to (5)

$$(r_i + r_e - d) \cdot \cos \alpha_n = (r_i + r_e + \delta - d) \cdot \cos \alpha_0 \qquad (2)$$

where
- ri: groove radius of the inner ring raceway (radius of curvature of a sectional shape),
- re: groove radius of the outer ring raceway (radius of curvature of a sectional shape),
- δ: elastic deformation amount,
- $\alpha_0$: initial contact angle, and
- $\alpha_n$: the contact angles ($\alpha_a$, $\alpha_b$) in double rows in operation, $$Q = K_N \times \delta^{3/2} \tag{3}$$

where
- Q: load of the rolling elements, and
- $K_N$: constant of the rolling elements, $$F_a = z \times Q \times \sin \alpha_n \tag{4}$$

$$F_r = z \times Q \times \cos \alpha_n \tag{5}$$

where
- z: number of the rolling elements.

Fifth Embodiment

Figure 23:
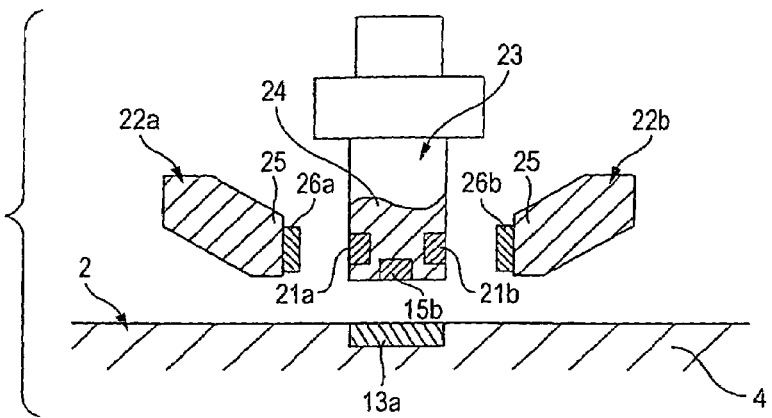
FIG. 23 is a partial sectional view showing a fifth embodiment of the present invention.

FIG. 23 shows a fifth embodiment of the present invention. In the case of the present embodiment, out of three sensors 21a, 21b, 15b installed onto the top end portion 24 of the sensor unit 23, one rotational speed sensor 15b is positioned closer to the outer peripheral surface of the hub 2 than a pair of revolution speed sensors 21a, 21b. When constructed in this manner, three sensors 21a, 21b, 15b are separated mutually and the magnetic interference among these sensors 21a, 21b, 15b is reduced. Since such magnetic interference is suppressed small, improvement in the reliability of sensing the revolution speed and the rotational speed and in turn the reliability of calculation of the load can be achieved.

Sixth Embodiment

Figure 24:
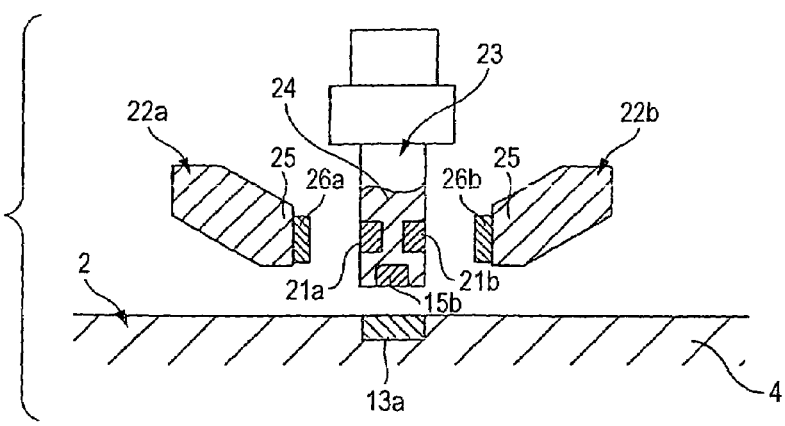
FIG. 24 is a partial sectional view showing a sixth embodiment of the same.

FIG. 24 shows an sixth embodiment of the present invention. In the case of the present embodiment, positions of three sensors 21a, 21b, 15b provided to the top end portion 24 of the sensor unit 23 are shifted more largely than the case of above fifth embodiment. More particularly, in the case of the present embodiment, the sensors 21a, 21b, 15b packaged in the IC package are aligned closer mutually in series with the axial direction of the sensor unit 23. By doing this, the magnetic interference among these sensors 21a, 21b, 15b is suppressed smaller and also a diameter of the sensor unit 23 is made small. Then, even though an interval between a pair of retainers 22a, 22b is set narrow, an inner diameter of the fitting hole 10a (see FIGS. 1 and 2) formed in the outer ring 1 such that the top end portion 24 of the sensor unit 23 can be arranged therein and the sensor unit 23 is installed therein is formed small. Thus, improvement in the strength and the stiffness of the outer ring 1 is intended.

Seventh Embodiment

Figure 25:
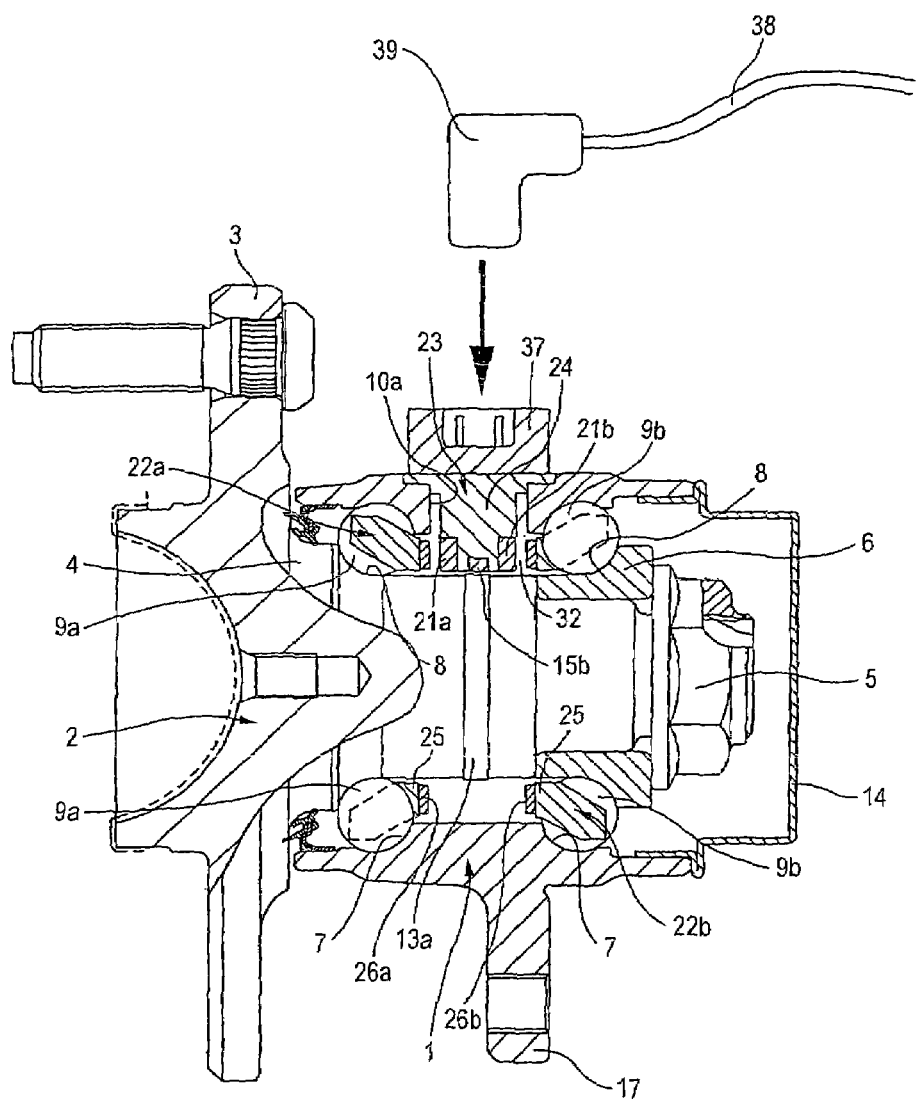
FIG. 25 is a sectional view showing a first example of a seventh embodiment of the same.

FIG. 25 shows an seventh embodiment of the present invention. In the case of the present embodiment, a connector 37 is provided on the outer peripheral surface of the outer ring 1, and a plug 39 provided to one end portion of a harness 38 used to output the sensed signals of the sensors 21a, 21b, 15b can be connected to this connector 37. The other end of the harness 38 is coupled to a controller provided to the vehicle body. In the case of the present embodiment, when the rolling bearing unit on which the sensor unit 23 equipped with respective sensors 21a, 21b, 15b is mounted previously is fitted to the suspension system, damage of the harness 38 can be prevented by employing such structure.

Figure 26:
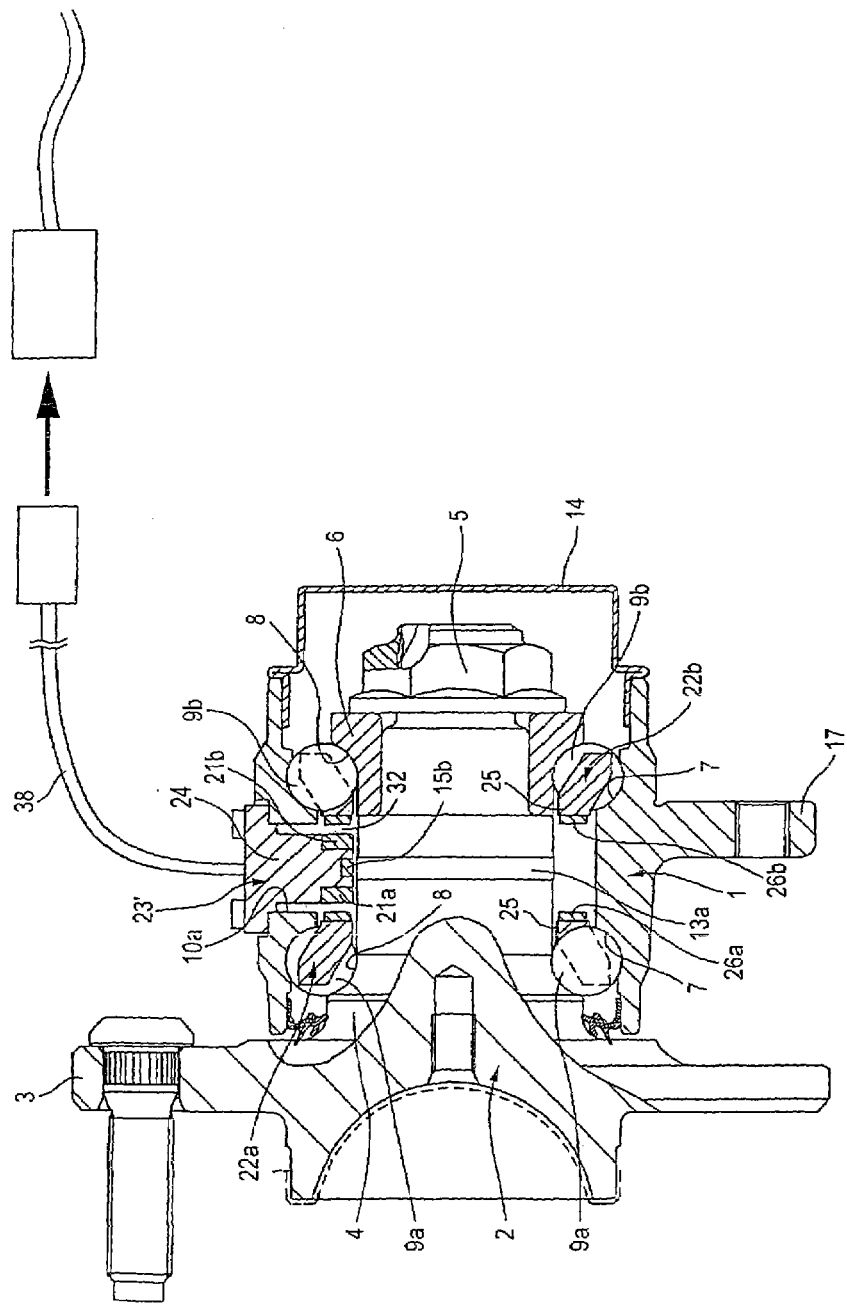
FIG. 26 is a sectional view showing a structure different from the seventh embodiment.

In more detail, as shown in FIG. 26, if a sensor unit 23' equipped with respective sensors 21a, 21b, 15b and the harness 38 are combined unseparably with each other, it is possible to damage the harness 38 in the assembling operation. Also, the transporting operation (the packing operation and the unpacking operation before such operation) of the load measuring rolling bearing unit becomes troublesome. In contrast, in the case of the present embodiment, since the assembling operation is carried out in a state that the harness 38 is removed and then the harness 38 is coupled, the harness 38 is never damaged (an insulating film is damaged, a conductor is disconnected, or the like) in the assembling operation. Also, the transporting operation of the load measuring rolling bearing unit is made easy. In addition, when the harness 38 is damaged by a stone let fly during vehicle running, or the like, an expense required for the repair can be reduced because only the harness 38 and the plug 39 should be exchanged.

Figure 27:
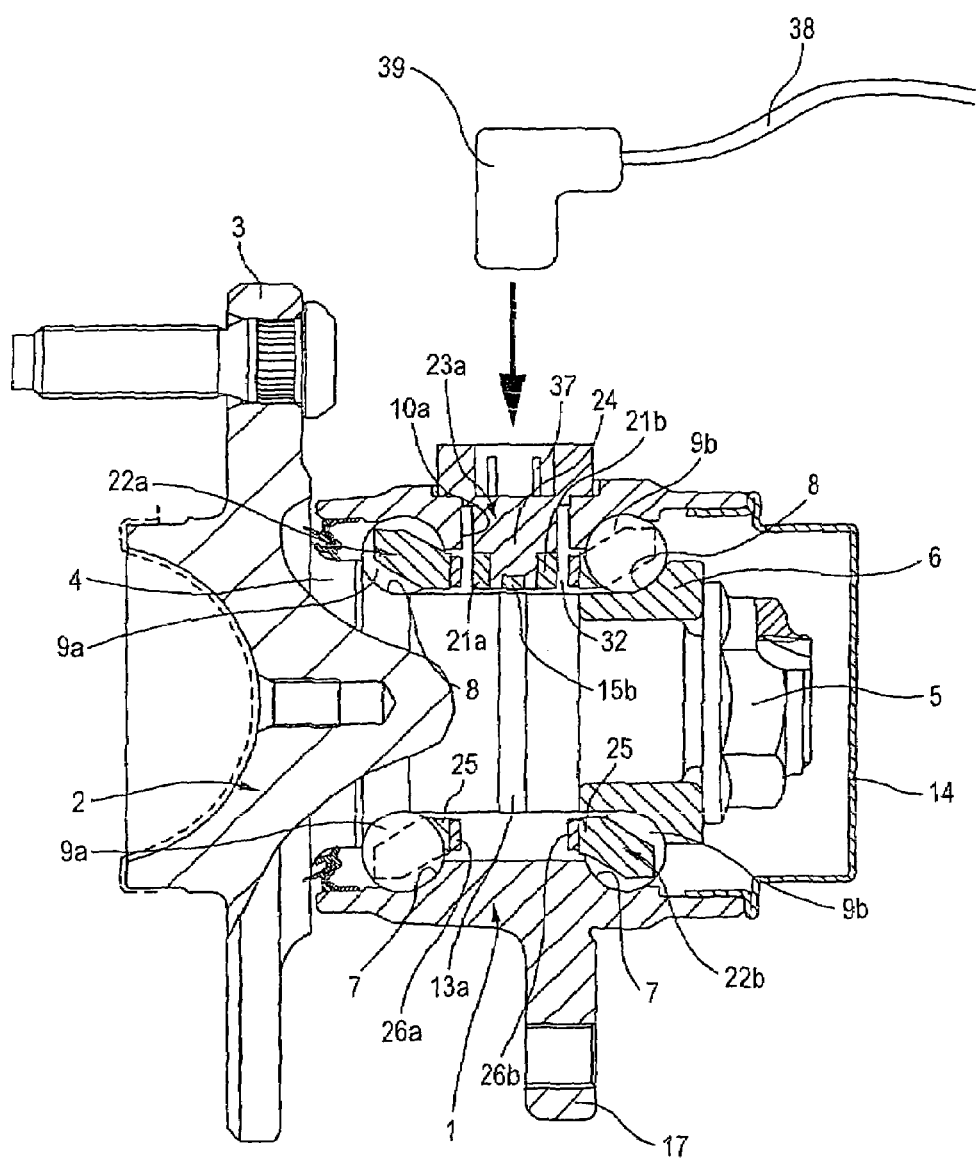
FIG. 27 is a sectional view showing a second example of the seventh embodiment of the present invention.

In this case, the connector 37 provided to the outer ring 1 side may be provided separately from the sensor unit 23, as show in FIG. 25, and also may be provided integrally with a sensor unit 23a, as show in FIG. 27.

Eighth Embodiment

Figure 28:
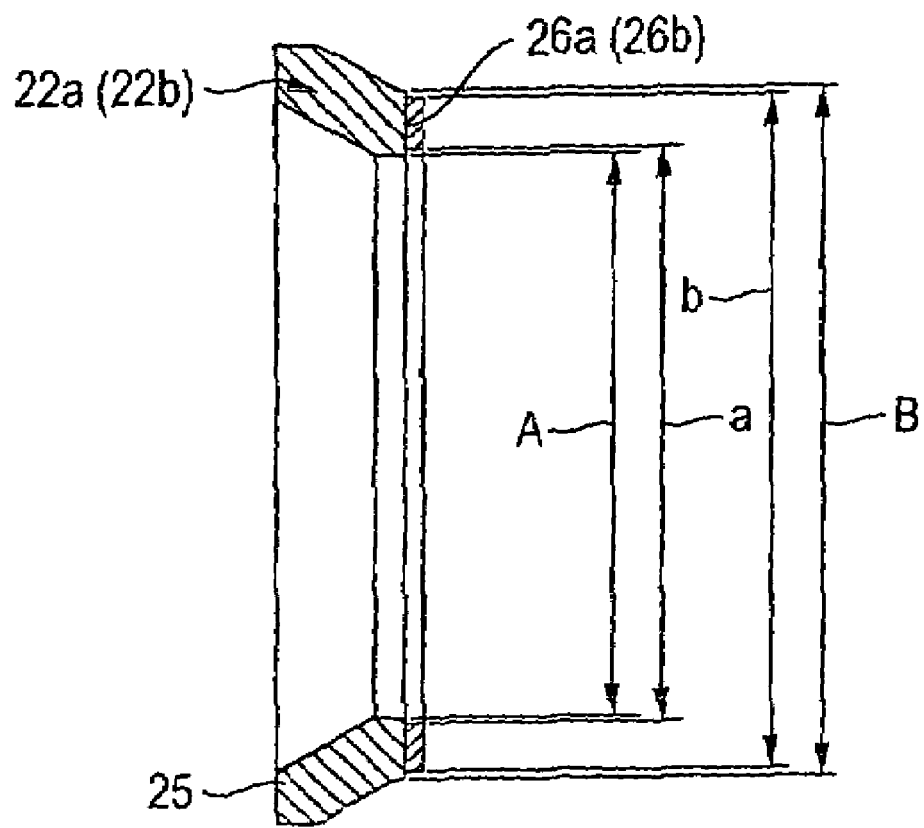
FIG. 28 is a partial sectional view showing an eighth embodiment of the same.

FIG. 28 shows an eighth embodiment of the present invention. In the case of thepresent embodiment, an inner diameter a of the revolution speed encoder 26a (26b) attached to the side surface of the rim portion 25 of the retainer 22a (22b) is set larger than an inner diameter A of the side surface of the rim portion 25, while an outer diameter b of the same revolution speed encoder 26a (26b) is set smaller than an outer diameter B of the side surface of the rim portion 25 (A<a<b<B). Since dimensions of respective portions are defined in this manner, such an event can be prevented that the revolution speed encoder 26a (26b) comes into contact with the inner peripheral surface of the outer ring 1 and the outer peripheral surface of the hub 2 (see FIGS. 1 and 2, for example).

Ninth Embodiment

Figure 29:
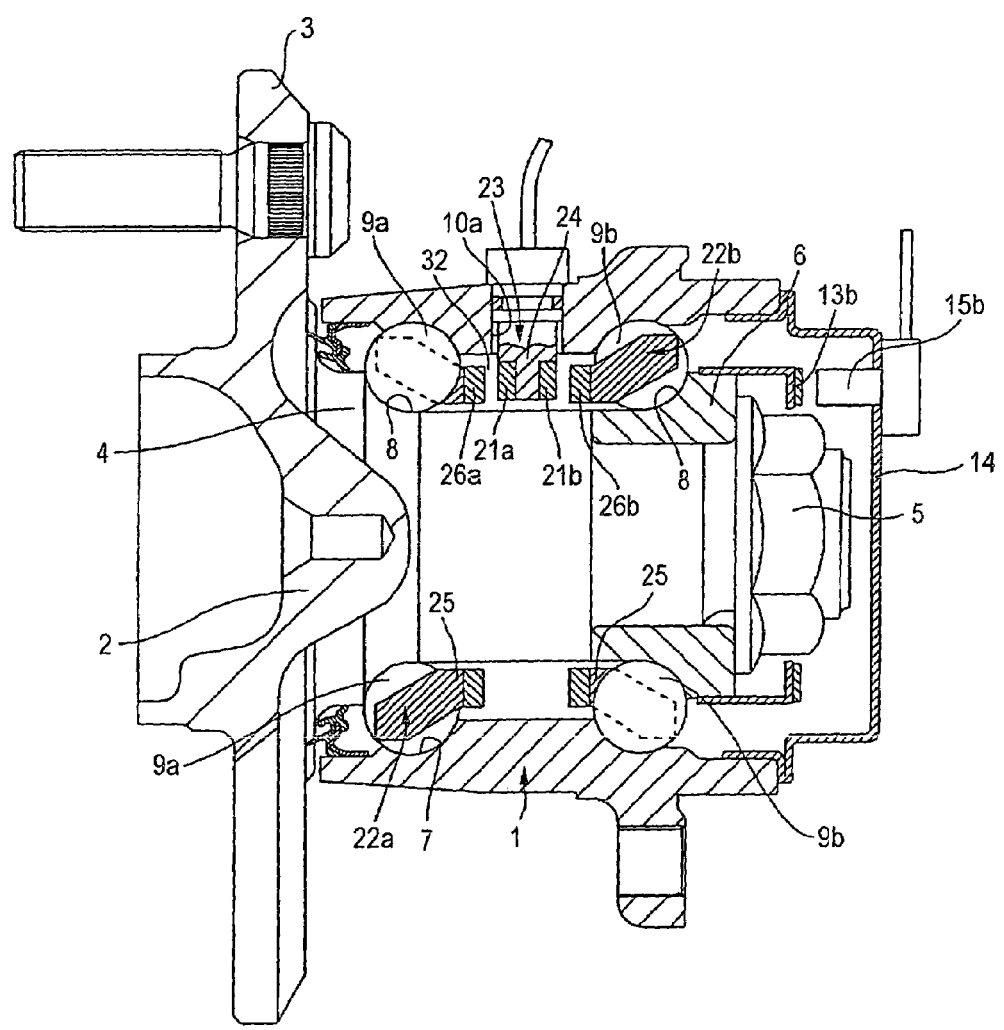
FIG. 29 is a sectional view showing a first example of a ninth embodiment of the same.
Figure 30:
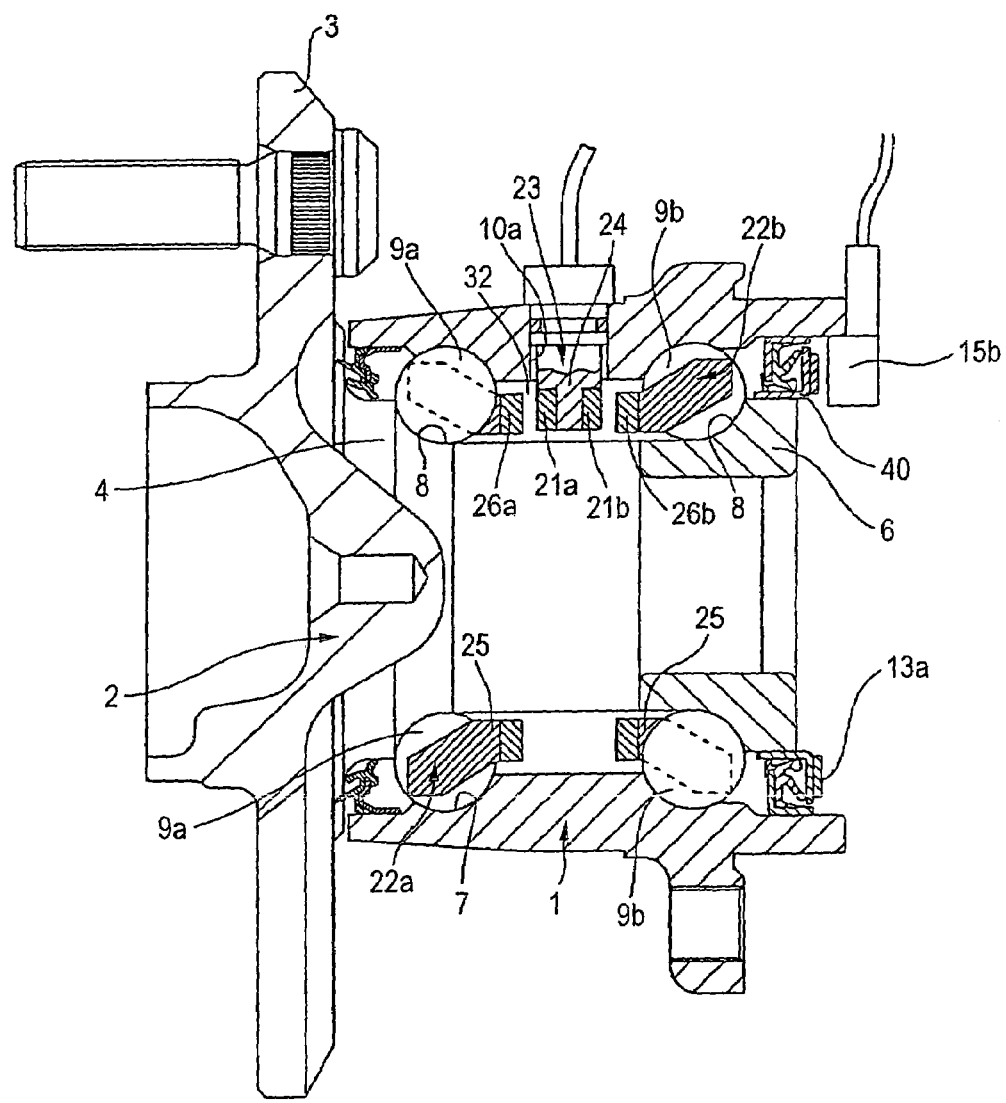
FIG. 30 is a sectional view showing a second example of the ninth embodiment of the same.

FIGS. 29 and 30 shows a ninth embodiment of the present invention. In the case of the present embodiment, a rotational speed encoder 13b used to sense the rotational speed of the hub 2 and the rotational speed sensor 15b are provided to the inner end portion of the rolling bearing unit. Only the revolution speed encoders 26a, 26b and the revolution speed sensors 21a, 21b are provided between the rolling elements 9a, 9b aligned in two rows. In the case of the present embodiment, by employing such structure, even when an interval between the rows of the rolling elements 9a, 9b is narrow, it can be prevented that the magnetic interference is caused by excessively close arrangement of respective sensors 21a, 21b, 15b, and also it can be prevented that the diameter of the sensor unit 23 is increased to such an extent that such diameter cannot be inserted into a space between the rows of the rolling elements 9a, 9b. In addition, since the inner diameter of the fitting hole 10a used to insert the sensor unit 23 is reduced, improvement in the strength and the stiffness of the outer ring 1 is made easy.

In this case, the rotational speed encoder 13*b* may be fitted/fixed independently to the inner end portion of the hub 2, as shown in FIG. 29, or may be attached to a side surface of a slinger 40 constituting a combination sealing ring, as shown in FIG. 30. Also, the rotational speed sensor 15*b* may be fitted/fixed to the cover 14 that is put on the opening portion at the inner end of the outer ring 1, as shown in FIG. 29, or may be fitted/fixed directly to the outer ring 1, as shown in FIG. 30. Like the case of above respective embodiments, the gear such as the permanent magnet, the magnetic material, or the like may be used as respective encoders 13*b*, 26*a*, 26*b*, the magnetic sensor such as the active type, the passive type, or the like may be used as respective sensors 21*a*, 21*b*, 15*b*, the calculator used to calculate the load may be provided to the rolling bearing unit or may be provided separately from the rolling bearing unit, and so forth.

Tenth Embodiment

Figure 31:
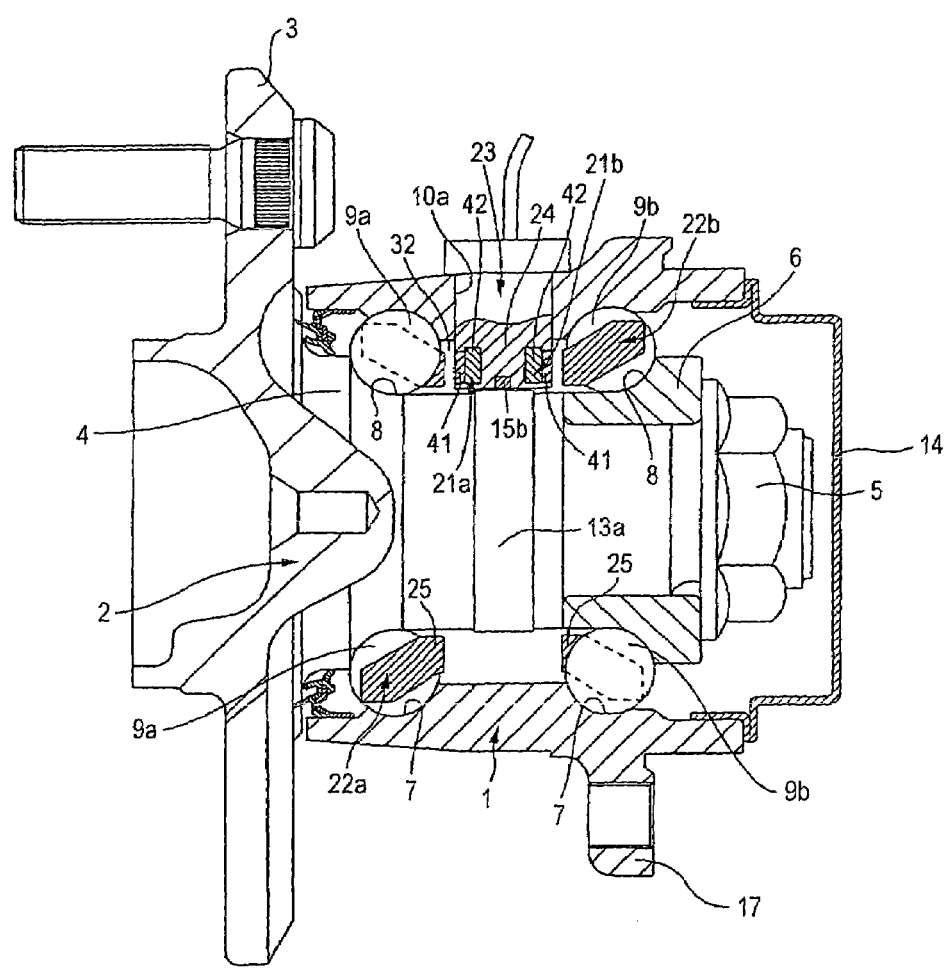
FIG. 31 is a sectional view showing a tenth embodiment of the present invention.

FIG. 31 shows a tenth embodiment of the present invention. As described above, if the revolution speed encoder is omitted by sensing directly the passing of the rolling element, a lower cost can be achieved. The present embodiment intends to implement such structure.

In the case of the present embodiment, each of the revolution speed sensors 21*a*, 21*b* has magnetic sensing elements 41 provided to oppose to the rolling elements 9*a*, 9*b* respectively, and a permanent magnet 42 putbetween the magnetic sensing elements 41 and provided on the opposite side to the rolling elements 9*a*, 9*b* respectively. These rolling elements 9*a*, 9*b* are made of magnetic material such as the bearing steal, or the like.

In the case of the present embodiment having such structure, a quantity of magnetic fluxes passing through the magnetic sensing elements 41 is increased at an instance when the rolling elements 9*a*, 9*b* pass in vicinity of the magnetic sensing elements 41, while a quantity of magnetic fluxes passing through the magnetic sensing elements 41 is decreased while the rolling elements 9*a*, 9*b* are positioned at remote portions from the magnetic sensing elements 41. Also, since characteristics of the magnetic sensing elements 41 are changed based on the change in this quantity of magnetic fluxes, the revolution speed of the rolling elements 9*a*, 9*b* can be measured by measuring a period of such change of the characteristics (or a frequency).

In this case, when these rolling elements 9*a*, 9*b* are made of non-magnetic material such as ceramics, or the like, a density of the magnetic fluxes passing through the magnetic sensing elements 41 can be changed with the revolution motion of the rolling elements 9*a*, 9*b* by plating magnetic material on the surface, embedding the magnetic material in the inside of the ceramics, or the like.

Also, in the illustrated example, the revolution speed sensors 21*a*, 21*b* are arranged between the rows of the rolling elements 9*a*, 9*b*. But fitted positions of the revolution speed sensors 21*a*, 21*b* are not limited to the space between these rows. For example, the revolution speed sensors 21*a*, 21*b* may be provided at both end positions of the outer ring 1 in the axial direction to put the rolling elements 9*a*, 9*b* from both sides in the axial direction.

In this case, structures of the rotational speed encoder 13*a* and the rotational speed sensor 15*b* used to sense the rotational speed of the hub 2 are not particularly limited. Like the above embodiments, various structures known in the related art can be employed.

Eleventh Embodiment

Figure 32:
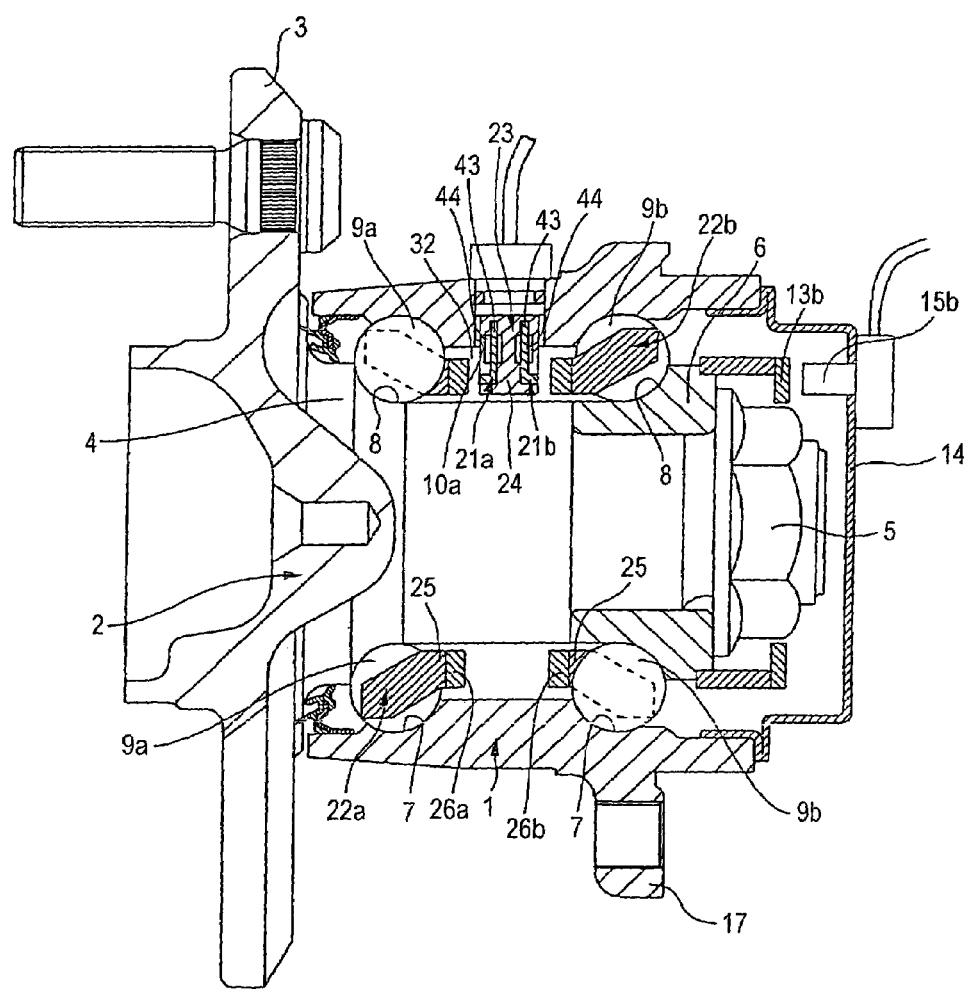
FIG. 32 is a sectional view showing a first example of an eleventh embodiment of the same.
Figure 33:
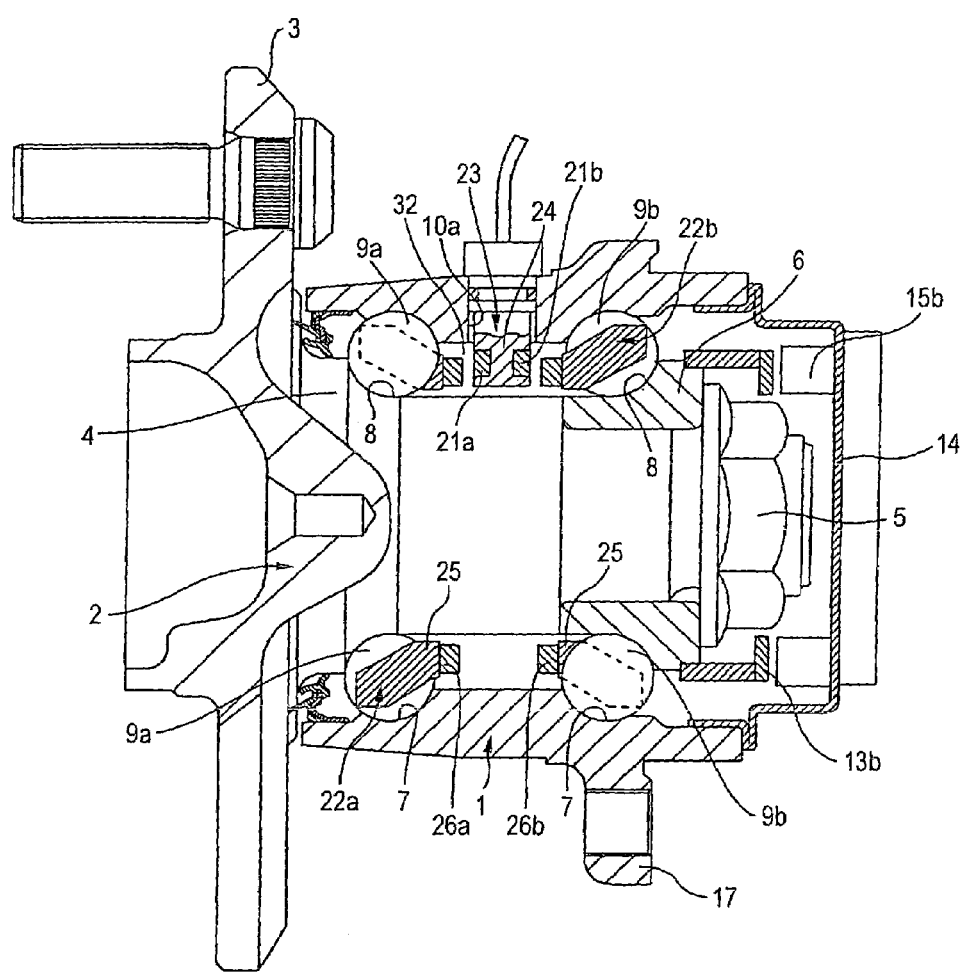
FIG. 33 is a sectional view showing a second example of the eleventh embodiment of the same.

FIGS. 32 and 33 show an eleventh embodiment of the present invention. In the case of the present embodiment, since at least one sensor out of the rotational speed sensor 15*b* and the revolution speed sensors 21*a*, 21*b* is constructed by the passive magnetic sensor, reduction in a cost is intended. In other words, if the active type magnetic sensor is used as respective sensors 15*b*, 21*a*, 21*b* constituting the loadmeasuringdevice, such structure has an advantage that the rotational speed and in turn the load can be measured stably from a low speed to a high speed, but such a problem exists that a cost of the magnetic sensor is slightly increased. Therefore, in the case of the present embodiment, cost reduction is intended by using the passive type magnetic sensor, which is constructed by winding a coil 44 round a yoke 43 (same meaning as a stator or a pole piece) made of magnetic material, as at least any one sensor out of respective sensors 15*b*, 21*a*, 21*b*.

As the passive type magnetic sensor out of respective sensors 15*b*, 21*a*, 21*b*, the revolution speed sensors 21*a*, 21*b* shown in FIG. 32 may be selected or the rotational speed sensor 15*b* shown in FIG. 33 may be selected. The rotational speed sensor 15*b* is formed of the active type magnetic sensor in the structure shown in FIG. 32, while a pair of revolution speed sensors 21*a*, 21*b* are formed of the active type magnetic sensor in the structure shown in FIG. 33. In this case, in the combination of the passive type magnetic sensor and the encoder, the permanent magnet is not provided on the sensor side when the encoder is formed of the permanent magnet. In contrast, when the permanent magnet is provided on the sensor side, the encoder is made of mere magnetic material (not the permanent magnet) and the magnetic characteristic is changed alternately at an equal interval along the circumferential direction. In this case, a structure of the passive type magnetic sensor is not particularly restricted and a variety of structures such as stick type, ring-like type, or the like, known in the related art may be used. In addition, it is selected in response to the required-performance that the revolution speed sensors 21*a*, 21*b* shown in FIG. 32 shouldbe selected as the passive type magnetic sensor or that the rotational speed sensor 15*b* shown in FIG. 33 should be selected as the passive type magnetic sensor For example, it is preferable that, when reduction in measurement of the axial load is mainly considered, the revolution speed sensors 21*a*, 21*b* shown in FIG. 32 should be constructed as the passive type magnetic sensor. In other words, since the axial load is generated when the revolution speed of the rolling elements 9*a*, 9*b* is high such as the lane change during the high-speed traveling, or the like, in many cases there is caused no problem in practical use even though the passive type magnetic sensor whose output voltage becomes low during the low-speed running is used as the revolution speed sensors 21*a*, 21*b*.

On the contrary, in case installing spaces of the revolution speed sensors 21*a*, 21*b* are limited, fort example, intervals between the rows of the rolling elements 9*a*, 9*b* are narrow, or the like, these sensors are formed of the active type magnetic sensor that can constitute the revolution speed sensors 21*a*, 21*b* in a small size, as shown in FIG. 33, whereas the rotational speed sensor 15*b* whose installing space has a margin is constructed by the passive type ring-like magnetic sensor. Other structures and operations are similar to foregoing embodiments.

Twelfth Embodiment

Figure 34:
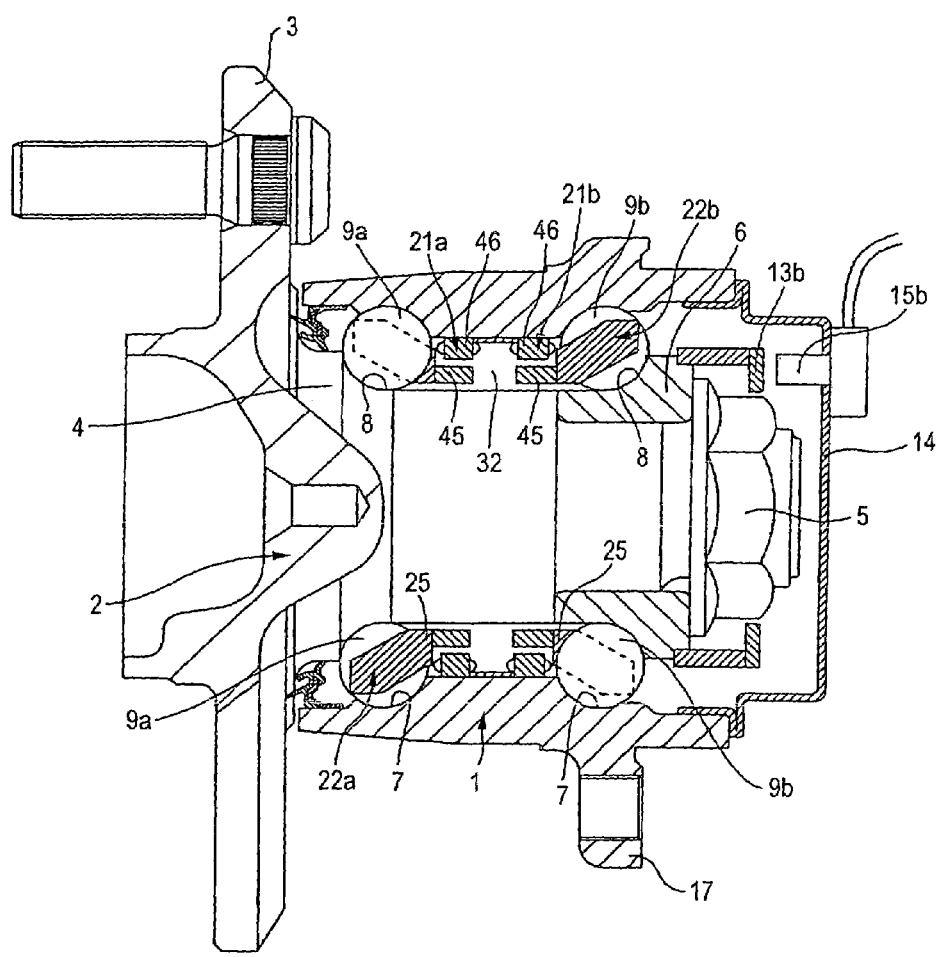
FIG. 34 is a sectional view showing a first example of a twelfth embodiment of the present invention.
Figure 35:
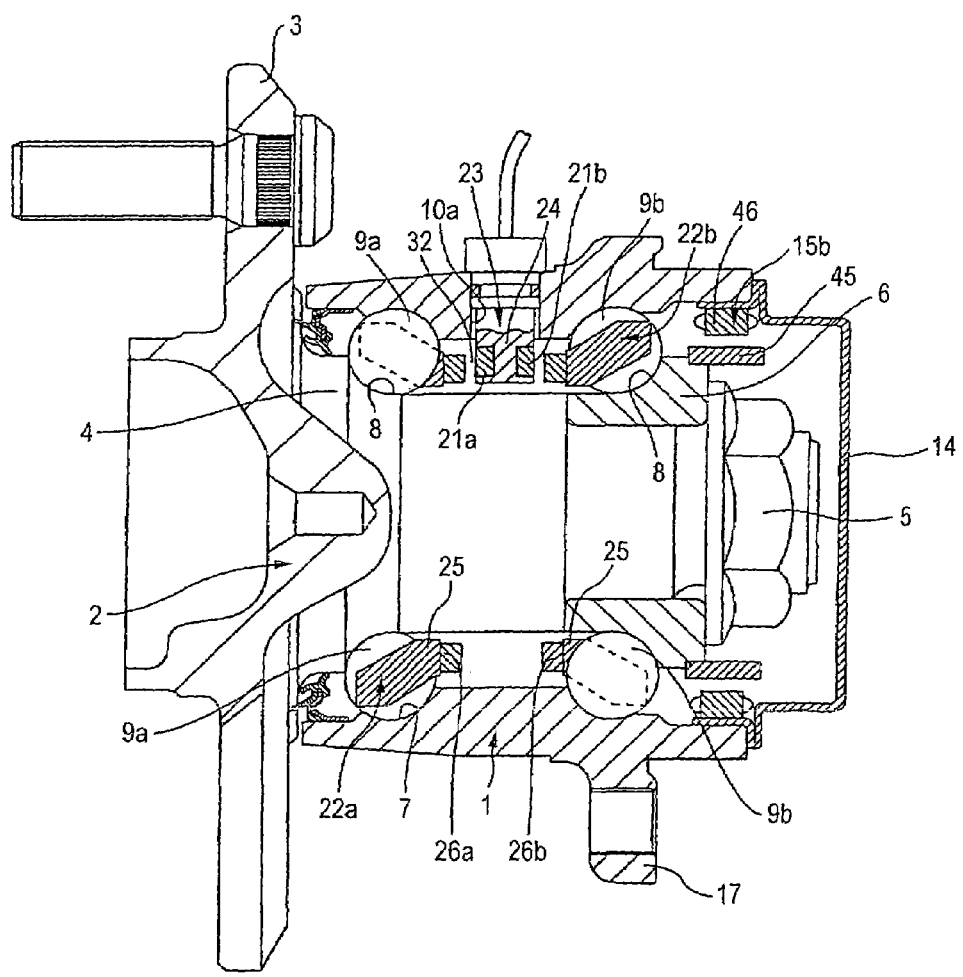
FIG. 35 is a sectional view showing a second example of the twelfth embodiment of the same.
Figure 36:
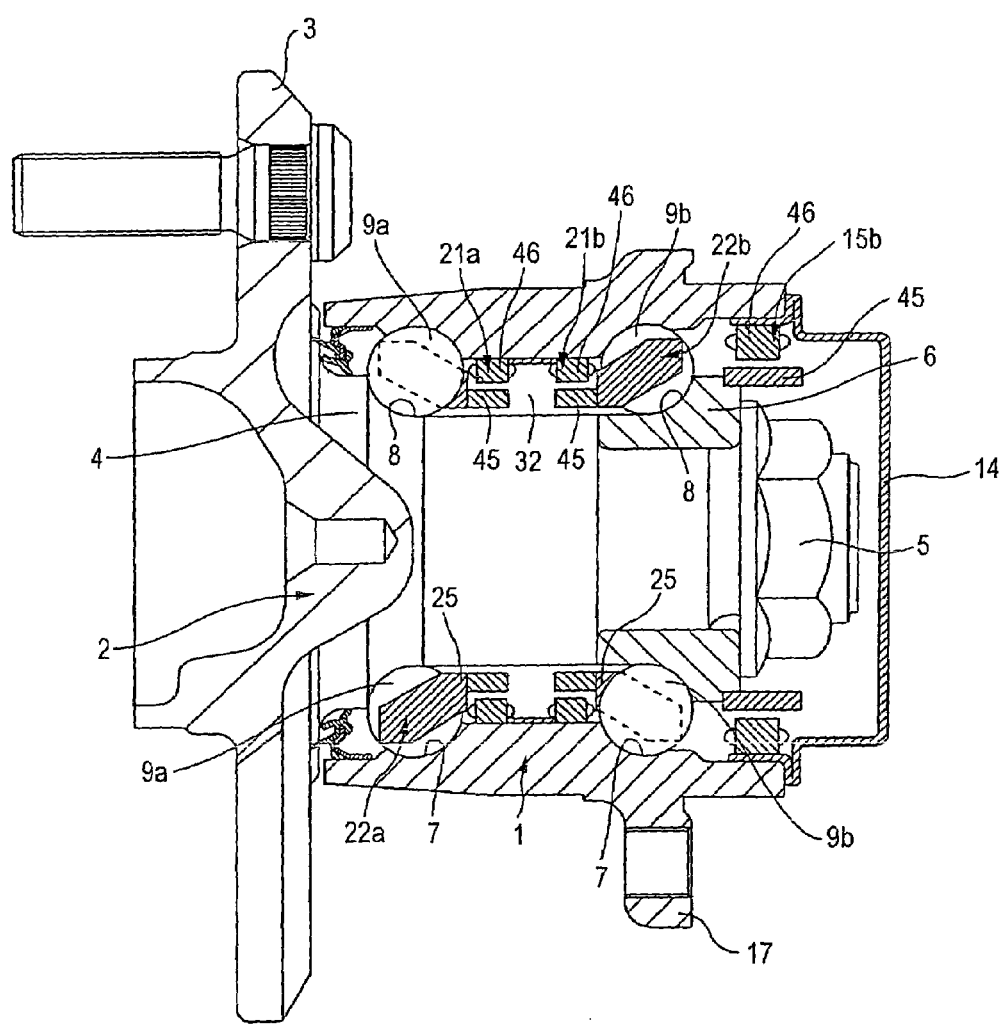
FIG. 36 is a sectional view showing a third example of the twelfth embodiment of the same.

FIGS. 34 to 36 show a twelfth embodiment of the present invention. In the case of the present embodiment, at least one sensor out of the revolution speed sensors 21a, 21b and the rotational speed sensor 15b is constructed as a resolver. The resolver is composed of rotors 45 fixed to members such as the retainers 22a, 22b, the hub 2, etc. to sense the rotational speed, and stators 46 fitted/fixed to the fixed outer ring 1 directly or via the cover 14 in a state that such stators are arranged concentrically with the rotors 45 around the rotors 45. The rotors 45 may be composed of an eccentric rotor. In this case, it is preferable that, if such rotor is composed of a elliptical rotor, a triangle riceball type, or the like, to have a point-symmetrical shape, not only imbalance of the rotation can be reduced but also the number of pulses per revolution can be increased.

As described above, if the active type magnetic sensor is used as the speed sensor, the revolution speed can be measured precisely up to the low-speed range, nevertheless the number of times of change in the output of the magnetic sensor per one revolution of the encoder is reduced and therefore a resolving power in the velocity sensing is not always enhanced. In contrast, if the resolver is used as the speed sensor, the number of times of change in the output (number of pulses) per one revolution of the rotors 45 can be increased rather than the active type magnetic sensor, and a resolving power in the velocity sensing is enhanced and in turn a responsibility of the load calculation can be accelerated. Also, since the resolver main body is constructed only by a coil and a core (stator), the structure can be made simple and there liability can be easily assured. In this case, a sensed signal of the resolver is input into an R/D converter and then taken out as a pulse signal that is changed at a frequency that is in proportion to the speed.

It is selected appropriately according to the required performance which one of the revolution speed sensors 21a, 21b and the rotational speed sensor 15b should be constructed as the resolver. In the structure shown in FIG. 34, in order to sense the revolution speed of the rolling elements 9a, 9b in respective rows, the rotational speeds of a pair of retainers 22a, 22b are sensed by the resolver and also the rotational speed of the hub 2 is sensed by the magnetic sensor. Also, in the structure shown in FIG. 35, the rotational speed of the hub 2 is sensed by the resolver and also the rotational speeds of a pair of retainers 22a, 22b are sensed by the magnetic sensor. In addition, in the structure shown in FIG. 36, the rotational speeds of a pair of retainers 22a, 22b and the rotational speed of the hub 2 are sensed by the resolver. The event that structures of the resolver and the magnetic sensors and their fitted positions are not limited to those illustrated, the event that a variety of materials for the rotor and the encoder can be employed, etc. are similar to the case in foregoing embodiments.

Thirteenth Embodiment

In this case, as apparent from above explanation, the axial load applied to the rolling bearing unit can be calculated based on a ratio of the revolution speeds of the rolling elements in double rows independent of change in the rotational speed of the hub. In this case, because only division of the revolution speeds of the double rows is calculated, the rotational speed of the hub is not needed in load calculation. In contrast, because the rotational speed of the hub can be calculated from the revolution speeds of the rolling elements in double rows, the sensor for sensing the rotational speed of the hub, which is needed to control the ABS or the TCS, can be omitted. More particularly, if an average value of the revolution speeds of the rolling elements in double rows is used as the rotational speed of the hub, a precision enough to control the ABS or the TCS in practical use can be assured. In this case, an action of the axial load maybe considered as a factor for changing the revolution speeds of the rolling elements in double rows. In such event, since the average value of the revolution speeds of the rolling elements in double rows is not so affected by the axial load, a measuring precision of the rotational speed is never degraded to such an extent that the precision becomes an issue in practical use. The reason for this is that, as described above, even if the revolution speed in one row is increased by the axial load, the revolution speed in the other row is changed toward the smaller direction. The revolution speeds in double rows are also changed by the radial load, but such change is small in contrast to the influence of the axial load. Therefore, in some case such change can be neglected according to the precision required to control the ABS or the TCS.

Although the invention has been described in detail with reference to specific embodiments, it is obvious to those skilled in the art that various changes and modifications can be made without departing from the spirit and scope thereof.

This application is based on Japanese Patent Application Nos. 2003-144942 filed on May 22, 2003, 2003-171715 filed on Jun. 17, 2003, 2003-172483 filed on Jun. 17, 2003 and 2004-007655 filed on Jan. 15, 2004, the contents of which are incorporated herein by reference.

The invention claimed is:

1. A load measuring device for a rolling bearing unit comprising:
    a stationary ring having two rows of raceways;
    a rotating ring arranged concentrically with the stationary ring, the rotating ring having two rows of raceways which are formed respectively to be opposite to the raceways of the stationary ring;
    a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;
    a pair of revolution speed sensors for sensing revolution speeds of the rolling elements in the two rows respectively; and
    a calculator for calculating a load applied between the stationary ring and the rotating ring based on sensed signals fed the revolution speed sensors.

2. A load measuring device for a rolling bearing unit according to claim 1, further comprising:
    a rotational speed sensor for sensing a rotational speed of the rotating ring.

3. A load measuring device for a rolling bearing unit according to claim 2, wherein at least one sensor of the pair of revolution speed sensors and the rotational speed sensor is a resolver.

4. A load measuring device for a rolling bearing unit according to claim 2, wherein the pair of revolution speed sensors and the rotational speed sensor are provided at an interval in an axial direction of the stationary ring so as to put the rolling elements in one row between the pair of revolution speed sensors and the rotational speed sensor.

5. A load measuring device for a rolling bearing unit according to claim 2, wherein the pair of revolution speed sensors and the rotational speed sensor are fitted to a top end portion of a single sensor unit fixed to the stationary ring between a pair of rows of the rolling elements, and a fitted position of the rotational speed sensor is deviated closer to a rotating ring side than the revolution speed sensors in a diameter direction of the stationary ring.

6. A load measuring device for a rolling bearing unit according to claim 1, wherein a control to be executed based on a rotational speed of the rotating ring is executed based on the rotational speed of the rotating ring, which is estimated based on the sensed signal of at least one revolution speed sensor out of the revolution speed sensors.

7. A load measuring device for a rolling bearing unit according to claim 1, wherein the calculator calculates the radial load applied between the stationary ring and the rotating ring based on a sum of the revolution speed of the rolling elements in one row and the revolution speed of the rolling elements in the other row.

8. A load measuring device for a rolling bearing unit according to claim 1, further comprising:
   a rotational speed sensor for sensing a rotational speed of the rotating ring,
   wherein the calculator calculates the radial load applied between the stationary ring and the rotating ring based on a sensed signal fed from the rotational speed sensor and sensed signals fed from the revolution speed sensors.

9. A load measuring device for a rolling bearing unit according to claim 1, further comprising:
   a rotational speed sensor for sensing a rotational speed of the rotating ring,
   wherein the calculator calculates the axial load applied between the stationary ring and the rotating ring based on a sensed signal fed from the rotational speed sensor and sensed signals fed from the revolution speed sensors.

10. A load measuring device for a rolling bearing unit according to claim 1, wherein the revolution speeds of the rolling elements in the two rows are measured as rotational speeds of retainers for holding respective rolling elements.

11. A load measuring device for a rolling bearing unit comprising:
   a stationary ring having two rows of raceways;
   a rotating ring arranged concentrically with the stationary ring, the rotating ring having two rows of raceways which are formed respectively to be opposite to the raceways of the stationary ring;
   a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;
   a pair of revolution speed sensors for sensing revolution speeds of the rolling elements in the two rows respectively; and
   a calculator for calculating a load applied between the stationary ring and the rotating ring based on sensed signals fed the revolution speed sensors,
   wherein a control to be executed based on a rotational speed of the rotating ring is executed based on the rotational speed of the rotating ring, which is estimated based on the sensed signal of at least one revolution speed sensor out of the revolution speed sensors, and
   wherein an average value of the revolution speeds of the rolling elements in the two rows, which is calculated based on the sensed signals of the pair of revolution speed sensors, is used as an estimated value of the rotational speed of the rotating ring.

12. A load measuring device for a rolling bearing unit comprising:
   a stationary ring having two rows of raceways;
   a rotating ring arranged concentrically with the stationary ring, the rotating ring having two rows of raceways which are formed respectively to be opposite to the raceways of the stationary ring;
   a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;
   a pair of revolution speed sensors for sensing revolution speeds of the rolling elements in the two rows respectively;
   a calculator for calculating a load applied between the stationary ring and the rotating ring based on sensed signals fed the revolution speed sensors; and
   a rotational speed sensor for sensing a rotational speed of the rotating ring,
   wherein the calculator calculates the radial load applied between the stationary ring and the rotating ring based on a sensed signal fed from the rotational speed sensor and sensed signals fed from the revolution speed sensors, and
   wherein the calculator calculates the radial load applied between the stationary ring and the rotating ring based on a ratio of:
   the sum of (a) the revolution speed of the rolling elements in one row and (b) the revolution speed of the rolling elements in the other row, and
   the rotational speed of the rotating ring.

13. A load measuring device for a rolling bearing unit comprising:
   a stationary ring having two rows of raceways;
   a rotating ring arranged concentrically with the stationary ring, the rotating ring having two rows of raceways which are formed respectively to be opposite to the raceways of the stationary ring;
   a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;
   a pair of revolution speed sensors for sensing revolution speeds of the rolling elements in the two rows respectively;
   a calculator for calculating a load applied between the stationary ring and the rotating ring based on sensed signals fed the revolution speed sensors; and
   a rotational speed sensor for sensing a rotational speed of the rotating ring,
   wherein the calculator calculates the radial load applied between the stationary ring and the rotating ring based on a sensed signal fed from the rotational speed sensor and sensed signals fed from the revolution speed sensors, and wherein the calculator calculates the radial load applied between the stationary ring and the rotating ring based on a ratio of:

a product of (a) the revolution speed of the rolling elements in one row and (b) the revolution speed of the rolling elements in the other row, and a square of the rotational speed of the rotating ring.

14. A load measuring device for a rolling bearing unit comprising:

a stationary ring having two rows of raceways;

a rotating ring arranged concentrically with the stationary ring, the rotating ring having two rows of raceways which are formed respectively to be opposite to the raceways of the stationary ring;

a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;

a pair of revolution speed sensors for sensing revolution speeds of the rolling elements in the two rows respectively; and a calculator for calculating a load applied between the stationary ring and the rotating ring based on sensed signals fed the revolution speed sensors, wherein the calculator calculates the axial load applied between the stationary ring and the rotating ring based on a ratio of the revolution speed of the rolling elements in one row and the revolution speed of the rolling elements in the other row.

15. A load measuring device for a rolling bearing unit comprising:

a stationary ring having two rows of raceways;

a rotating ring arranged concentrically with the stationary ring, the rotating ring having two rows of raceways which are formed respectively to be opposite to the raceways of the stationary ring;

a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;

a pair of revolution speed sensors for sensing revolution speeds of the rolling elements in the two rows respectively; and a calculator for calculating a load applied between the stationary ring and the rotating ring based on sensed signals fed the revolution speed sensors, wherein the calculator calculates the radial load applied between the stationary ring and the rotating ring based on a difference between the revolution speed of the rolling elements in one row and the revolution speed of the rolling elements in the other row.

16. A load measuring device for a rolling bearing unit comprising:

a stationary ring having two rows of raceways;

a rotating ring arranged concentrically with the stationary ring, the rotating ring having two rows of raceways which are formed respectively to be opposite to the raceways of the stationary ring; a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;

a pair of revolution speed sensors for sensing revolution speeds of the rolling elements in the two rows respectively;

a calculator for calculating a load applied between the stationary ring and the rotating ring based on sensed signals fed the revolution speed sensors; and a rotational speed sensor for sensing a rotational speed of the rotating ring, wherein the calculator calculates the axial load applied between the stationary ring and the rotating ring based on a sensed signal fed from the rotational speed sensor and sensed signals fed from the revolution speed sensors, and wherein the calculator calculates the axial load applied between the stationary ring and the rotating ring based on a ratio of:

the difference between (a) the revolution speed of the rolling elements in one row and (b) the revolution speed of the rolling elements in the other row, and the rotational speed of the rotating ring.

17. A load measuring device for a rolling bearing unit comprising:

a stationary ring having two rows of raceways;

a rotating ring arranged concentrically with the stationary ring, the rotating ring having two rows of raceways which are formed respectively to be opposite to the raceways of the stationary ring;

a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;

a pair of revolution speed sensors for sensing revolution speeds of the rolling elements in the two rows respectively; and a calculator for calculating a load applied between the stationary ring and the rotating ring based on sensed signals fed the revolution speed sensors, wherein the calculator calculates the axial load applied between the stationary ring and the rotating ring based on a synthesized signal obtained by synthesizing a signal representing the revolution speed of the rolling elements in one row and a signal representing the revolution speed of the rolling elements in the other row.

18. A load measuring device for a rolling bearing unit according to claim 17, wherein the calculator calculates the axial load based on any one of a period and a frequency of a swell of the synthesized signal.

19. A load measuring device for a rolling bearing unit according to claim 17, further comprising:

a rotational speed sensor for sensing a rotational speed of the rotating ring, wherein the calculator calculates the axial load based on a ratio of any one of a period and a frequency of a swell of the synthesized signal and the rotational speed of the rotating ring.

20. A load measuring device for a rolling bearing unit comprising:
- a stationary ring having two rows of raceways;
- a rotating ring arranged concentrically with the stationary ring, the rotating ring having two rows of raceways which are formed respectively to be opposite to the raceways of the stationary ring;
- a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;
- a pair of revolution speed sensors for sensing revolution speeds of the rolling elements in the two rows respectively;
- a calculator for calculating a load applied between the stationary ring and the rotating ring based on sensed signals fed the revolution speed sensors; and
- a comparator for comparing contact angles of the rolling elements in each row, which are calculated by the calculator calculates in a course of calculation of the revolution speeds of the rolling elements in each row, with a normal value,
- wherein an alarm is generated when the comparator decides that the contact angles are out of a normal range.

21. A load measuring rolling bearing unit comprising:
- a stationary ring having two rows of raceways;
- a rotating ring arranged concentrically with the stationary ring, the rotating ring having two rows of raceways which are formed respectively to be opposite to the raceways of the stationary ring;
- a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other; and
- a pair of revolution speed sensors for sensing revolution speeds of the rolling elements in the two rows respectively.

22. A load measuring rolling bearing unit according to claim 21, further comprising:
- a calculator for calculating a load applied between the stationary ring and the rotating ring based on sensed signals fed the revolution speed sensors.

23. A load measuring rolling bearing unit according to claim 21, further comprising:
- a rotational speed sensor for sensing rotational speed of the rotating ring.

24. A load measuring rolling bearing unit according to claim 21, further comprising:
- a calculator for calculating a load applied between the stationary ring and the rotating ring based on sensed signals fed the revolution speed sensors and a sensed signal fed from the rotational speed sensor.

25. A load measuring rolling bearing unit comprising:
- a stationary ring having two rows of raceways;
- a rotating ring arranged concentrically with the stationary ring, the rotating ring having two rows of raceways which are formed respectively to be opposite to the raceways of the stationary ring;
- a plurality of rolling elements provided rotatably between the raceways of the stationary ring and the rotating ring, wherein contact angles of the rolling elements are directed mutually oppositely between a pair of raceways formed on the stationary ring and the rotating ring which are opposite to each other and the other pair of raceways formed on the stationary ring and the rotating ring which are opposite to each other;
- a pair of revolution speed sensors for sensing revolution speeds of the rolling elements in the two rows respectively; and
- a comparator for comparing contact angles of the rolling elements in each row, which are calculated by the calculator in a course of calculation of the revolution speeds of the rolling elements in each row, with a normal value,
- wherein an alarm is generated when the comparator decides that the contact angles are out of a normal range.

* * * * *